US012674028B2

(12) United States Patent
Koebel et al.

(10) Patent No.: US 12,674,028 B2
(45) **Date of Patent: *Jul. 7, 2026**

(54) Q-T-SILOXANE-BASED POLYMERIC MATERIALS WITH HIGH SILOXANE RING CONTENT AND METHOD FOR PREPARING SAME

(71) Applicant: EMPA EIDGENOSSISCHE MATERIALPRUFUNGSUND FORSCHUNGSANSTALT, Dubendorf (CH)

(72) Inventors: Matthias Koebel, Bruttisellen (CH); Marek Nemec, Poprad (SK); Stefanie Hauser, Nafels (CH)

(73) Assignee: EMPA EIDGENOSSISCHE MATERIALPRUFUNGSUND FORSCHUNGSANSTALT, Dubendorf (CH)

( * ) Notice: Subject to any disclaimer, the term of this patent is extended or adjusted under 35 U.S.C. 154(b) by 867 days.

This patent is subject to a terminal disclaimer.

(21) Appl. No.: 17/784,524

(22) PCT Filed: Dec. 10, 2020

(86) PCT No.: PCT/EP2020/085617

§ 371 (c)(1),
(2) Date: Jun. 10, 2022

(87) PCT Pub. No.: WO2021/116333

PCT Pub. Date: Jun. 17, 2021

(65) Prior Publication Data

US 2023/0097589 A1 Mar. 30, 2023

(30) Foreign Application Priority Data

Dec. 11, 2019 (EP) .................................... 19215244
Sep. 16, 2020 (WO) ................ PCT/EP2020/075890

(51) Int. Cl.

| | |
|---|---|
| ***C08G 77/18*** | (2006.01) |
| ***C08G 77/00*** | (2006.01) |
| ***C08G 77/08*** | (2006.01) |
| ***C08G 77/30*** | (2006.01) |
| ***C08G 83/00*** | (2006.01) |
| ***C08L 83/04*** | (2006.01) |
| ***C08L 83/06*** | (2006.01) |
| ***C08L 83/08*** | (2006.01) |
| ***C09D 183/06*** | (2006.01) |
| ***C09D 183/08*** | (2006.01) |
| ***C09J 183/06*** | (2006.01) |
| ***C09J 183/08*** | (2006.01) |
| *C08G 77/26* | (2006.01) |
| *C08G 77/28* | (2006.01) |

(52) U.S. Cl.

CPC ............. *C08G 77/18* (2013.01); *C08G 77/08* (2013.01); *C08G 77/30* (2013.01); *C08G 77/70* (2013.01); *C08G 83/005* (2013.01); *C08L 83/04* (2013.01); *C08L 83/06* (2013.01); *C08L 83/08* (2013.01); *C09D 183/06* (2013.01); *C09D 183/08* (2013.01); *C09J 183/06* (2013.01); *C09J 183/08* (2013.01); *C08G 77/26* (2013.01); *C08G 77/28* (2013.01)

(58) Field of Classification Search

CPC ......... C08G 77/08; C08G 77/16; C08G 77/18
See application file for complete search history.

(56) References Cited

U.S. PATENT DOCUMENTS

| | | | |
|---|---|---|---|
| 10,208,164 | B2 | 2/2019 | Dogen et al. |
| 11,965,063 | B2 | 4/2024 | Koebel et al. |
| 2006/0154069 | A1 | 7/2006 | Lin et al. |
| 2008/0290472 | A1 | 11/2008 | Yagihashi et al. |
| 2016/0075918 | A1 | 3/2016 | Bögershausen et al. |
| 2017/0313726 | A1 | 11/2017 | Wolter et al. |
| 2019/0153169 | A1 | 5/2019 | Huang et al. |
| 2019/0292320 | A1 | 9/2019 | Watanabe et al. |
| 2020/0010725 | A1 | 1/2020 | Kotake et al. |

(Continued)

FOREIGN PATENT DOCUMENTS

| | | | |
|---|---|---|---|
| CN | 104327269 | A | 2/2015 |
| CN | 110606990 | A | 12/2019 |

(Continued)

OTHER PUBLICATIONS

International Search Report and Written Opinion for PCT/EP2020/085617, dated Mar. 11, 2021.
Xiaomin Zhu, et al., One-pot synthesis of hyperbranched polyethoxysiloxanes, Macromolecules, vol. 39, Feb. 11, 2006 (Feb. 11, 2006), pp. 1701-1708, XP002798999.

(Continued)

*Primary Examiner* — Marc S Zimmer
(74) *Attorney, Agent, or Firm* — Bryan D. Zerhusen; Nicholas R. Herrel; CANTOR COLBURN LLP

(57) ABSTRACT

The present invention pertains to a branched polymeric liquid poly siloxane material comprising non-organofunctional Q-type siloxane moieties and mono-organofunctional T-type siloxane moieties, as well as optionally tri-organofunctional M-type siloxane moieties and/or di-organofunctional D-type siloxane moieties characterized in that the polysiloxane material has a specified degree of polymerization, comprises a significant amount of four-membered Q2-type and/or Q3-type siloxane ring species relative to the total Q-type siloxane species, and is optionally functionalized at specific moieties. The present invention further pertains to methods for producing the polymeric liquid polysiloxane material as well as associated uses of the material.

21 Claims, 10 Drawing Sheets

(56) References Cited

U.S. PATENT DOCUMENTS

| | | | | |
|---|---|---|---|---|
| 2023/0037620 | A1* | 2/2023 | Koebel | C08G 77/30 |
| 2023/0047845 | A1 | 2/2023 | Fu et al. | |
| 2023/0348285 | A1 | 11/2023 | Numrich et al. | |

FOREIGN PATENT DOCUMENTS

| | | | |
|---|---|---|---|
| CN | 112625244 | A | 4/2021 |
| EP | 0728793 | A1 | 8/1996 |
| EP | 0518057 | B1 | 7/1998 |
| EP | 1510520 | A1 | 3/2005 |
| EP | 1978055 | A1 | 10/2008 |
| EP | 3498671 | A1 | 6/2019 |
| EP | 3578591 | A1 | 12/2019 |
| JP | H0718221 | A | 1/1995 |
| JP | 2003012803 | A | 1/2003 |
| JP | 2003049113 | A | 2/2003 |
| JP | 2012184297 | A | 9/2012 |
| JP | 5306338 | B2 | 7/2013 |
| JP | 2017132879 | A | 8/2017 |
| WO | WO 2000/040640 | A1 | 7/2000 |
| WO | WO 2004/058859 | A1 | 7/2004 |
| WO | 2012077770 | A1 | 6/2012 |
| WO | 2014187972 | A1 | 11/2014 |
| WO | WO 2019/234062 | A1 | 12/2019 |
| WO | 2021115646 | A1 | 6/2021 |
| WO | 2022058059 | A1 | 3/2022 |

OTHER PUBLICATIONS

International Search Report and Written Opinion for PCT/EP2020/075890, dated Nov. 20, 2020.

Bradley, DC, et al, Niobium and tantalum mixed alkoxides, (J. Chem. Soc., 1958, 99-101, Jan. 1958.

Lei, X., et al., Hyperbranched polysiloxane (HBPSi)-based polyimide films with ultralow dielectric permittivity, desirable mechanical and thermal properties, J. Mater. Chem. C, 2016, 4, 2134, Jan. 11, 2016.

Schärtl, W., Current directions in core-shell nanoparticle design, Nanoscale, 2010, 2, 829-843, Mar. 29, 2010.

Banerjee, M., et al., Enhanced antibacterial activity of bimetallic gold-silver core-shell nanoparticles at low silver concentration, Nanoscale, 2011, 3, 5120-5125, Sep. 10, 2011.

Chruscie, JJ., et al., Synthesis, Characterization and Microstructure of New Liquid Poly(methylhydrosiloxanes) Containing Branching Units SiO 4/2, Polymers 2018, 10, 484, Apr. 28, 2018.

Jaumann, M., et al., Hyperbranched Polyalkoxysiloxanes via AB3-Type Monomers, Macromol. Chem Phys, Feb. 2003, vol. 204, pp. 1014-1026.

* cited by examiner

Q-T-SILOXANE-BASED POLYMERIC MATERIALS WITH HIGH SILOXANE RING CONTENT AND METHOD FOR PREPARING SAME

CROSS-REFERENCE TO RELATED APPLICATIONS

The present application is a National Stage Entry of PCT/EP2020/085617, filed 10 Dec. 2020, published as WO 2021/116333 A1, which claims the benefit of and priority to EP Application 19215244.5, filed 11 Dec. 2019, and International Application PCT/EP2020/075890, filed 16 Sep. 2020, published as WO 2021/115646 A1, each of which is incorporated herein by reference in its entirety.

FIELD OF THE INVENTION

The present invention pertains to a branched polymeric liquid polysiloxane material comprising non-organofunctional Q-type siloxane moieties and mono-organofunctional T-type siloxane moieties, as well as optionally tri-organofunctional M-type siloxane moieties and/or di-organofunctional D-type siloxane moieties characterized in that the polysiloxane material has a specified degree of polymerization, comprises a significant amount of four-membered $Q^2$-type and/or $Q^3$-type siloxane ring species relative to the total Q-type siloxane species, and is optionally functionalized at specific moieties. The present invention further pertains to methods for producing the polymeric liquid polysiloxane material as well as associated uses of the material.

BACKGROUND OF THE INVENTION

In nanotechnology, organic/inorganic hybrid materials can be obtained through a rich variety of preparative techniques. Sol-gel based techniques for example operate in liquid solution, starting from a colloidal suspension of molecular or oligomeric precursors resulting in the spontaneous formation of nanoparticle building blocks. Sols are either prepared in situ from olation and condensation reactions of oligomeric polyhydroxymetallates or by hydrolysis of alkoxysilanes in water-alcohol mixtures. When a low degree of condensation is desired, only small amounts of water reactant are used which leads to branched siloxane compounds with low molecular weight. An example of such a preparation technique employing acid catalyzed hydrolysis in a neat system (solvent free) is described in EP 1 510 520 A1. Generally, hydrolysis with such low amounts of water of monomeric alkoxysilane yields oligomers. Many of the single component compounds are commercial, for example, for the case of Q-type Tetraethoxysilane (TEOS) there exist ethylsilicate commercial oligomer mixtures with a silicate content of 40 or even up to 50%, commonly referred to as ethylsilicate 40, ethylsilicate 50 or also know by their brand names e.g. Dynasylan 40 or Dynasylan Silbond 50 (Evonik Industries).

Hyperbranched polyethoxysiloxanes (PEOS) are small molecular building blocks with typical molecular weights ranging from 500 to 50'000 Dalton, spanning a size range from several Angstoms to single digit nanometers. The word hyperbranched also means that those compounds feature a significant fraction of linear species, although they also contain siloxane rings to different but generally lesser extents. Preferred synthetic routes are water-free or "non-hydrolytic" reaction conditions. In general, such non-hydrolytic preparation protocols for hyperbranched siloxane polymers are far more versatile and offer better control over the final reaction products than the above-mentioned hydrolytic routes because the condensation reactions can be controlled by stoichiometric addition of the reactants. Furthermore, the synthesis can be carried out "neat", that means in absence of additional cosolvents such as alcohols but if so desired also in the presence of solvents. As a result of their highly dendritic structure, with a higher degree of polymerization in the center and a lower degree of the linear chain arms at their perimeter, PEOSs exhibit lower melt viscosities and a much greater solubility in themselves but also in other organic solvents than their linear chain siloxane analogues.

Hyperbranched PEOS can be an intriguing class of molecular precursor for all sorts of hybrid molecular building blocks, readily accessible by "non-hydrolytic" methods such as:

1) Condensation of metal hydroxides obtained by reaction of a metal alkoxide with an alkali hydroxide (silanol route);
2) Condensation of metal chlorides with metal alkoxides (chloride route);
3) Condensation of a single metal alkoxide with itself by ether elimination;
4) Condensation of a mixed acetoxy-alkoxy-metallate with itself by elimination of the corresponding acetic acid ester (acetoxy route); or
5) Condensation of metal alkoxides by reaction with acetic anhydride in presence of a suitable catalyst by acetic acid ester elimination (anhydride route). Method 2) is described in EP0728793A1, where the preparation of hyperbranched polysiloxanes proceeds through heterocondensation of chloro- and alkoxysilanes through alkyl halide elimination. The reaction is catalyzed by Ti-, V- and Zr-containing organometallic compounds.

Method 3) is not well studied but postulated to enable condensation of various transition metal oxides following the pioneering works of Bradley et al. on alkoxy rearrangement mechanisms (J. Chem. Soc., 1958, 99-101].

Method 4) generally uses rather costly acetoxysilanes. WO 00/40640 A1 describes the preparation of lightly branched organosilicon compounds through acetoxy derivatization starting from dimethylsiloxane prepolymers which are crosslinked using trifunctional silanes. WO 00/40640 A1 describes the usefulness of the classic acetoxy route when only a few condensation bonds need to be made i.e. when connecting monomeric with oligomeric/polymeric building blocks to create larger macromolecules. This can be done for example by refluxing silanol terminated prepolymers with alkoxy terminated crosslinkers in the presence of acetic acid under refluxing at elevated temperature or directly with acetoxy-terminated crosslinkers (e.g. triacetoxysilanes).

Method 5) was published by Moeller et al. (e.g. Macromolecules 2006, 39, 1701-1708) and is a more advanced technique for polyalkylmetallate (PAM) preparation in terms of scalability, process safety and ease of implementation compared to methods 1) through 4). WO 2004/058859 A1 describes the preparation of single component PAMs using the anhydride route.

WO 2019/234062 A1 discloses a process for manufacturing a core-shell PEOS-core with an organofunctional silane shell material. WO 2019/234062 A1 describes the preparation of a hyperbranched ethylsilicate "core" by means of non-hydrolytic acetic anhydride condensation chemistry and then the grafting of a shell, made preferentially from a selection of organofunctional T-type trialkoxysilanes in a second temporally separated step to create a hybrid organofunctional core-shell molecular building block. Both steps are preferably carried out in the presence of a tetraalkoxytitanate rearrangement catalyst.

Known Q-T poylsiloxane combinations commonly refer to formulations featuring high T and low Q molar amounts. EP0518057B1 teaches a composition of linear and cyclic Q-T polysiloxanes with vinyl and optional other secondary T-type functionalities with an alkoxy to vinyl molar ratio in the range of 1:1 to 1:8, which translates into a high T:Q molar ratio of more than 0.5:1. Furthermore, EP0518057B1 is silent on the content of any silanol groups in the polysiloxanes.

U.S. Pat. No. 5,733,644 teaches the preparation of a colloidal Q-T system, which again is not a polymeric liquid material but the siloxane polycondensates exist in the form of nanoparticles with typical sizes larger than 5 nm or in most practical cases even larger than 10 nm.

Branched Q-T-D siloxane materials are also described in the literature such as J. Mater. Chem. C, 2016, 4, 2134, however commonly the composition space described therein is typically dominated by T constituents and the amount of Q-species is low in comparison.

It is the objective of the present invention to provide improved and optionally $R^{5S}$-functionalized polyalkoxysiloxane materials comprising Q- and T- and optionally M- and D-type functionality within the same macromolecule, as well as cost-effective methods for producing the same and various applications thereof.

SUMMARY OF THE INVENTION

In a first aspect, the present invention is directed to a polymeric liquid polysiloxane material comprising or consisting of:

(i) non-organofunctional Q-type siloxane moieties selected from the group consisting of:

Q1

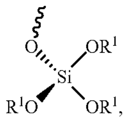

Q2

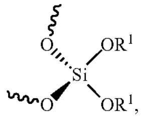

Q3

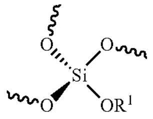

and

Q4

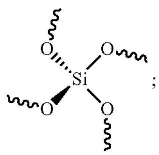

;

(ii) optionally tri-organofunctional $M^1$-type siloxane moieties selected from the group consisting of:

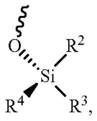

(iii) optionally di-organofunctional D-type siloxane moieties selected from the group consisting of:

D1

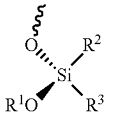

and

D2

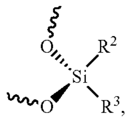

and (iv) mono-organofunctional T-type siloxane moieties selected from the group consisting of:

T1

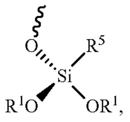

T2

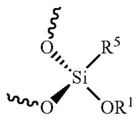

and

T3

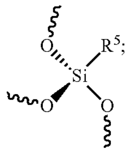

wherein

⌇ indicates a covalent siloxane bond to a silicon atom of another Q-, M-, D- and/or T-type moiety as defined in (i), (ii), (iii) and/or (iv);

$R^1$ is selected from the group consisting of methyl, ethyl, propyl, $—P(═O)(OR^{1'}(OH)$ , $—P(OR^{1'})_2$, $—P(═O)(OH)_2$, optionally methyl and ethyl;

$R^{1'}$ is selected from methyl, ethyl, propyl and butyl;

$R^2$, $R^3$ and $R^4$ are each independently selected from the group consisting of methyl, ethyl, phenyl, cyclohexyl, vinyl, $—CH_2—CH_2—Cl$ and cyclopentadienyl;

$R^5$ is selected from the group consisting of $R^{5U}$ and $R^{5S}$, wherein $R^{5U}$ is selected from the group consisting of methyl, ethyl, n-propyl, isopropyl, n-butyl, t-butyl, linear, branched or cyclic $C_{5-16}$ alkyl residues, optionally linear or branched hexyl, octyl, dodecyl, hexadecyl, (3,3,3-trifluoro)propyl, (1H,1H, 2H, 2H-perfluoro)octyl, (1H,1H, 2H, 2H-perfluoro) dodecyl, (1H,1H, 2H, 2H-perfluoro)hexadecyl, vinyl, phenyl, cyclohexyl, cyclopentadienyl, cyclopentyl,

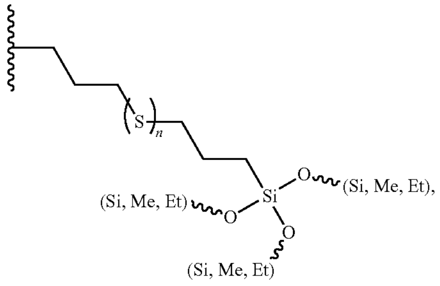

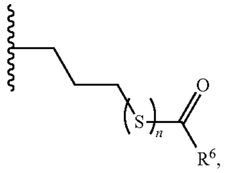

and -L-Z, wherein $R^6$ is selected from the group consisting of methyl, ethyl, n-butyl, linear or branched $C_{5-14}$ alkyl residues, optionally $-(CH_2)_5CH_3$, $-(CH_2)_6CH_3$, $-(CH_2)_7CH_3$, $-(CH_2)_8CH_3$, $-(CH_2)_9CH_3$, $-(CH_2)_{11}CH_3$ and $-(CH_2)_{13}CH_3$;

n is an integer selected from the group consisting of 1, 2, 3, 4 and 5;

L is an aliphatic linker selected from the group consisting of $-CH_2-$, $-CH_2CH_2-$, $-CH_2CH_2CH_2-$, $-C_6H_4-$, $-C_6H_4-CH_2-$, and $-CH_2-CH_2-C_6H_4-CH_2-$; and Z is a moiety selected from the group consisting of Cl, Br, I, —OH, —SH,

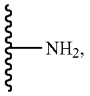 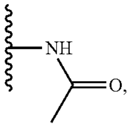 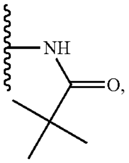

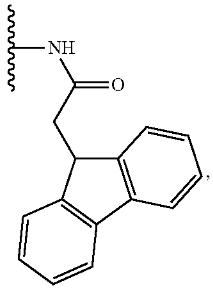 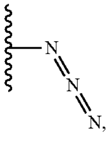 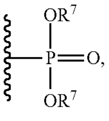

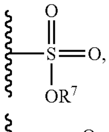 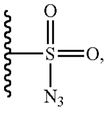 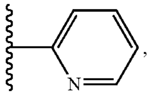 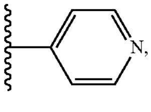

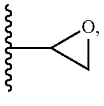 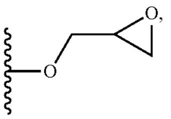 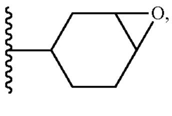

-continued

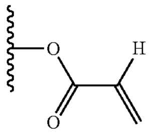 and 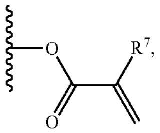

wherein $R^7$ is selected from the group consisting of methyl, ethyl and n-butyl;

$R^{5S}$ is selected from the group consisting of

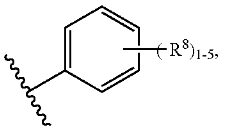 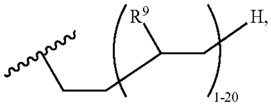

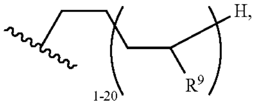

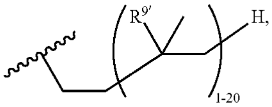

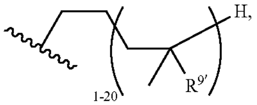

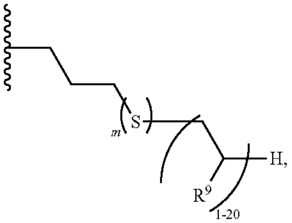

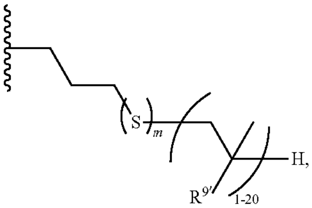

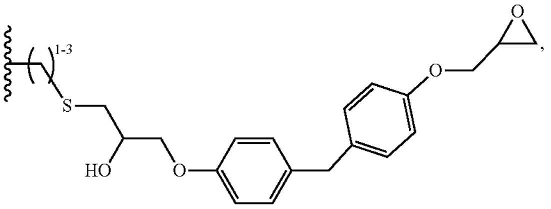

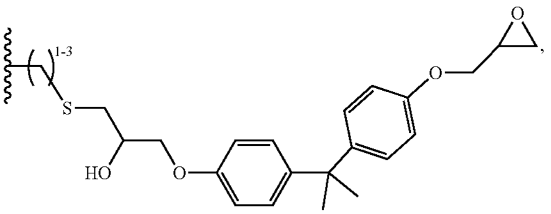

-continued

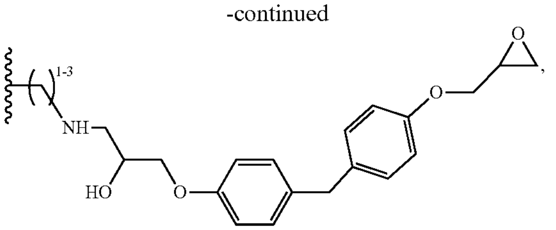

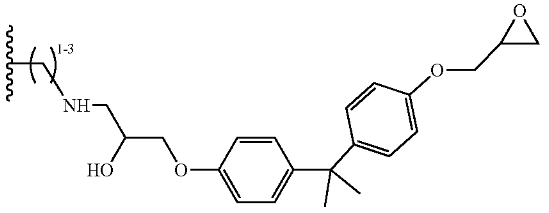

and -L'-Y, wherein m is an integer selected from the group consisting of 1, 2, 3 and 4;

$R^8$ is selected from the group consisting of —Cl, —Br, —I, —F, —CN, —SCN, —$N_3$, —$NO_2$, —OH, —$SO_2OR^{1'}$, and —O—C(═O)$R^{12}$;

$R^9$ is selected from the group consisting of —Cl, —Br, —I, —F, —CN, —COOH, —$COOR^{1'}$, phenyl, o-, m-, and p-vinyl phenyl;

$R^{9'}$ is selected from the group consisting of —COOH and —$COOR^{1'}$;

L' is an aliphatic linker selected from the group consisting of —$CH_2$—, —$CH_2CH_2$—, and —$CH_2CH_2CH_2$—; and Y is a moiety selected from the group consisting of

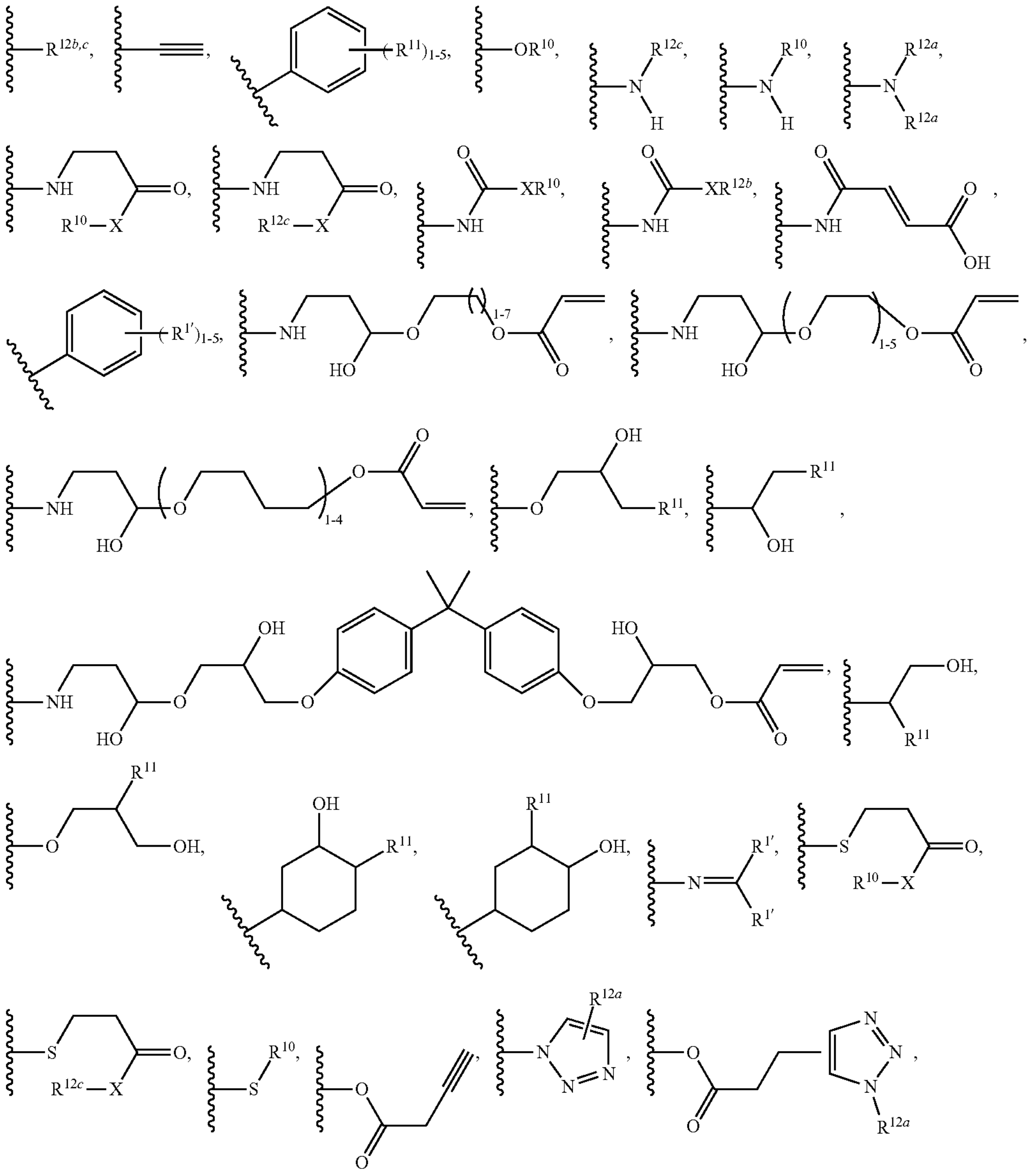

-continued
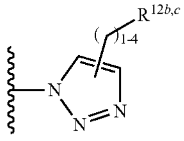
and
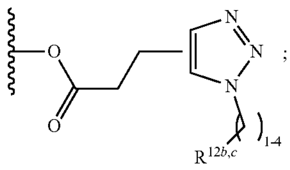
;
wherein
X is absent, —(NH)— or —O—;
$R^{10}$ is selected from the group consisting of
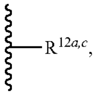
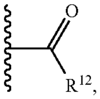
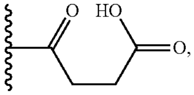
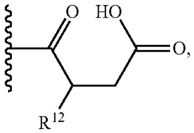
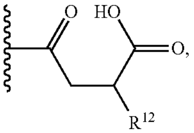
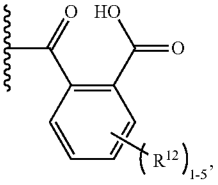
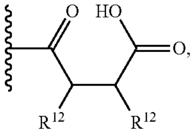
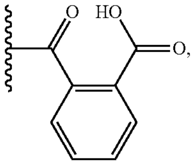
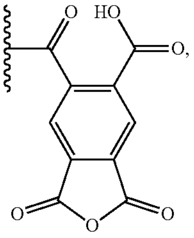
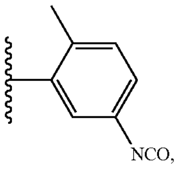
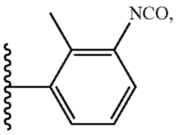
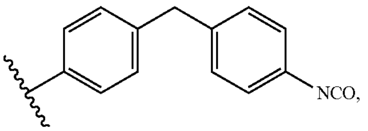
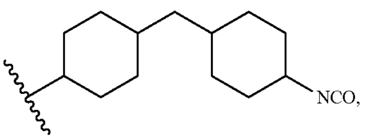
-continued
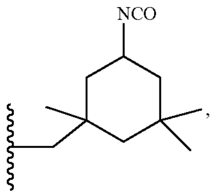
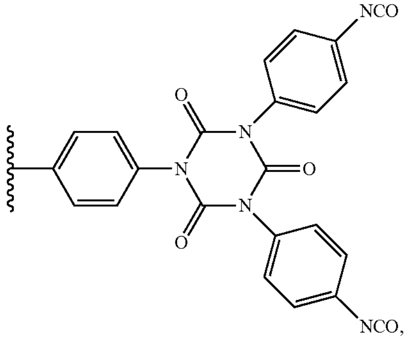
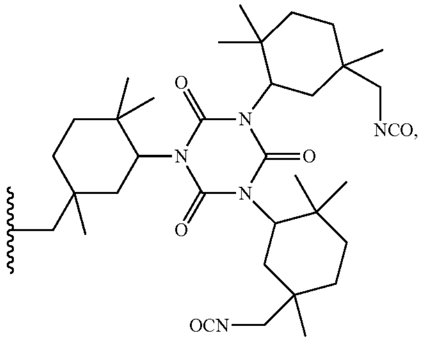
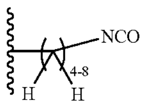
and
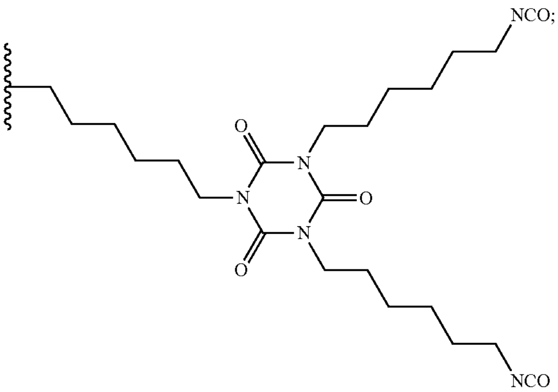

$R^{11}$ is selected from the group consisting of $R^8$, —X—$R^{1'}$ and $R^{12c}$;

$R^{12}$ is selected from the group consisting of $R^{12a}$, $R^{12b}$ and $R^{12c}$, wherein $R^{12a}$ is selected from the group consisting of linear or branched, substituted or non-substituted $C_{1-18}$ alkyl, $C_{2-18}$ alkenyl and $C_{2-18}$ alkynyl;

$R^{12b}$ is selected from the group consisting of linear or branched, substituted or non-substituted alkyl ether, alkenyl ether, alkynyl ether up to a molecular weight of 5000 g/mol, optionally substituted or unsubstituted poly(ethylene oxide), poly(propylene oxide) and polytetrahydrofuran;

unsubstituted polydimethylsiloxane and polydivinylsiloxane; and poly- and oligosaccharides up to a molecular weight of 5000 g/mol, optionally poly D-glucose, Oligo-D-glucose, chitosan, deacetylated oligo-chitin, oligo-beta -D-galactopyranuronic acid, poly alginic acid, oligo-alginic acid, poly amylose, oligo amylose, poly-galactose, and oligo-galactose with a molecular weight up to 5000 g/mol; and $R^{12c}$ is selected from the group consisting of amino acids, oligo- and poly-peptides up to a molecular weight of 5000 g/mol; optionally oligo- and poly-peptides made of naturally occurring amino acids up to a molecular weight of 5000 g/mol; and $C_{12-24}$ fatty acids, optionally naturally occurring $C_{12-24}$ fatty acids, optionally naturally occurring unsaturated fatty acids, optionally $C_{12-24}$ naturally occurring unsaturated fatty acids with 1 to 3 double bonds, optionally epoxidized fatty acids, optionally epoxidized castor oil, soybean oil, sunflower oil, optionally ring opened epoxidized fatty acid based polyols, optionally natural oil based polyols (NOPs), optionally castor oil, soybean oil, or sunflower oil triglycerides.

with the proviso that $R^{5S}$ is not

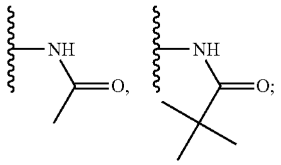

wherein the degree of polymerization of the Q-type alkoxy-terminated moieties $DP_{Q-type}$ is in the range of 1.3 to 2.7;

the degree of polymerization of the D-type alkoxy-terminated siloxane moieties $DP_{D-type}$ is in the range of 1.0 to 1.9;

the degree of polymerization of the T-type alkoxy-terminated siloxane moieties $DP_{T-type}$ is in the range of 0.9 to 2.7, optionally 1.1 to 2.7;

the total content of tri-organofunctional M-type siloxane moieties (iii) in the polysiloxane material does not exceed 15 mol-%, optionally 10 mol-%, optionally does not exceed 5 mol-%;

the total content of di-organofunctional D-type siloxane moieties (iii) in the polysiloxane material does not exceed 5, 10, 20, 30, 35 or 50 mol-%;

the material has a viscosity in the range of 10 to 100'000 cP, optionally about 25 bis 50'000 cP, optionally 10 to 1'000 cP;

the material comprises more than 0.25, 0.5, 1, 2 or 5 mol-% silanol groups (Si—OH);

the atomic ratio of T- to Q-species in the material is in the range of 0.01:1 to 1:1;

0 mol-% or at least 1 mol-%, optionally at least 3 mol-%, optionally at least 5 mol-% optionally at least 7 mol-% of all $R^5$ moieties in the material are $R^{5S}$ moieties;

characterized in that the polysiloxane material comprises more than 45, optionally more than 37, optionally more than 30 or more than 25 mol-% four-membered combined $Q^{2r}$-type and $Q^{3s,d}$-type siloxane ring species relative to the total Q-type siloxane species; and/or the polysiloxane material comprises more than 70, optionally more than 63, optionally more than 56 or more than 50 mol-% four-membered combined $Q^{3s,3d}$-type siloxane ring species relative to all $Q^3$-type siloxane species; and/or the polysiloxane material comprises more than 4.5, optionally more than 4.0, optionally more than 3.5 or more than 3.0 mol-% double four-membered $Q^{3d}$-type siloxane ring species relative to the total Q-type siloxane species; and/or the polysiloxane material comprises more than 25, optionally more than 20, optionally more than 17 or more than 14 mol-% double four-membered $Q^{3d}$-type siloxane ring species relative to all $Q^3$-type siloxane species.

The terminology of a double four membered siloxane ring species and $Q^{2r}$, $Q^{3s}$ as well as $Q^{3d}$ is explained further below.

Optionally, $R^2$, $R^3$ and $R^4$ of the polymeric liquid polysiloxane material described herein are not $—CH_2—CH_2—Cl$ if at least 1 mol-%, optionally at least 3 mol-%, optionally at least 5 mol-% optionally at least 7 mol-% of all $R^5$ moieties in the material are $R^{5S}$ moieties.

For example, the polymeric liquid polysiloxane material described herein for all aspects can be of a core-shell structure, wherein the core is composed of a majority of Q-type moieties and has a different composition than the shell, which is composed primarily of T-type moieties, and optionally further comprises M- and D-type moieties. Herein, the core is also referred to as the "precursor (material)". Alternatively, the polymeric liquid material can also comprise a "core-only" material, meaning that there is no shell and that Q- and T-type moieties are essentially randomly distributed within said core. The term "core-shell", as used herein, is commonly understood in the art (see, e.g., Nanoscale, 2010, 2, 829-843 or Nanoscale, 2011, 3, 5120-5125). Concerning core-shell products, the interface between core and shell must be understood as a diffuse shell rather than a sharp boundary at which composition changes abruptly. This diffuse shell layer architecture, where the concentration of the functional shell species varies over a few bond lengths or Angstroms, is a direct result of the condensation chemistry, that is, the grafting of a functional silane shell onto a preformed polysiloxane core. Because the outer arms of the dendritic polysiloxane core are highly permeable to smaller silane monomers and oligomers, it is clear that the extent of grafting of the shell is highest on the periphery but there is no sharp cutoff. Nevertheless, the term core-shell still applies as grafting in the center of the core is highly hindered for both, steric reasons and reduced availability of reactive alkoxy groups, because the average connectivity (number of bridging oxygen linkages (Si—O—Si bonds) per silicon center) in the center of the core is higher than at the core perimeter. Consequently, the term core-shell will be used in the context of polymeric liquid materials in the sense of a polysiloxane core with a diffuse shell as described herein.

The material can also comprise a double population of lower and higher molecular weight constituents which are separable by means of, e.g. gel permeation chromatography, meaning that the material can contain a population of lower molecular oligomers, typically up to pentamers and a second population with higher molecular weight polysiloxanes with a distribution spanning for example 10-mers to 50-mers.

If $R^5$ comprises silane moieties, the resulting moieties are referred to as "bipodal silanes".

The polysiloxane materials described herein are branched molecular liquids comprising a significant extent of polysiloxane ring species, and in particular four-membered $Q^{2r}$-type and/or $Q^{3s,d}$-type siloxane ring species.

For example, a typical material according to the present invention may also comprise Q-, T-, D- and/or M-type silane monomers ($Q^0$, $T^0$, $D^0$, $M^0$), e.g. in smaller molar quantities compared to the $Q^n$, $T^n$, $D^n$ and Mn, with n≥1, moieties, in other words, the total molar siloxane content must be higher than the total molar silane monomer content, excluding HMDSO which may be present in any amounts, also as a monomer, e.g. also as a solvent or co-solvent. Similarly, the material may contain substantial fractions of smaller oligomers, for example a mixture of oligomers that spans a range from, e.g. dimer to pentamer polysiloxanes, optionally also featuring mixed Q-T and optionally Q-D bonding modes.

The material of the present invention comprises more than 0.25, 0.5, 1, 2 or 5 mol-% silanol groups (Si—OH), this means that the $OR^1$ moieties of Q-, T- or D-type silanes are —OH groups to this extent.

It was surprisingly found that the material described herein can be prepared, e.g. by using a condensation catalyst as described herein, without the need for water and/or any active condensation reagents such as carboxylic acids or acetic anhydride, provided a Q-type precursor featuring a sufficient concentration of silanol species (Si—OH). The M-, D- and/or T-type silanes react with the Q-type precursor or core material's silanol groups with the aid of a condensation catalyst, and optionally under thermal treatment. The condensation or grafting reaction (the terms being used interchangeably herein) of the silanol groups in the presence of the condensation catalyst is sufficient for efficiently adding, i.e. grafting, M-, D- and/or T-type silanes onto the Q-type core material without the need for further chemical reagents such as carboxylic acids, water or acetic anhydride if the Q-type polysiloxane precursor material comprises sufficient amounts of silanol groups, e.g. comprises more than 3, 5, 10, 15 or 20 mol-% silanol groups (Si—OH). Unless specified otherwise, the amount of silanol groups in % is calculated as the total number of silanol (Si—OH) moieties in the material divided by the total number of silicon atoms in the material. A lower limit for total the silanol content can also be quantified from high resolution $^{29}Si$ NMR spectroscopy by analyzing the spectrally separated major component peaks. An exemplary structural formula (2D representation) of such a core material is shown in FIG. 1., where selected typical $R^1$ alkoxy ligand populations can be seen depending on the relative abundance of the monomer or oligomer Q-type starting materials used in the respective precursor preparation and where different combinations of unsubstituted ($R^{5U}$) and substituted ($R^{5S}$) T-type moieties are visible.

Furthermore, a similar structural exemplary representation of a material described herein is shown in FIG. 2, again as a general case with various organofunctional T, D and M functionalities and also as specialized cases with non-identical and simultaneously different unsubstituted ($R^{5U}$) and substituted ($R^{5S}$) T-type functionalities.

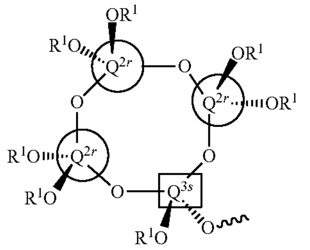

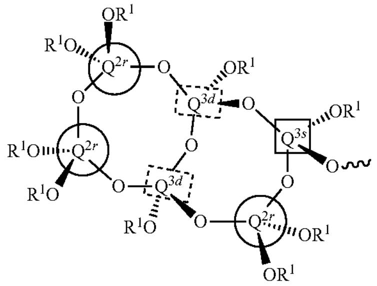

The term "four-membered" ring or polysiloxane ring or Q-type ring species as referred to herein always refers to an ensemble of all $Q^{2r}$ and $Q^{3s,d}$-type moieties comprised in the material which are part of a four membered polysiloxane ring structure. Two representative examples of such typical configurations of moieties in single and double four-membered ring structures are shown in the above formulas. $Q^{2r}$ ring moieties occur in both, "single" and "double" ring structures and comprise two siloxane bonds on each $Q^{2r}$ which are both part of the ring structure and two alkoxy group (—$OR^1$) substituents. In the example on the left of a single four-membered siloxane ring, only $Q^{2r}$ ring (circle) and "single ring" $Q^{3s}$ (square) species are possible. In the second example of two connected four-membered siloxane rings (a bi-cyclic structure) shown on the right, in addition to $Q^{2r}$ ring species (circle) and "single ring" $Q^{3s}$ (square) species, also "double ring" $Q^{3d}$ (rectangle, dashed line) moieties are possible, which are located at the bridge sites connecting the two rings. It is noted that in these $Q^{3d}$ species, all siloxane bonds are part of the double ring network. Also, it is noted that the wiggly lines on the oxygen atoms connected to $Q^{3s}$ moieties represent a siloxane bond to any other possible $Q^n$, $T^n$, $D^n$ or $M^n$ moiety with n≥=1. It must further be understood, that in the above examples, moieties are of Q-type but that these are only examples for assisting the skilled person's understanding but in reality there is no restriction to Q-type moieties. In fact it can be expected that in such four-membered polysiloxane ring structures also T-type and/or D-type moieties can be present.

Herein, $Q^2$ species in any four membered siloxane ring structures are termed "$Q^{2r}$" and "$Q^3$" species in single ring structures and in double ring structures are termed "$Q^{3s}$" and "$Q^{3d}$", respectively.

For quantification purposes, there are different indicators that can be used to define or constrict the above mentioned four membered polysiloxane ring species. A first indicator is to be defined as the total number of $Q^{2r}$ and $Q^{3s,d}$ ring species over the total Q species in the material:

$$\%\ (Q^{2r}\&Q^{3s,d})\text{ ring species} = 100\cdot\Sigma(A_{Q2rings}+A_{Q3rings})/\Sigma(A_{Qn}) = 100\cdot(A_{Q2r}+A_{Q3s}+A_{Q3r})/(A_{Q0}+A_{Q1}+A_{Q2}+A_{Q3}+A_{Q4});$$

A second indicator is to be defined as the total number of $Q^{3s,d}$ ring species over all $Q^3$ species in the material:

$$\%\ (Q^{3s,d})\text{ ring species within } Q^3 = 100\cdot\Sigma(A_{Q3rings})/A_{Q3} = 100\cdot(A_{Q3s}+A_{Q3d})/A_{Q3} = 100(1-(A_{Q3l}/A_{Q3}))$$

A third indicator is to be defined as the total number of $Q^{3d}$ ring species over the total Q species in the material:

$$\%\ (Q^{3d})\text{ ring species} = 100\cdot A_{Q3d}/\Sigma(A_{Qn}) = 100\cdot A_{Q3d}/(A_{Q0}+A_{Q1}+A_{Q2}+A_{Q3}+A_{Q4});$$

A fourth indicator is to be defined as the total number of $Q^{3d}$ ring species over all $Q^3$ species in the material:

$$\%(Q^{3d})\text{ ring species within } Q3=100\cdot A_{Q3c}/A_{Q3};$$

All mol-% numbers described herein — unless specifically mentioned otherwise—are defined by the sum of all D-, M- or T-type silicon atoms divided by the sum of all silicon atoms in the material, e.g. as measured by means of quantitative $^{29}$Si-NMR. The variable A is the spectral peak area as defined further below.

The mol-% of four-membered $Q^2$-type and/or $Q^3$-type siloxane ring species relative to the total Q-type siloxane species can be determined by $^{29}$Si-NMR analysis, as demonstrated below in the examples. The polysiloxane material described herein comprises more than the stated mol-% four-membered ($Q^{2r}$ & $Q^{3s,d}$) and/or ($Q^{2r}$) and/or ($Q^{3s}$ single) and/or ($Q^{3d}$ double) ring species relative to the total Q-type siloxane species. This means that the material comprises either more than the stated mol-% four-membered $Q^{2r}$-type siloxane ring species, more than the stated mol-% four-membered $Q^{3s,d}$-type siloxane ring species and/or more than the stated mol-% four-membered $Q^{2r}$-type and $Q^{3s,d}$-type siloxane ring species, cumulatively. For all embodiments described herein, the four-membered $Q^{3s,d}$-type siloxane ring species includes $Q^{3s,d}$-type siloxane species, wherein one $Q^{3s,d}$-type siloxane is part of one or two four-membered rings.

The atomic ratio of T- to Q-species in the material is the ratio between the silicon atoms of all T-type species ($T^0$, $T^1$, $T^2$ and $T^3$) and the silicon atoms of all Q-type species ($Q^0$, $Q^0$, $Q^2$, $Q^3$ and $Q^4$).

The polymeric liquid polysiloxane material described herein can optionally be $R^{5S}$-functionalized, i.e. at least 1 mol-%, optionally at least 3 mol-%, optionally at least 5 mol-% optionally at least 7 mol-% of all $R^5$ moieties in the material can be $R^{5S}$ moieties, wherein $R^{5S}$ is considered a ($R^{5S}$-)functionalized moiety. The $R^{5S}$-functionalization may be introduced into the polysiloxane material by selecting T-type siloxane or silane moieties which are already $R^{5S}$-functionalized (i.e. are pre-$R^{5S}$-functionalized educts) for the manufacture of the polysiloxane material, i.e. T-type silane or siloxane moieties which comprise $R^{5S}$, e.g. to the extent as defined herein, or alternatively to a lesser extent, i.e. less than 1 mol-%. If the T-type silane or siloxane moieties comprise no or less than 1 mol-% $R^{5S}$ (relative to the total mole number of $R^5$), the T-type siloxane moieties can be $R^{5S}$-functionalized either by functionalizing $R^{5U}$ of grafted T-type siloxane moieties or by grafting further, pre-$R^{5S}$-functionalized T-type silanes comprising $R^{5S}$ moieties. The functionalization of $R^{5U}$ moieties can be done by known chemical methods and is described in the context of the present method. It is noted that the $R^{5S}$-functionalization, as described herein, is a specific form of functionalization, whereas the general term "organofunctional silane or siloxane" refers to a silane/siloxane generally bearing an organic residue directly bound to the silicon atom.

If $R^{5U}$ moieties of grafted T-type siloxanes are functionalized, it is within the scope of the present invention that in cases where some reactivity or comparable reactivity or even no chemical selectivity difference between $R^{5U}$ and $R^2$, $R^3$, $R^4$ substituents can be expected, some, e.g. 5 to 95 mol-% or e.g. 25 to 90% of $R^2$, $R^3$ and/or $R^4$ moieties relative to $R^{5U}$ are functionalized if $R^2$, $R^3$ and/or $R^4$ are selected from $-CH_2-CH_2-Cl$, phenyl and vinyl. The functionalization of $R^2$, $R^3$ and/or $R^4$ moieties may lead to the following exemplary chemical entities:

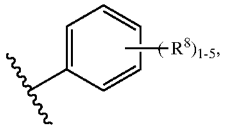
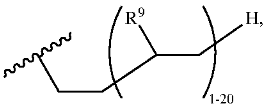
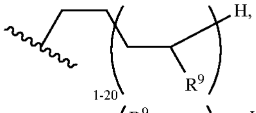
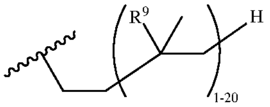
and
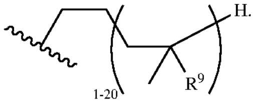

The functionalization of $R^2$, $R^3$, $R^4$ and $R^5$ can be identified and quantified by known spectroscopic means, e.g. by nuclear magnetic resonance spectroscopy, e.g. by $^1$H-, $^{13}$C-, and optionally $^{15}$N or $^{33}$S or $^{31}$P-NMR, optionally with isotope enrichment for analytical verification of functionalization reactions. Specifically, during these types of organic reactions, e.g. addition or substitution or radical reactions, proton and carbon signatures experience a shift in their NMR response due to the change in electronic structure and structural environment and its resulting impact on the magnetic couplings. Typically, a signature from a proton or group of protons or carbon(s) will disappear when such an organic reaction takes place and a new peak appears further up or downfield in the spectrum depending on how the substitution reaction impacted the magnetic couplings of these species in question. Thus, both the disappearance of the old chemical signature and the appearance of the new signature can be followed quantitatively with NMR spectroscopy. Quantitative reaction monitoring of organic reactions is common general knowledge and does not need further description.

The term "non-substituted" as used herein shall mean substituted only with hydrogen. The term "substituted" as used herein, means that any one or more hydrogens on the designated atom or group is replaced, independently, with an atom different from hydrogen, optionally by a halogen, optionally by fluorine, chlorine, bromine, iodine, a thiol, a carboxyl, an acrylato, a cyano, a nitro, an alkyl (optionally $C_1$-$C_{10}$), aryl (optionally phenyl, benzyl or benzoyl), an alkoxy group, a sulfonyl group, by a tertiary or quaternary amine or by a selection from the indicated substituents, provided that the designated atom's normal valence is not exceeded, and that the substitution results in a stable compound, i.e., a compound that can be isolated and characterized using conventional means. Optionally, the substitution occurs on the beta position or the omega (opposite terminal hydrocarbon, if the $R^{5S}$ substituent linkage is through the alpha position) of the hydrocarbon chain or optionally on the alpha or gamma position of the hydrocarbon chain (next or next-next neighboring carbons from substituent attachment carbon). In the case of unsaturated hydrocarbons, the substitution occurs optionally on the beta or omega position of the hydrocarbon chain or optionally on the carbon being part of a double or triple bond or on its directly adjacent carbon.

In the context of the present invention it is understood that antecedent terms such as "linear or branched", "substituted or non-substituted" indicate that each one of the subsequent terms is to be interpreted as being modified by said antecedent term. For example, the scope of the term "linear or branched, substituted or non-substituted alkyl, alkenyl, alkynyl, carbocycle" encompasses linear or branched, substituted or non-substituted alkyl; linear or branched, substituted or non-substituted alkenyl; linear or branched, substituted or non-substituted alkynyl; linear or branched, substituted or non-substituted alkylidene; and linear or branched, substituted or non-substituted carbocycle. For example, the term "$C_{1-18}$ alkyl, $C_{2-18}$ alkenyl and $C_{2-18}$ alkynyl" indicates the group of compounds having 1 or 2 to 18 carbons and alkyl, alkenyl or alkynyl functionality.

The expression "alkyl" refers to a saturated, straight-chain or branched hydrocarbon group that contains the number of carbon items indicated, e.g. linear or branched "($C_{1-18}$) alkyl" denotes a hydrocarbon residue containing from 1 to 18 carbon atoms, e.g. a methyl, ethyl, propyl, iso-propyl, n-butyl, iso-butyl, sec-butyl, tert-butyl, n-pentyl, iso-pentyl, n-hexyl, 2,2-dimethylbutyl, etc.

If an alkyl chain is characterized by a name that allows for linear or branched isomers, all linear or branched isomers are encompassed by that name. For example, "butyl" encompasses n-butyl, iso-butyl, sec-butyl and tert-butyl.

The expression "alkenyl" refers to an at least partially unsaturated, substituted or non-substituted straight-chain or branched hydrocarbon group that contains the number of carbon atoms indicated, e.g. "($C_{2-18}$)alkenyl" denotes a hydrocarbon residue containing from 2 to 18 carbon atoms, for example an ethenyl (vinyl), propenyl (allyl), iso-propenyl, butenyl, iso-prenyl or hex-2-enyl group, or, for example, a hydrocarbon group comprising a methylene chain interrupted by one double bond as, for example, found in monounsaturated fatty acids or a hydrocarbon group comprising methylene-interrupted polyenes, e.g. hydrocarbon groups comprising two or more of the following structural unit —[CH═CH—$CH_2$]—, as, for example, found in polyunsaturated fatty acids.

The expression "alkynyl" refers to at least partially unsaturated, substituted or non-substituted straight-chain or branched hydrocarbon groups that may contain, e.g. from 2 to 18 carbon atoms, for example an ethinyl, propinyl, butinyl, acetylenyl, or propargyl group.

The expressions "alkyl ether" refers to a saturated or non-saturated, straight-chain or branched hydrocarbon group that contains the number of atoms that result in a molecular weight of up to 5000 g/mol. Alkyl ether groups as used herein, shall be understood to mean any linear or branched, substituted or non-substituted alkyl chain comprising an oxygen atom as an ether motif, i.e. an oxygen bound by two methylene groups. Exemplary alkyl ethers are poly-ethylene glycol (PEG), poly(propylene oxide), polypropylene glycol (PPG) and polytetrahydrofuran chains. The ether residue is attached to the Formula provided in the present invention via the oxygen atom of the ether residue. Optionally, if the ether residue is substituted at a carbon atom with a nucleophilic substituent, e.g. an amine or a thiol, the ether residue can be attached to the Formula provided in the present invention via the nucleophilic substituent.

As used herein, a wording defining the limits of a range of length such as, e. g., "from 1 to 5" or "($C_{1-5}$)" means any integer from 1 to 5, i.e. 1, 2, 3, 4 and 5. In other words, any range defined by two integers explicitly mentioned is meant to comprise and disclose any integer defining said limits and any integer comprised in said range.

The scope of the present invention includes those analogs of the compounds as described above and in the claims that feature the exchange of one or more carbon-bonded hydrogens, optionally one or more aromatic carbon-bonded hydrogens, with halogen atoms such as F, Cl, or Br, optionally F.

If a residue or group described herein is characterized in having two further residues of the same name, e.g. in $R^{10}$ being

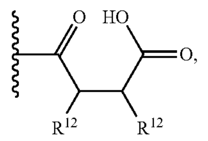

each of these further residues (in this example $R^{12}$) can be independently selected from the definitions of this residue (in this example $R^{12}$) given herein.

The skilled person is aware that any combination of $R^{1'}$, $R^8$, $R^9$, $R^{9'}$, L', Y, X, $R^{10}$, $R_{11}$ and $R^{12}$ for forming $R^{5S}$ must lead to a stable compound, i.e., a compound that can be isolated and characterized using conventional means. The skilled person can determine from his common general knowledge which compound, i.e. combination of $R^{1'}$, $R^8$, $R^9$, $R^{9'}$, L', Y, X, $R^{10}$, $R_{11}$ and $R^{12}$ is not stable and specifically which linker chemistries are possible and do not interfere with other chemical functionalities in the polymeric liquid material. Any combination of $R^{1'}$, $R^8$, $R^9$, $R^{9'}$, L', Y, X, $R^{10}$, $R_{11}$ and $R_{12}$ that would result in a not stable compound is excluded from the scope of the claims.

For example, poly- and oligosaccharides in the context of $R^{12b}$ are connected to the respective moiety (e.g. to $R^8$, Y, $R^{10}$, or $R^{11}$)) via an oxygen atom or optionally via a nitrogen atom (e.g. chitosan).

For example, amino acids, oligo- or polypeptides in the context of $R^{12c}$ are connected to the respective moiety (e.g. to $R^8$, Y, $R^{10}$, or $R^{11}$) via their amine or via the carbonyl carbon or optionally via a thiol (e.g. in the case of cysteine containing $R^{12b}$).

Fatty acids in the context of $R^{12c}$ are, for example, connected to o the respective moiety (e.g. to $R^8$, Y, $R^{10}$, or $R^{11}$) via a hydroxyl group (e.g. for castor oil) or via the carboxylic acid functionality or optionally for unsaturated fatty acids through the double bond group(s), e.g. via radical polymerization chemistry.

Triglycerides or polyols derived from fatty acids by epoxidation and ring opening with for example an alkali hydroxide base can also be connected via the hydroxyl functionality, either directly by means of ether linkages or esterification or optionally by secondary substitution e.g. by brominating or oxidation to the ketone and e.g. subsequent further substitution or optionally by reaction with isocyanate terminated $R^{5S}$ groups.

In an embodiment, the polymeric liquid hyperbranched polysiloxane material according to the present invention is one, wherein at least 1 mol-%, optionally at least 3 mol-%, optionally at least 5 mol-% optionally at least 7 mol-% of all $R^5$ moieties in the material are $R^{5S}$ moieties;

$R^8$ is selected from the group consisting of —Cl, —Br, —I, —CN, —SCN, —$N_3$, —$NO_2$, —$SO_2OR^{1'}$, and —O—C(═O)$R^{1'}$;

Y is selected from the group consisting of $R^{10}$ is selected from the group consisting of

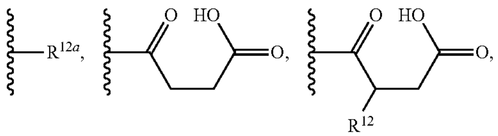

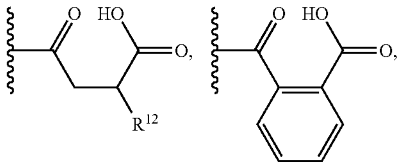

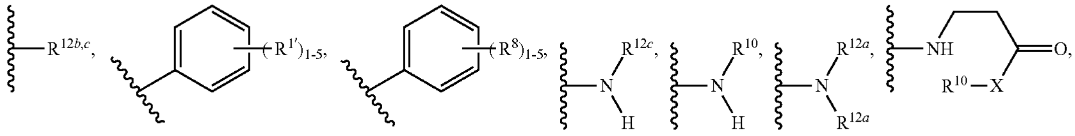

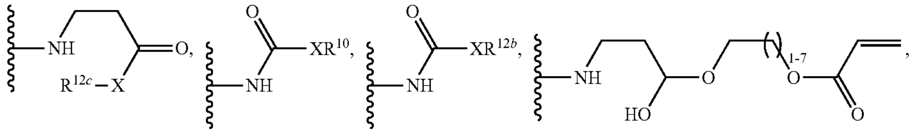

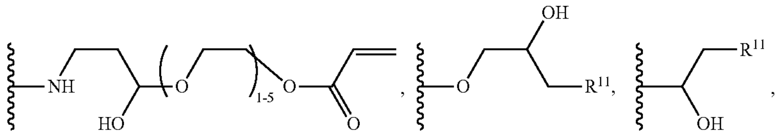

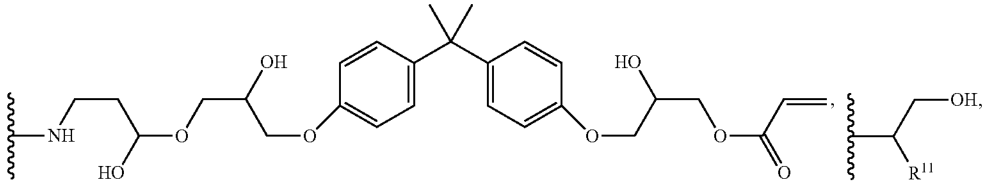

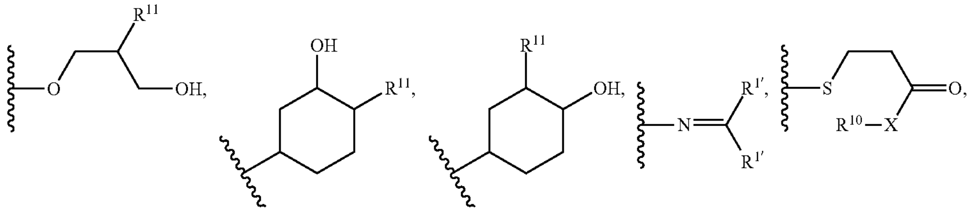

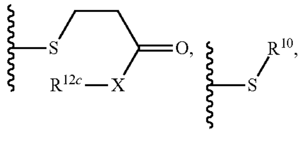

and

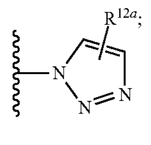

-continued

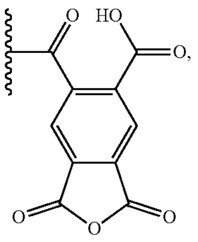

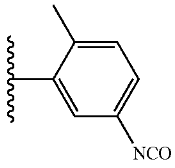

,

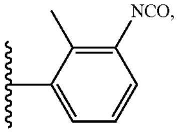

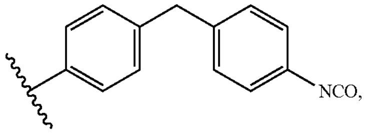

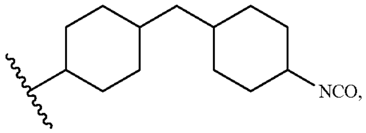

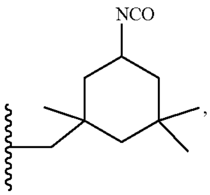

,

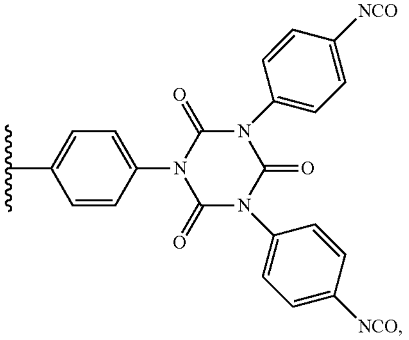

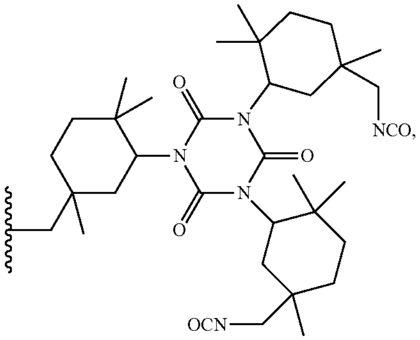

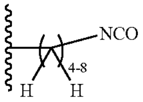

and

-continued

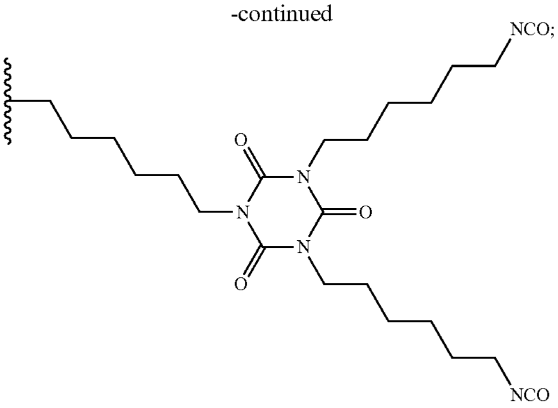

$R^{11}$ is selected from $R^8$ and optionally $R^{12c}$ ; and $R^{12}$ is selected from the group consisting of $R_{12a}$, $R_{12b}$, $R_{12c}$, wherein $R^{12a}$ is selected from the group consisting of linear or branched, substituted or non-substituted $C_{1-18}$ alkyl, or $C_{2-18}$ alkenyl;

$R^{12b}$ is selected from the group consisting of linear or branched, non-substituted or terminally amino- or thiol-substituted alkyl or alkenyl ethers up to a molecular weight of 3000 g/mol, optionally terminally amino- or thiol-substituted or unsubstituted poly(ethylene oxide), poly(propylene oxide) and polytetrahydrofuran;

poly- or oligosaccharides up to a molecular weight of 3000 g/mol, optionally Poly D-glucose, Oligo-D-glucose, chitosan, deacetylated oligo-chitin, oligo-beta-D -galactopyranuronic acid, Poly alginic acid, oligo-alginic acid, poly amylose, oligo amylose, poly-galactose, oligo-galactose with a molecular weight up to 3000 g/mol; and optionally unsubstituted polydimethylsiloxane or polydivinylsiloxane; and $R^{12c}$ is selected from the group consisting of amino acids and oligo- or poly-peptides up to a molecular weight of 3000 g/mol; optionally oligo- and poly-peptides made of naturally occurring amino acids up to a molecular weight of 3000 g/mol; and $C_{12-24}$ fatty acids, optionally naturally occurring $C_{12-24}$ fatty acids, optionally naturally occurring unsaturated fatty acids, optionally $C_{12-24}$ naturally occurring unsaturated fatty acids with 1 to 3 double bonds, optionally epoxidized fatty acids, optionally epoxidized castor oil, soybean oil, sunflower oil, optionally ring opened epoxidized fatty acid based polyols, optionally natural oil based polyols (NOPs) optionally castor oil, soybean oil, or sunflower oil triglycerides.

In an embodiment, the polymeric liquid hyperbranched polysiloxane material according to the present invention is one, wherein $R^8$ is selected from the group consisting of —Cl, —Br, —I, —CN, —SCN, —$N_3$, —$NO_2$, —$SO_2OR^{1'}$, and —O—C(=O)$R^{1'}$;

Y is selected from the group consisting of

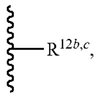

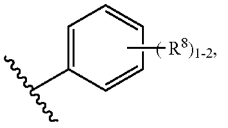

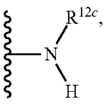

-continued

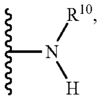 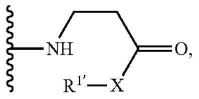 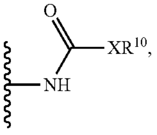

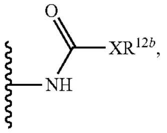

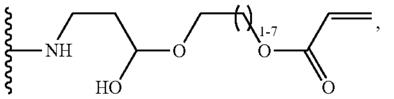

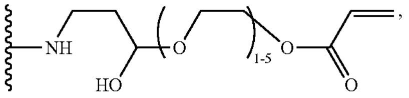

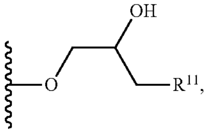 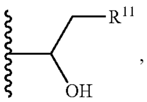

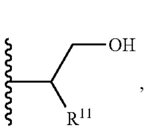 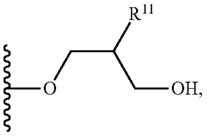

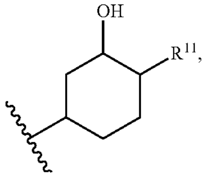 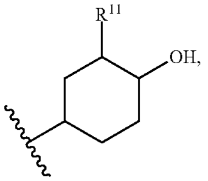

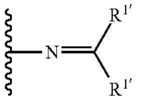 and 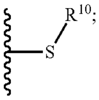

$R^{10}$ is selected from the group consisting of

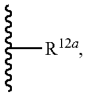 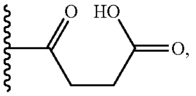 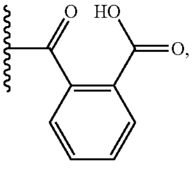

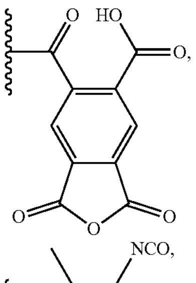 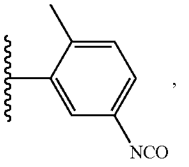

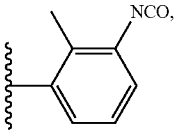

-continued

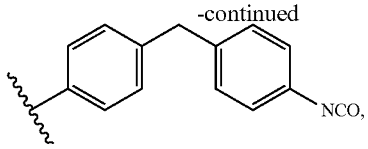

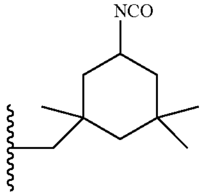 and 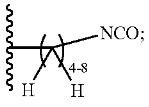

$R^{11}$ is selected from $R^8$ and optionally $R^{12c}$; and $R^{12}$ is selected from the group consisting of $R^{12a}$, $R^{12b}$, $R^{12c}$, wherein $R^{12a}$ is selected from the group consisting of linear or branched, substituted or non-substituted C1-12 alkyl and C2_12 alkenyl;

$R^{12b}$ is selected from the group consisting of linear, non-substituted or terminally amino-substituted alkyl ethers up to a molecular weight of 2000 g/mol, optionally non-substituted or terminally amino-substituted poly(ethylene oxide) and poly(propylene oxide); and poly- or oligosaccharides up to a molecular weight of 2000 g/mol, optionally poly-D-glucose, oligo-D-glucose, chitosan, deacetylated oligo-chitin and oligo-beta-D-galactopyranuronic acid; and $R^{12c}$ is selected from the group consisting of amino acids and oligo- or poly-peptides up to a molecular weight of 2000 g/ made of naturally occurring amino acids;

castor oil, soybean oil, and sunflower oil triglycerides; and naturally occurring $C_{12-24}$ fatty acids, optionally naturally occurring $C_{12-24}$ unsaturated fatty acids with 1 to 3 double bonds.

In an embodiment, the polymeric liquid hyperbranched polysiloxane material of the present invention is one, wherein the material comprises (v) at least two non-identically $R^5$-substituted mono-organofunctional T-type alkoxy-terminated siloxane populations, each population making up at least 3 mol-% of all mono-organofunctional T-type moieties in the material; and/or (vi) chiral mono-organofunctional $T^1$-type moieties in an amount of at least 3 mol-% relative to all mono-organofunctional T-type moieties in the material.

The term "population", as used herein, refers to a collection of moieties or a given organofunctional T-Type or D-type or, optionally M-Type moiety in the polymeric material. As an example, grafting or heterocondensation of two dissimilar T-type trialkoxysilanes such as vinyltrimethoxysilane and methyltriethoxysilane as two randomly chosen examples onto a Q-type polysiloxane precursor leads to two distinct populations ($T^0$=unreacted monomer), $T^1$, $T^2$ and $T^3$ bearing -methyl and -vinyl as organofunctional $R^5$ substituents, respectively, which can be resolved in a $^{29}$Si-NMR spectrum because of the $R^5$ substituent effect on the respective T-type central Si atom.

The first condition (v) shall be understood in the sense that the material comprises at least two populations of mono-organofunctional (T-type) alkoxy terminated siloxane moieties ($T^1$, $T^2$, $T^3$) which differ by their organofunctional substituent $R^5$. This means that the material features at least two different $R^5$ functionalities and that the minority species is present in a detectable amount (e.g. by $^{29}$Si-NMR).

The second condition (vi) is met by a $T^1$-type grafted siloxane moiety having four different substituents on its silicon atom, namely one Si—O—Si bond, one Si—C bond linking to the $R^5$ organofunctional group, and two different alkoxy substituents $R^1$, e.g. one ethoxy and one methoxy. This occurs already when only one population of $R^5$-functionalized T-type species is present in the material. Generally, non-identical $R^1$ alkoxy-groups can ligand-exchange among Q-type and T-type moieties.

In another embodiment, the polymeric liquid hyperbranched polysiloxane material according to the present invention is one, wherein (vii) the degree of polymerization of the Q-type alkoxy-terminated moieties $DP_{Q\text{-}type}$ is in the range of 1.5 to 2.5;

(viii) the degree of polymerization of the D-type alkoxy-terminated siloxane moieties $DP_{D\text{-}type}$ is in the range of 1.25 to 1.75; and/or (ix) the degree of polymerization of the T-type alkoxy-terminated siloxane moieties $DP_{T\text{-}type}$ is in the range of 1.2 to 2.2, optionally 1.3 to 2.2;

The degree of polymerization DP for any non-crystalline silicon oxide material (for the polysiloxane material and for the corresponding methods and uses described herein) is defined here as the ratio of bridging oxygens BO (# of Si—O—Si bonds) to the total number of metal atoms $Si_{tot}$ in the system.

The term "alkoxy-terminated" for the Q-, T- and D-type siloxane moieties is understood to refer to the residual substituents of said moieties which are essentially alkoxy groups, because the polymeric liquid material is derived from alkoxy (ethoxy/methoxy) containing silane precursors in monomeric or oligomeric form. This implies that for a $Q^0$ monomer and $Q^1$, $Q^2$, $Q^3$ and $Q^4$ moiety, said "alkoxy termination" is comprised of 4, 3, 2, 1 and 0 alkoxy groups, respectively, and for a $T^0$ monomer and $T^1$, $T^2$ and $T^3$ moiety, said "alkoxy termination" is comprised of 3, 2, 1 and 0 alkoxy groups, respectively. Analogously, for a $D^0$ monomer and $D^1$ and $D^2$ moiety, said " alkoxy termination" is comprised of 2, 1 and 0 alkoxy groups, respectively.

$DP_{Q\text{-}type}$, $DP_{T\text{-}type}$ and $DP_{D\text{-}type}$ of the material can be directly obtained from quantitative $^{29}$Si-NMR data according to:

$$DP_{Q\text{-}type}=\Sigma(n\ A_{Qn})/\Sigma(A_{Qn})=(A_{Q1}+2\ A_{Q2}+3\ A_{Q3}+4\ A_{Q4})/(A_{Q0}+A_{Q1}+A_{Q2}+A_{Q3}+A_{Q4});$$

$$DP_{T\text{-}type}=\Sigma(n\ A_{Tn})/\Sigma(A_{Tn})=(A_{T1}+2\ A_{T2}+3\ A_{T3})/(A_{T0}+A_{T1}+A_{T2}+A_{T3})$$ for general T-type silanes;

$$DP_{T\text{-}type,\ bipodal\ silanes}=2\bullet\Sigma(n\ A_{Tn})/\Sigma(A_{Tn})=2(A_{T1}+2\ A_{T2}+3\ A_{T3})/(A_{T0}+A_{T1}+A_{T2}+A_{T3})$$ for bipodal T-type silanes; and $$DP_{D\text{-}type}=\Sigma(n\ A_{Dn})/\Sigma(A_{Dn})=(A_{D1}+2\ A_{D2})/(A_{D0}+A_{D1}+A_{D2}).$$

In the above equation for $DP_{Q\text{-}type}$, the terms $A_{Qn}$ denote the quantitative $^{29}$Si-NMR peak area related to that $Q^n$ moiety (spectral signature), which is a Si atom coordinated by n siloxane bonds through bridging oxygen (BO) atoms, that connect it to its next-nearest-neighbor Si atoms and (4-n) non-bridging oxygen (NBO) atoms which are linked to terminal alkoxy groups Si—OR as defined herein. Analogously, $A_{Tn}$ and $A_{Dn}$ denote the $^{29}$Si-NMR peak areas corresponding to the respective T-type and D-type moieties (spectral signatures).

For the above definition of DP, $Q^2$ and $Q^3$ refer to all types of $Q^2$ and $Q^3$ species, including linear and single ring as well as double ring species.

Regarding the equation for $DP_{T\text{-}type}$ it is necessary to differentiate between the class of bipodal T-type silanes and all the other, "general" T-type silanes. The latter constitute the majority of commercially available T-type silanes and comprise only a single Si atom connected to three alkoxy and one organofunctional group. In contrast, bipodal silanes, which can be represented as $(RO)_3SH—(CH_2)—X—(CH_2)—Si(OR)_3$ contain a further trialkoxysilyl unit attached to the first one through a suitable linker group "X" and each spaced by at least one methylene ($—CH_2—$) group. The introduction of a modified definition for the degree of polymerization of bipodal silanes takes into account that a single connectivity to the polysiloxane network is sufficient to covalently attach the functional group and develop its targeted interface functionality. For example, simultaneous grafting through both trimethoxysilyl residues of a bipodal silane is counterproductive in a sense that it quickly leads to branching and attachment from one macromolecule to another, leading to unwanted gelation even at low surface coverage of dipodal T-type silanes. Hence it makes more sense to reference $DP_{T\text{-}type,\ bipodal\ silanes}$ in terms of single trialkoxysilyl-attachment modality, leading to the definition given above.

For organofunctional T type tri- and D-type di-alkoxysilanes, the $^{29}$Si spectral fingerprint regions are shifted progressively further downfield allowing a clear separation of the different non-organofunctional $Q^n$ from organofunctional $T^m$ and $D^l$ moieties as seen in FIG. 9. FIG. 9 shows a $^{29}$Si NMR spectrum of a material containing M, D, T and Q-Type moieties in one material with the respective labelling. Analogously, FIG. 8 shows a $^{29}$Si NMR spectrum of a material containing M, T and Q-Type moieties in one material.

Optionally, the total silicon to free hydrolysable alkoxy molar ratio in the material described herein is in the range of 1:1.0 to 1:3.0, optionally 1:1.2 to 1:2.5, optionally 1:1.3 to 1:2.2 if the total content of di-organofunctional D-type siloxane moieties (iii) in the polysiloxane material does not exceed 10 mol-%.

Optionally, the molar number of ethoxy terminating units ($—OCH_2CH_3$) in the material described herein is at least twice the number of methoxy terminating units ($—OCH_3$) and the material is essentially free of propoxy terminating units ($—OCH_2CH_2CH_3$), e.g. less than 3% of all alkoxy terminating units are propoxy terminating units.

Optionally, the molar number of methoxy terminating units ($—OCH_3$) in the material described herein is at least twice the number of ethoxy terminating units ($—OCH_2CH_3$) and the material is essentially free of propoxy terminating units ($—OCH_2CH_2CH_3$), e.g. less than 3% of all alkoxy terminating units are propoxy terminating units.

For any polymeric liquid material described herein, there exist different modes of interconnections, namely i) siloxane bonds with two Q-type partners (Q-Q homocondensation), ii) siloxane bonds with two T-type partners (T-T homocondensation), iii) siloxane bonds with two D-type partners (D-D homocondensation), and iii) Siloxane bonds with non-identical partners (Q-T, Q-D, T-D, Q-M, T-M, D-M heterocondensation).

The concept of heterocondensation applies to bonding states of both, statistical mixtures in core-only as well as in core-shell materials, respectively, and is exemplified in the equation below for Q-T-type siloxane bonding (i.e. grafting). In a first example of Q-T siloxane grafting silanol groups present in the material can react with a T0 monomer or oligomer (alcohol condensation):

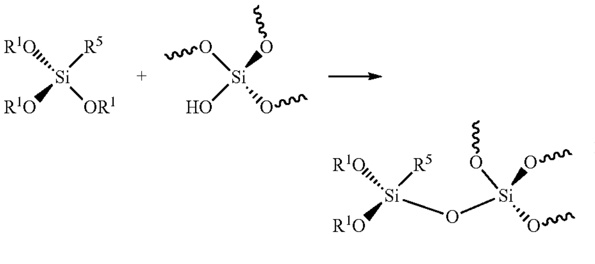

In a second example, the silanol groups can be generated in situ by reaction with water also leading to the formation of siloxane bond formation:

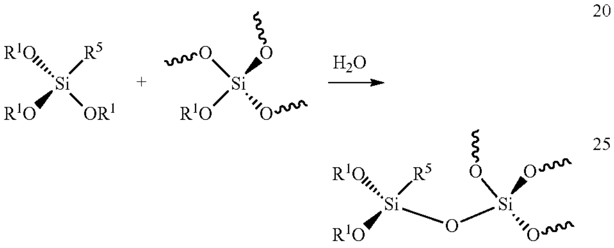

In the current invention, the relative contribution of silanol- or water-induced condensation are carefully controlled in order to produce the desired materials without formation of substantial particulate and/or precipitate fractions.

In the above example of a Q-T heterocondensation, the organofunctional trialkoxysilane is converted from $T^0$ to $T^1$ while the Q-type alkoxysilane on the left-hand side of the reaction (symbolized by the three wavy siloxane bonds) from $Q^3$ to $Q^4$, illustrating that each siloxane bond formed simultaneously increases $DP_{Q\text{-}type}$ and $DP_{T\text{-}type}$. There are obviously all sorts of other combinations of possible grafting reactions e.g. a $T^2$ species grafting onto a $Q^2$ yielding $T^3$ and $Q^3$, respectively, or $T^1$ species grafting onto a $Q^2$ yielding $T^2$ and $Q^3$ and similar combinations involving D-Type dialkoxysiloxane moieties.

$DP_{Q\text{-}type}$, $DP_{T\text{-}type}$ and $DP_{D\text{-}type}$ are the primary parameters that define the polymeric liquid material described herein, together with the atomic ratio of T-type to Q-type and, optionally, the total molar content of D-type species in the material. These parameters can all be determined from quantitative $^{29}$Si-NMR spectroscopy data with the special provisions given above for the calculation of $DP_{T\text{-}type}$ for bipodal silanes.

For materials comprising more than one T-type subgroup with non-identical $R^5$ organofunctional substituents, the quantification of those two T-type chemical species within the material can be done either directly from quantitative analysis of $^{29}$Si-NMR spectra, if the T-type moieties belonging to the two non-identical $R^5$ subgroups within the T-spectral window can be sufficiently resolved. The spectral separation of non-identically $R^5$-substituted T-type populations is shown for the example containing unsubstituted $R^{5U,1}$=methyl (M) and $R^{5U,2}$ vinyl bearing T-type moieties and $R^1$=Et (FIG. 7). Alternatively, e.g. when both methoxy/ethoxy $R^1$ groups are present in the material, non-identical $R^5$ bearing T-type subgroups can be analyzed independently by means of $^1$H- or $^{13}$C-NMR data, e.g. with fewer resolution restrictions compared to $^{29}$Si-NMR data.

Other parameters that define the polymeric liquid material described herein can be measured using standard analytical tools: The content of hydroxy groups in the material can be determined, e.g., using $^{29}$Si- and/or $^1$H-NMR spectroscopy and Karl Fischer titration. The molar ratio of ethoxy and methoxy terminal alkoxy units in the material are directly accessible from $^{13}$C-NMR and independently from $^{29}$Si-NMR data. The characterization of the reaction products in terms of viscosity is readily analyzed by means of standardized viscosity measurements such as a cylindrical rotation viscometer according to, e.g., ASTM E2975-15: "Standard Test Method for Calibration of Concentric Cylinder Rotational Viscometers". Other viscosity test methods are also possible such as, e.g., Staudinger-type capillary viscometers or modern, dynamic viscometry methods.

In a further embodiment, the polymeric liquid hyperbranched polysiloxane material according to the present invention is one, wherein the total content of di-organofunctional D-type siloxane and/or the total content tri-organofunctional M-type siloxane moieties is zero.

In another embodiment, the polymeric liquid hyperbranched polysiloxane material according to the present invention is one, wherein the mono-organofunctional T-type siloxane moieties comprise (x) a first population of mono-organofunctional T-type alkoxy-terminated siloxane moieties, wherein $R^5$ is selected from the group consisting of methyl, ethyl, n-propyl, isopropyl, n-butyl, t-butyl, hexyl, octyl, dodecyl, hexadecyl, (3,3,3-trifluoro), propyl, (1H,1H, 2H, 2H-perfluoro)octyl, (1H,1H, 2H, 2H-perfluoro) dodecyl and (1H,1H, 2H, 2H-perfluoro)hexadecyl, and either (xi) a second population of mono-organofunctional T-type alkoxy-terminated siloxane moieties, wherein $R^5$ is selected from the group consisting of methyl, ethyl, n-propyl, isopropyl, n-butyl, t-butyl, hexyl, octyl, dodecyl, hexadecyl, (3,3,3-trifluoro)propyl, (1H,1H, 2H, 2H-perfluoro)octyl, (1H,1H, 2H, 2H-perfluoro) dodecyl and (1H,1H, 2H, 2H-perfluoro)hexadecyl, wherein the $R^5$ groups of the first and second populations are not identical, (xii) mono-organofunctional T-type alkoxy-terminated siloxane moieties, wherein $R^5$ is L-Z, vinyl,

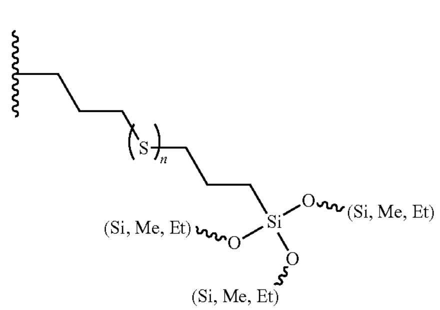

or

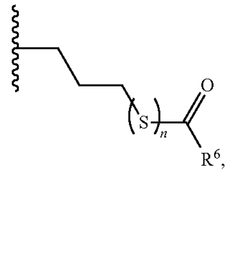

, or (xiii) mono-organofunctional T-type alkoxy-terminated siloxane moieties, wherein $R^5$ is $R^{5S}$.

This embodiment is directed to a tailorable hydrophobic material for the combination of (x) and (xi) and a mixed hydrophobic/functional material for the combination of (x) and (xii).

For example by combining (x) and (xi), a polymeric liquid material can be created by using multiple hydrophobic $R^5$-organofunctional T-type moieties, which allows to control steric accessibility and hydrophobic properties of the material and thus its solubility and compatibility with polymers, solvents, inorganic and hybrid phases alike. This allows, e.g., tailoring of the polymeric liquid material to virtually any application specific formulation with a degree of freedom not attainable by today's commercial silane monomer and prehydrolysate systems.

For example, the combination of (x) and (xii) or (xiii), the combination of $R^5$ moieties bearing both hydrophobic properties and specific functionalities (see feature (xii)) then allows tailoring of the overall compatibility with an application-specific matrix while also introducing further chemical connectivity options. For example, a material exhibiting both hydrophobic $R^5$ selected from feature (x) while simultaneously bearing radical polymerizable groups such as methacrylate groups (selected from feature (xii)) could then control its interaction/compatibility through the hydrophobic component and its radical crosslinking reactivity essentially independently through the loading of said methacrylate component. The division of application-relevant system compatibility by selecting of a first type and loading of hydrophobic $R^5$ functionality and the selection of a second $R^5$ group to introduce a specific chemical function is expected to greatly improve performance and cost effectiveness of silane and siloxane technology. The advantage of this approach seems to further benefit from a core-shell type architecture, while different combinations are possible and could individually be selected depending on the application:

$R^5$ being as defined in feature (xii) within the core with a hydrophobic T-type siloxane (feature x) forming a shell, thus combining system compatibility with the ability to incorporate specific functions in the core.

Hydrophobic (feature (x)) and functional (feature (xii)) $R^5$ moieties both present in a shell, creating an interplay between hydrophobic/matrix compatibility tailoring and functional group density and activity.

Hydrophobic (feature (x)) moieties distributed inside the core and functional (feature (xii)) moieties in the shell.

Additional combinations involving $R^{5S}$ (feature (xiii)).

In another embodiment, the polymeric liquid hyperbranched polysiloxane material according to the present invention is one, wherein the relative atomic ratio of T- to Q-species is in the range of 0.02:1 to 0.75:1, optionally in the range of 0.03:1 to 0.5:1.

For example, the polymeric liquid materials according to the present invention comprise free silanol species (Si—OH) without significantly reducing the stability or bench-life of the materials. Yet, in practical applications, they can be used "as is" in non-polar organic solvents, blends etc. or directly incorporated into hydrophobic matrices such as polymer melts. Specifically, their molar silanol content with respect to the total number of Si atoms present in the material is more than about 0.25, 0.5, 1, 2 or 5 mol-%. Despite the presence of some silanol groups, the material generally features, e.g., improved stability and shelf life over conventional sol-gel (e.g. hydrolytically prepared) based hybrid materials and substantially more structural control. It is believed that the steric crowding of the higher molecular weight polysiloxane fraction leads to a "screening effect" that effectively prevents free silanol groups to come into contact with and react with neighboring molecules. Particularly, silanol groups in the center of a "core" polysiloxane macromolecule are kinetically stabilized, as arms and entangling side chains effectively slow down access to and reactions with other neighboring molecules. It appears that in this way aggregation and gelation of such macromolecular systems at ambient temperatures can be effectively suppressed and good shelf-life stability can be obtained. The extent of such a stabilization of silanol containing polysiloxanes likely, and without wishing to be bound by theory, depends on a number of factors namely the amount of silanol groups in the material, the degree of polymerization $DP_{Qtype}$ (and probably to a lesser extent $DP_{T\text{-}type}$), the type and concentration of condensation catalyst(s) present in the material as well as the type of $R^5$ substituents present in the T-type organofunctional population(s).

In another aspect, the present invention is directed to a hydrolysis product obtainable by reacting at least one polymeric liquid material described herein with a predetermined amount of water or with a predetermined amount of a water-solvent mixture, optionally in the presence of at least one surfactant.

The predetermined amount of water or water-solvent mixture for hydrolysis or for emulsifying is determined, e.g. by the molar amount of water to total molar amount of Si in the system confined in typical formulations by upper and lower bound limits. A lower bound value defining the water to total Si molar ratio can be 0.02:1, optionally 0.1 :1 or 0.5:1. An upper bound value defining the water to total Si molar ratio can be 5'000:1, optionally 500:1 or 50:1. The amount of cosolvent can be chosen independently and technically without limitation imposed by the water to Si molar ratios.

For example, solvents for hydrolysis can be selected from the group consisting of water-soluble organic solvents such as low-molecular weight alcohols, ethers, carboxylic acids, e.g.:

alcohols of formula $R_x$—OH with $R_x$ being selected from the group consisting of $—CH_3$, $—C_2H_5$, $—C_3H_7$, $—C_4H_9$, $—C_5H_{11}$, and $—C_6H_{13}$;

ketones of formula $R_x$,$R_y$—(C═O) with $R_x$,$R_y$ independently selected from the group consisting of $—CH_3$, $—C_2H_5$, and $—C_3H_7$;

carboxylic acids of formula $R_x$—COOH with $R_x$ being selected from the group consisting of $—CH_3$, $—C_2H_5$, $—C_3H_7$, $—C_4H_9$, $—C_5H_{11}$, and $—C_6H_{13}$;

low-molecular weight organic esters such as ethyl acetate, methyl acetate or ethyl formate, methyl formate; and/or ethers of formula $R_x$—O—$R_y$ with $R_x$,$R_y$ being independently selected from the group consisting of $—CH_3$, $—C_2H_5$, and $—C_3H_7$ or cyclic ethers such as tetrahydrofuran.

Together with the solvent, also an acid or a base can be used as a hydrolysis/condensation catalyst. Typical acids to be used are mineral inorganic acids and low-molecular organic carboxylic acids. Typical bases are alkali hydroxides, ammonia or aliphatic/aromatic primary, secondary or tertiary amines.

For example, surfactants for hydrolysis and/or emulsification can be selected from the group consisting of non-ionic surfactants such as polyethylene-oxide/polypropylene oxide block copolymers or similar polyether block copolymer surfactants;

- carboxylic acid based ionic surfactants, particularly fatty acids and related saturated or unsaturated linear and or branched aliphatic hydrocarbon-carboxylates such as lauric acid, stearic acid, oleic acid etc. and their corresponding alkali salts;
- sulfonic acid or phosphonic acid based ionic surfactants, particularly saturated or unsaturated linear and or branched aliphatic hydrocarbon-sulfonates such as dodecylsulfonic acid (SDS) and their corresponding alkali salts; and/or
- trialkylammonium salt based ionic surfactants such as cetyltrimethylammonium bromide (CTAB) or cetyltrimethylammonium chloride (CTAC).

In another aspect, the present invention is directed to an emulsion obtainable by emulsifying a polymeric liquid material as described herein with a predetermined amount of water, optionally in the presence of at least one surfactant.

In another aspect, the present invention is directed to a method for preparing a polymeric liquid material as described herein, wherein at least 1 mol-%, optionally at least 3 mol-%, optionally at least 5 mol-% optionally at least 7 mol-% of all $R^5$ moieties in the material are $R^{5S}$ moieties, the method comprising the following steps:

- providing a polymeric liquid material as described herein, wherein at least 3 mol-%, optionally at least 5 mol-%, optionally at least 10 mol-% optionally at least 20 mol-% of all $R^5$ moieties in the material are $R^{5U}$ moieties
- functionalizing the $R^{5U}$ residues of the polymeric liquid material to obtain at least 1 mol-%, optionally at least 3 mol-%, optionally at least 5 mol-% optionally at least 7 mol-% $R^{5S}$ residues relative to all $R^5$ residues;
- retrieving, optionally isolating and optionally purifying the polymeric liquid material. The term modifying or ($R^{5S}$-)functionalizing as used herein for obtaining $R^{5S}$ residues means that a chemical reaction is performed which is suitable for converting an $R^{5U}$ residue into an $R^{5S}$ residue. The suitable chemical reactions are known to the skilled person and are routinely chosen to obtain the desired $R^{5S}$ residue.

Suitable non-limiting chemical reactions are, for example, as listed below.

Michael additions and aza-Michael additions (e.g. amine or thiol with acrylates, alkenes, alkynes, carbonyl isocyanates, or unsaturated carbonyls); reactions with anhydrides (e.g. amine with maleic anhydride); reactions with acid chlorides (e.g. amine with a suitable —C(═O)Cl moiety); epoxide ring opening (e.g. with amines, thiols, CN—, or halogens); imine formation (primary amine with ketone); thiol substitution with a halogenoalkane; various nucleophilic substitutions (e.g. $S_N2$) on halogenoalkanes; elimination on a halogenoalkane to form a double bond; reaction of a halogenoalkane with sodium azide to form an alkyl azide, optionally followed by the reaction of the alkyl azide, e.g. in a click-chemistry reaction (azide-alkyne cycloaddition) or through conversion to an isocyanate; various $R^{5S}$-functionalization reactions with di- and trisisocyanates; reaction of alkenes, such as a "thiol-ene" reaction with thiols, electrophilic addition of a halogen onto an alkene, e.g. vinyl, followed by elimination to the alkyne; tetrasulfide- or thiol or unsaturated compounds (e.g. vinyl, methacrylate) reactions with unsaturated aromatic or unsaturated aliphatic compounds in the presence of a radical source (e.g. radical initiator), organic and inorganic peroxides or in the presence of aliphatic or aromatic, linear or cyclic epoxides; Friedel-Crafts-alkylation or -acylation on aromatic rings, e.g. phenyl rings; or peptide bond formation through amine or carboxylic groups.

The skilled person know which type of reactions and/or reaction conditions are compatible with the presence of (small amounts) water and/or silanol groups. The skilled person will choose a suitable protocol for carrying out the individual synthesis steps in order to minimized undesired side reactions with water and/or silanol groups. $R^{5S}$-Functionalization reactions that are not compatible with the presence of water and/or silanol groups and must be carried out in their presence are optionally excluded from the scope of the present invention. A preferred protocol for $R^{5S}$-functionalization reactions that are sensitive to water and/or silanol groups includes to first carry out the $R^{5S}$-functionalization on a $T^0$ monomer followed by grafting of the $T^0$ monomer onto the siloxane core, thus circumventing reactions in the presence of water and/or silanol groups by temporal separation of the $R^{5S}$-functionalization.

The polymeric liquid polysiloxane material prepared by the method described herein can be optionally $R^{5S}$-functionalized, i.e. optionally at least 1 mol-%, optionally at least 3 mol-%, optionally at least 5 mol-% optionally at least 7 mol-% of all $R^5$ moieties in the material are $R^{5S}$ moieties, wherein $R^{5S}$ is considered a $R^{5S}$-functionalized moiety. The starting material for the method may be non-$R^{5S}$-functionalized (essentially 100 mol-% of all $R^5$ moieties in the material are $R^{5U}$ moieties) or partly $R^{5S}$-functionalized (e.g. at least 3 mol-% of all $R^5$ moieties in the material are $R^{5U}$ moieties). $R^{5S}$-Functionalization of the starting material may be done by functionalizing $R^{5U}$ of grafted T-type siloxane moieties or optionally by grafting further, pre-$R^{5S}$-functionalized T-type silanes comprising $R^{5S}$ moieties. The functionalization of $R^{5U}$ moieties can be done by known chemical methods. Retrieving, optionally isolating and optionally purifying the polymeric liquid material can be done as outlined in the context of step (g) of the method below.

In another aspect, the present invention is directed to a method for preparing a polymeric liquid material as described herein, comprising the following steps:

(a) providing a Q-type polymethoxy, polyethoxy, polypropoxy or mixed poly(methoxy/ethoxy/propoxy) polysiloxane precursor, optionally comprising
  - (a1) di-organofunctional D-type siloxane moieties; and/or
  - (a2) mono-organofunctional T-type siloxane moieties, wherein $R^5$ is selected from $R^{5U}$ and $R^{5S}$;
  - optionally comprising less than 12 mol-% of (a1) and (a2) combined relative to the total amount of all Q-type species;
  - optionally further comprising a condensation catalyst;
  - wherein degree of polymerization of the Q-type polysiloxane $DP_{Q\text{-}type}$ is in the range of 1.5 to 2.7, optionally 1.5 to 2.5, optionally 1.7 to 2.5; and
  - wherein the Q-type polysiloxane comprises more than 3, 5, 10, 15 or 20 mol-% silanol groups (Si—OH);

(b) adding at least one of a
  - (b1) tri-organofunctional M-type silane $Si(OR^1)(R^2)(R^3)(R^4)$; and/or
  - (b2) di-organofunctional D-type silane $Si(OR^1)_2(R^2)(R^3)$; and/or
  - (b3) mono-organofunctional T-type silane $Si(OR^1)_3(R^5)$, wherein $R^5$ is selected from $R^{5U}$ and $R^{5S}$;
  - in mono- or oligomeric form to the polysiloxane of (a);

(c) optionally adding a condensation catalyst to the mixture of step (b);

(d) heating the mixture of (c) in the absence of water;

(e) optionally repeating steps (b) to (d) at least once;

(f) optionally functionalizing the $R^{5U}$ residues of the polymeric liquid material to obtain at least 1 mol-%, optionally at least 3 mol-%, optionally at least 5 mol-% optionally at least 7 mol-% $R^{5S}$ residues relative to all $R^5$ residues;

(g) retrieving, optionally isolating and optionally purifying the polymeric liquid material; with the proviso that at least one of steps (a2) or (b3) is carried out, and with the proviso that a condensation catalyst is present in at least one of steps (a) or (c).

In the above method, the free SiOH groups are used for grafting the M-, D- and/or T-type silanes onto the Q-type core. No water is necessary for grafting and no water is used in the process, which essentially eliminates the possibility for hydrolysis reactions that lead to a change in the degree of polymerization caused by said hydrolysis reactions.

However, if the precursor material in the context of the present method does not feature sufficient free silanol species (Si—OH), i.e. less than 0.25, 0.5, 1, 2 or 5 mol-%, and optionally does not feature the desired degree of polymerization ($DP_{Q\text{-}type}$) and/or the degree of polymerization of the grafted product ($DP_{T\text{-}type}$ and/or $DP_{D\text{-}type}$) should be adjusted to the degree of polymerization of the polymeric liquid polysiloxane material described herein, water may be added in order to generate free hydroxyl groups in the amounts defined herein and/or adjust the degree of polymerization.

In an alternative aspect, the present invention is directed to a method for preparing a polymeric liquid material as described herein, comprising the following steps:

(a) providing a Q-type polymethoxy, polyethoxy, polypropoxy or mixed poly(methoxy/ethoxy/propoxy) polysiloxane precursor, optionally comprising
  (a1) di-organofunctional D-type siloxane moieties; and/or
  (a2) mono-organofunctional T-type siloxane moieties, wherein $R^5$ is selected from $R^{5U}$ and $R^{5S}$;
  optionally comprising less than 12 mol-% of (a1) and (a2) combined relative to the total amount of all Q-type species;
  optionally further comprising a condensation catalyst;
  wherein degree of polymerization of the Q-type polysiloxane $DP_{Q\text{-}type}$ is in the range of 1.0 to 2.7, optionally 1.25 to 2.5, optionally 1.5 to 2.5;

(b) adding at least one of a
  (b1) tri-organofunctional M-type silane $Si(OR^1)(R^2)(R^3)(R^4)$; and/or
  (b2) di-organofunctional D-type silane $Si(OR^1)_2(R^2)(R^3)$; and/or
  (b3) mono-organofunctional T-type silane $Si(OR^1)_3(R^5)$, wherein $R^5$ is selected from $R^{5U}$ and $R^{5S}$;
  in mono- or oligomeric form to the polysiloxane of (a);

(c) optionally adding a condensation catalyst to the mixture of step (b);

(d) heating the mixture of (c) in the presence of water, optionally in the presence of an amount of water which results in the $DP_{Q\text{-}type}$, $DP_{T\text{-}type}$ and/or $DP_{D\text{-}type}$ as defined for the polymeric liquid polysiloxane material described herein;

(e) optionally repeating steps (b) to (d) at least once;

(f) optionally functionalizing the $R^{5U}$ residues of the polymeric liquid material to obtain at least 1 mol-%, optionally at least 3 mol-%, optionally at least 5 mol-% optionally at least 7 mol-% $R^{5S}$ residues relative to all $R^5$ residues;

(g) retrieving, optionally isolating and optionally purifying the polymeric liquid material; with the proviso that at least one of steps (a2) or (b3) is carried out, and with the proviso that a condensation catalyst is present in at least one of steps (a) or (c).

As noted above, the necessary amount of reactive hydroxyl groups in the precursor material of step (a) can be generated by the addition of water in step (d). For example, the addition of water is sufficient to generate more than about 0.25, 0.5, 1, 2 or 5 mol-% silanol groups (Si—OH) in the product of the method described herein, i.e. in the Q-type polysiloxane of the polymeric liquid material.

Optionally, the precursor for use in the present method comprises at least 25, optionally at least 30, optionally at least 37 or 45 mol-% four-membered combined $Q^{2r}$-type and $Q^{3s,d}$-type siloxane ring species relative to the total Q-type siloxane species.

Optionally, the precursor for use in the present method comprises at least 50%, optionally at least 56%, optionally at least 63 or 70% four-membered combined $Q^{3s,3d}$-type siloxane ring species relative to all $Q^3$-type siloxane species.

Optionally, the precursor for use in the present method comprises at least 3.0, optionally at least 3.5, optionally at least 4.0 or 4.5 mol-% double four-membered $Q^{3d}$-type siloxane ring species relative to the total Q-type siloxane species.

Optionally, the precursor for use in the present method comprises at least 14, optionally at least 17, optionally at least 20 or 25 mol-% double four-membered $Q^{3d}$-type siloxane ring species relative to all $Q^3$-type siloxane species.

The Q-type polymethoxy, polyethoxy, polypropoxy or mixed poly(methoxy/ethoxy/propoxy) polysiloxane precursor of step (a) can be any, e.g. commercially available, Q-type polymethoxy, polyethoxy, polypropoxy or mixed poly(methoxy/ethoxy/propoxy) polysiloxane. It may comprise more than 3, 5, 10, 15 or 20 mol-% silanol groups (Si—OH).

Optionally, it can be any Q-type polymethoxy, polyethoxy, polypropoxy or mixed poly(methoxy/ethoxy/propoxy) polysiloxane comprising the non-organofunctional $Q^1$- to $Q^4$-type siloxane moieties defined for the polysiloxane material herein, wherein at least 25, optionally at least 30, optionally at least 37 or 45 mol-% of all Q-type species are part of four-membered $Q^2$-type and $Q^3$-type siloxane ring species (including single and double rings), and/or optionally wherein at least 50%, optionally at least 56%, optionally at least 63 or 70% of all $Q^3$-type species are part of four-membered $Q^{3s,3d}$-type siloxane rings, and as long as the degree of polymerization of the Q-type polysiloxane $DP_{Q\text{-}type}$ is in the range of 1.5 to 2.5, optionally 1.5 to 2.7, optionally 1.7 to 2.4. In the context of the present method, the four-membered $Q^3$-type siloxane ring species can be those $Q^3$-type siloxane species which are part of one or two four-membered rings, respectively. The term "all Q-type species" in the context of the present method includes all $Q^1$ to $Q^4$ siloxane species as well as $Q^0$ silane monomer(s).

The Q-type polymethoxy, polyethoxy, polypropoxy or mixed poly(methoxy/ethoxy/propoxy) polysiloxane of step (a) constitutes the precursor material as described herein. If a core-shell architecture is targeted, typically a pure Q-type precursor material is used as the core. The $^{29}Si$ NMR spectrum of a typical and exemplary Q-type precursor material is shown in FIG. 3, displaying substantial amounts of free SiOH species.

For example, the following Q-type polymethoxy, polyethoxy or mixed poly(methoxy/ethoxy) polysiloxane can be used in step (a): commercial oligomers of TEOS or TMOS, e.g. ethylsilicates with 40% by mass of total $SiO_2$ equivalent content such as Dynasylan 40 (Evonik Industries), Wacker Silicate TES 40 WN (Wacker), TEOS-40 (Momentive) or simply "ethylsilicate-40" as referred to by many non-branded Asian suppliers. Also, oligomers with higher silicate content such as Dynasylan Silbond 50 or equivalent products with up to 50% equivalent $SiO_2$ solids content can be used. The same holds for TMOS oligomers such as "Tetramethoxysilane, oligomeric hydrolysate" (Gelest Inc.) or "MKC silicate" (Mitsubishi Chemicals) which exist in variations with up to 59% $SiO_2$ equivalent content can be used as a source for methylsilicates. Comparable propoxy-silicates, if available commercially, can also be used.

Alternatively, the Q-type polymethoxy, polyethoxy, polypropoxy or mixed poly(methoxy/ethoxy/propoxy) polysiloxane of step (a) can be synthesized according to other protocols described in the art, provided they contain the desired amount of tetrasiloxane ring species.

The definitions of chemical substituents in the tri-organofunctional M-type silane $Si(OR^1)(R^2)(R^3)(R^4)$, the di-organofunctional D-type siloxane moieties $Si(OR^1)_2(R^2)(R^3)$ and the mono-organofunctional T-type siloxane moieties $Si(OR^1)_3(R^5)$ in the context of the present method correspond to the definitions given in the context of the polysiloxane material described herein.

The term "in mono- or oligomeric form", as used herein, means that the M-, D- and T-type silanes are not highly polymerized when used as a precursor, i.e. are either monomers or small oligomers of, e.g., common mixtures with less than ten monomer units in a typical oligomer.

The amount of water in step (d) of the method described herein, which generates the desired mol % free SiOH groups and/or results in the $DP_{Q\text{-}type}$, $DP_{T\text{-}type}$ and/or $DP_{D\text{-}type}$ as defined for the polymeric liquid polysiloxane material described herein, can be calculated as follows:

$$\Delta DP_{avg,max}=2\cdot(n_{HO2}/n_{Si,tot})$$

Δ refers to the difference before and after the condensation reaction.

Where $DP_{avg}$ is defined as the weighted average (Si-basis) over Q-type, T-type as well as optional D-type and M-type species in the material and can be calculated as follows $$DP_{avg}=(n_{Si,Q\text{-}type}/n_{Si,tot})DP_{Q\text{-}type}+(n_{Si,T\text{-}type}/n_{Si,tot})DP_{T\text{-}type}+(n_{Si,D\text{-}type}/n_{Si,tot})DP_{D\text{-}type}+(n_{Si,M\text{-}type}/n_{Si,tot})DP_{M\text{-}type}$$

Where $DP_{M\text{-}type}$ can be obtained from $^{29}Si$ NMR measurements in analogy to Q-, T- and D-type species from $M^0$ and $M^1$ spectral signature integrals, respectively.

$\Delta DP_{avg,max}$ describes the maximum change in the average DP value of the material, if no additional silanol groups are formed during the condensation grafting step. If additional silanol groups are formed during the condensation grafting step where water is used as an active condensation reagent, then the effective, measured $\Delta DP_{avg,effective}$ value is lower than $\Delta DP_{avg,max}$ by a relative amount of additionally formed silanol groups $\Delta n_{si\text{—}OH}/n_{Si,tot}$.

The condensation catalyst for use in the present method can be any catalyst that accelerates the grafting of T-, D- and M-type monomers or oligomers leading to the polymeric liquid material described herein. Catalyst concentrations are generally in the range from 0.005 mol-% to 5 mol-% based on the total molar silicon content in the prepared material. The catalyst may be present in step (a) or (c), or both with the proviso that it is present in at least one of steps (a) or (c).

The condensation catalyst, as used herein can be positively identified for example by the protocols of the examples below (e.g. Example 5). Any catalyst that elicits at least 75% grafting of $T^0$ (less than 25% residual $T^0$ monomer) for the MTES model compound defined in the protocol of Example 5 is a condensation catalyst for use in the present invention.

The catalyst for use in the present method can be selected from the group consisting of

- Bronsted acids and Lewis acids;
- inorganic mineral acids;
- organic acids;
- acidic metal ion salts, optionally transition metal ions salts;
- acids with a pKa value below 4 or with a negative pKa value; and
- acid-releasing compounds, optionally chlorosilanes, optionally monochloro-, dichloro- or trichlorosilanes.

The catalyst amount in each of steps (a) or (c) is optionally between 0.005 and 5 mol %, optionally between 0.01 and 1 mol % or 0.01 and 0.3 mol % with respect to the total molar silicon content present in said step.

"In the absence of water" as noted in step d) of this method optionally does not apply to reactions, e.g. grafting and/or condensation reactions, with tri-organofunctional M-type silanes as defined in the said method. In this method, the reaction step with tri-organofunctional M-type silanes may be performed in the presence of water, e.g. in the presence of an aqueous acid/co-solvent mixture (e.g. EtOH, water, ketones etc.) as commonly used in the art. Optionally the M-type silane grafting is temporally separated from D-Type and/or T-type grafting, either being carried out before or after in this method.

In order to allow sufficiently fast kinetics to yield reasonable reaction times, the use of elevated temperature in conjunction with a catalyst are typically required at least in step (d), optionally in steps (b) to (e) as described herein.

Each reaction step may be carried out for, e.g. half an hour to several hours or several days, depending on the condensation catalyst type and concentration used. Alternatively, if a radiofrequency-assisted heating method is used, the reaction times may be shortened significantly.

All of steps (b) to (f) are optionally carried out under stirring. Optionally stirring is continued in steps (d) and/or (f) for at least 30 minutes after the M-, D- or T-type silane was added.

For example, during step (d) the total degree of polymerization of the terasiloxane ring species remains essentially constant if the reaction is carried out in the absence of water. Grafting protocols in the Optionally, in step (d) and/or (f), low-molecular reaction products and/or residual starting materials in the reaction mixture can be removed by vacuum distillation, e.g. through gradually lowering the pressure inside the reaction vessel and holding a final pressure in the range of, e.g. about 5 to 250 mbar for a period of time between, e.g. 2 and 60 minutes. Optionally, residual volatile organic compounds, solvent residues and/or low molecular starting products (VOC) can be further removed at any stage in the workup procedure by bubbling a purge gas through the preferably still warm or hot reaction mixture.

For example, each of steps (a) through (e) of the present method are carried out essentially in the absence of any chemical reagent and/or any chemical reagent other than the condensation catalyst for promoting the grafting reaction. For example, all of steps (a) through (e) are carried out essentially in the absence of acetic anhydride, acetic acid or other anhydrides or alphatic or aromatic carboxylic acids for promoting the grafting reaction. "Essentially in the absence" means that there may be traces or catalytic amounts of the aforementioned substances present, however, "essentially in the absence" means that the amounts are not sufficient to promote a detectable or significant polymerization or grafting reaction by means of these substances.

As can be seen in the examples below, the mol-% of ring species in the material of step (a) is not significantly reduced in the product according to the present preparation method. As an example of a typical grafting reaction, FIG. 4 shows the reaction product after condensation grafting of a typical example using a polyeythoxysiloxane Q-type precursor (spectrum from FIG. 3) and MTES as a monomeric T-type precursor. By direct comparison with FIG. 7, one notices that the grafted product features no significant reduction in both $Q^{2r}$ and also $Q^{3s}$, $Q^{3d}$ tetrasiloxane ring species. FIG. 5 shows a graft compound made from a Q-type precursor featuring a substantially higher silanol content (as compared to the one presented in FIG. 3, spectrum not shown here), which also translates into the grafted Q-T polymeric liquid material displaying a significantly higher silanol content, demonstrating the fact that silanols are effectively used up during grafting.

The proviso that at least one of steps (a2) or (b3) is carried out means that at the product of the present method is a polymeric liquid polysiloxane material as described herein comprising mono-organofunctional T-type siloxane moieties as described herein, hence, the T-type silanes of formula $Si(OR^1)_3(R^5)$ must be added in monomeric or oligomeric form in at least one step of the present method. This is synonymous with saying that the product must contain T-type moieties.

For the mono-organofunctional T-type siloxane moieties and silanes of step (a2) and (b3), $R^5$ is selected from $R^{5U}$ and $R^{5S}$. This means that the T-type siloxane moieties/silanes may be non-functionalized (essentially 100 mol-% of all $R^5$ moieties of all T-type siloxane moieties/silanes in the material are $R^{5U}$ moieties), fully functionalized (essentially 100 mol-% of all $R^5$ moieties of all T-type siloxane moieties/silanes in the material are $R^{5S}$ moieties) or partly functionalized (the T-type siloxane moieties/silanes comprise both $R^{5U}$ and $R^{5S}$ moieties in any possible ratio).

Step (f) is optional to the extent that no functionalization of the $R^{5U}$ residues is mandatory if (A) the T-type siloxane moieties and silanes of step (a2) and/or (b3) are chosen such that in the product of the method at least 1 mol-%, optionally at least 3 mol-%, optionally at least 5 mol-% optionally at least 7 mol-% of all $R^5$ moieties are $R^{5S}$ moieties in the absence of step (f), or if (B) the product is of the method is one, wherein 0 mol-% of all $R^5$ moieties are $R^{5S}$ moieties. Of course, step (f) can be carried out even if the T-type siloxane moieties and silanes of step (a2) and/or (b3) already lead to a product wherein at least 1 mol-%, of all $R^5$ moieties in the material are $R^{5S}$, e.g. to increase the molar percentage of functionalized $R^5$ residues if the final product is one, wherein at least 1 mol-% of all $R^5$ moieties are $R^{5S}$ moieties.

Optionally, step (f) can also be performed between steps (d) and (e) and the sequence of steps (e) and (f) are optionally interchangeable.

The product of the present method is retrieved in step (g) by collection of the material from the reaction vessel. The product may optionally be isolated and purified by standard methods known in the art, e.g. by distillation, optionally using a thin film evaporator, VOC removal by stripping with a purge gas etc.

In an embodiment, the method for preparing a polymeric liquid material according to the present invention is one, wherein at least 1 mol-%, optionally at least 3 mol-%, optionally at least 5 mol-% optionally at least 7 mol-% of all $R^5$ moieties in the material are $R^{5S}$ moieties, and wherein in step (a), the $R^5$ of the T-type siloxane moiety is $R^{5U}$;

in step (b), the $R^5$ of the T-type silane is $R^{5U}$; and the method comprises the step (f) of functionalizing the $R^{5U}$ residues of the polymeric liquid material to obtain at least 1 mol-%, optionally at least 3 mol-%, optionally at least 5 mol-% optionally at least 7 mol-% $R^{5S}$ residues relative to all $R^5$ residues.

In an embodiment, the method for preparing a polymeric liquid material according to the present invention is one, wherein at least 1 mol-%, optionally at least 3 mol-%, optionally at least 5 mol-% optionally at least 7 mol-% of all $R^5$ moieties in the material are $R^{5S}$ moieties, and wherein in step (a), the $R^5$ of the T-type siloxane moiety is $R^{5U}$;

in step (b), the $R^5$ of at least one T-type silane is $R^{5S}$;

wherein in optional step (e) the $R^5$ of the T-type silane is selected from $R^{5U}$ and $R^{5S}$, and the method optionally does not comprise the step (f).

If the product of the method is chosen as a polymeric liquid material according to the present invention, wherein at least 1 mol-%, optionally at least 3 mol-%, optionally at least 5 mol-% optionally at least 7 mol-% of all $R^5$ moieties in the material are $R^{5S}$ moieties, then the choice of $R^{5S}$-functionalized or non-$R^{5S}$-functionalized T-type siloxane moieties and silanes of step (a2) and (b3) can be any choice that, together with optional steps (e) and (f), leads to a polymeric liquid material, wherein at least 1 mol-%, optionally at least 3 mol-%, optionally at least 5 mol-% optionally at least 7 mol-% of all $R^5$ moieties are $R^{5S}$ moieties. It is within the purview of the skilled person to routinely implement any permutations in the choice of starting materials and further $R^{5S}$-functionalization reaction in the context of $R^5$ moieties.

In an embodiment, the method described herein further comprises before step (b) or after step (d) or (e) the step of adding a tri-organofunctional M-type silane $Si(OR^1)(R^2)(R^3)(R^4)$ or M-type siloxane $(R^2)(R^3)(R^4)Si—O—Si(R^2)(R^3)(R^4)$ and optionally a di-organofunctional D-type silane in mono- or oligomeric form as described in step (b2) in the presence of water and a suitable co-solvent and an acid catalyst, followed by heating the mixture, optionally to reflux. If the addition takes place before step (b), water may optionally be removed before step (b) is initiated. The addition of water may also lead to materials featuring comparably low total silanol group content after grafting even if an essentially silanol-free precursor is used. This can be clearly seen in FIG. 6.

For example, solvents for adding a tri-organofunctional M-type silane $Si(OR^1)(R^2)(R^3)(R^4)$ and/or optionally a di-organofunctional D-type siloxane can be selected from the group consisting of ethanol, methanol, n-propanol, isopropanol, acetone, methyl-ethyl ketone, dimethyl ether, methyl-ethyl ether, diethyl ether.

In another embodiment, the reaction temperature for steps (c) through (f) of the method described herein is in the range from 30 to 170, optionally 50 to 150 or 70° C. to 120° C., and the pressure during steps (c) through (f) is in the range of 0.1 bar to 2 bar, optionally in the range of 0.5 bar to 1.4 bar or in the range of 0.6 bar to 1.2 bar.

In another aspect, the present invention is directed to a product obtained or obtainable by the method described herein.

In a further aspect, the present invention is directed to a use of a polymeric liquid material described herein, comprising at least one population of T-type siloxane moieties with $R^5$ as a radical polymerizable organofunctional residue selected from the group consisting of vinyl, methacrylate, butacrylate, acrylate,

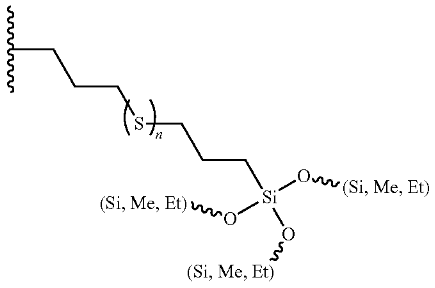

and

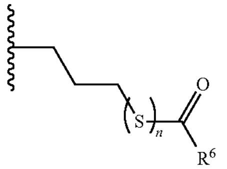

as a crosslinker within a formulation, with a content of the polymeric liquid material in the range of 0.2% to 25% by weight with respect to the formulation.

The term "formulation", as used herein, refers to any product comprising the polymeric liquid material described herein, e.g. as a crosslinker or as any other functional entity. The formulation may be a liquid, a paste or an emulsion or slurry. Such a formulation typically comprises, e.g., other compatible radical polymerizable monomers, oligomers or prepolymers or silane terminated polymeric building block moieties, fillers as well as performance or lifetime enhancing additives and stabilizers such as: UV and light stabilizers, antioxidants, rheology modifiers, tack modifiers, film forming additives, gloss additives, antistatics, nucleation agents etc. If thermally activatable, such a formulation will also typically contain, e.g., a radical starter molecule chosen to meet the designed curing onset temperature.

In a further aspect, the present invention is directed to a use of the polymeric liquid material, of the hydrolysis product or of the emulsion described herein containing at least one population of T-type alkoxy-terminated siloxane moieties with organofunctional groups selected from methyl, ethyl, vinyl, methacrylate, n-propyl, isopropyl, n-butyl, t-butyl, hexyl, octyl, dodecyl, hexadecyl, (3,3,3-trifluoro)propyl, (1H,1H, 2H,2H-perfluoro)octyl, (1H,1H, 2H, 2H-perfluoro)dodecyl and (1H,1H, 2H, 2H-perfluoro) hexadecyl for $R^5$, in a hydrophobic formulation, wherein the loading of the polymeric liquid, hydrolysis product or emulsion in the formulation is 0.5% to 25% by weight.

BRIEF DESCRIPTION OF THE DRAWINGS

The following Figures and Examples serve to illustrate the invention and are not intended to limit the scope of the invention as described in the appended claims. If not mentioned otherwise, the term "tetrasiloxane ring species" in these examples refers to the sum of all $Q^2$ and $Q^3$ tetrasiloxane ring species with respect to the total amount of Q species in the material.

FIG. 1*a* shows exemplary 2D molecular structure representations of a typical pure Q-type precursor material or core in a general case (FIG. 1*a*) ($DP_{Q\text{-}type}$=2.15, OH/Si=0.1) with roughly 5.5% silanol groups, and in one more specific case with primarily ethoxy also silanol groups (approximately 11%) present (FIG. 1*b*) ($DP_{Q\text{-}type}$=2.15, OH/Si=0.2).

DETAILED DESCRIPTION OF THE INVENTION

EXAMPLES

Figure 1:
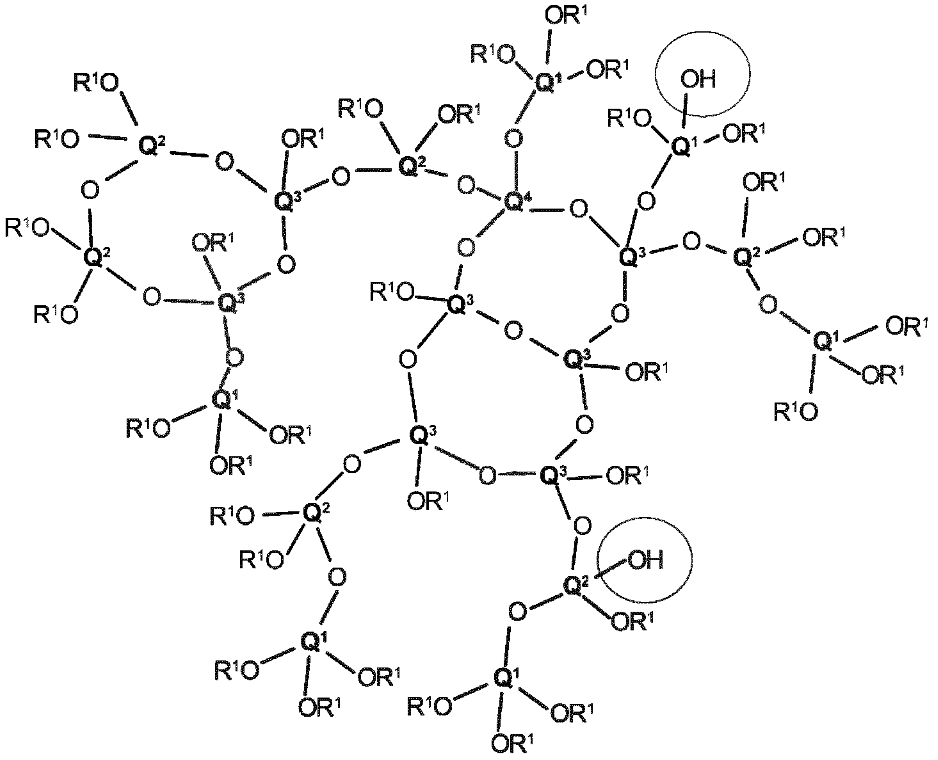
FIGS. 1*a* and 1*b*.
Figure 1:
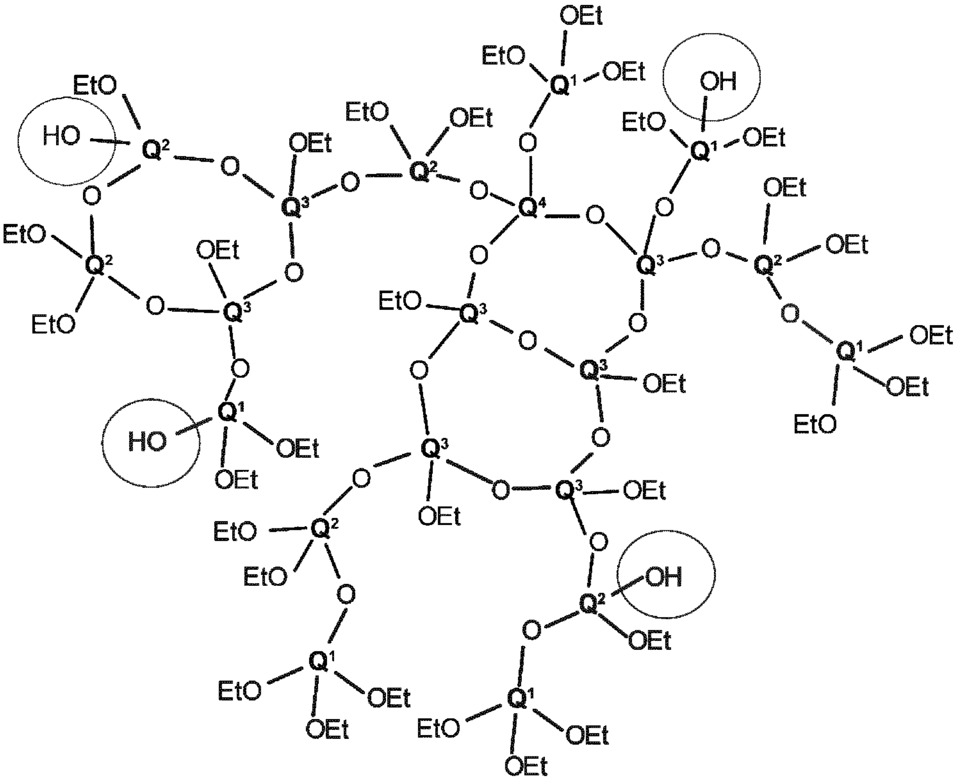
Figure 2:
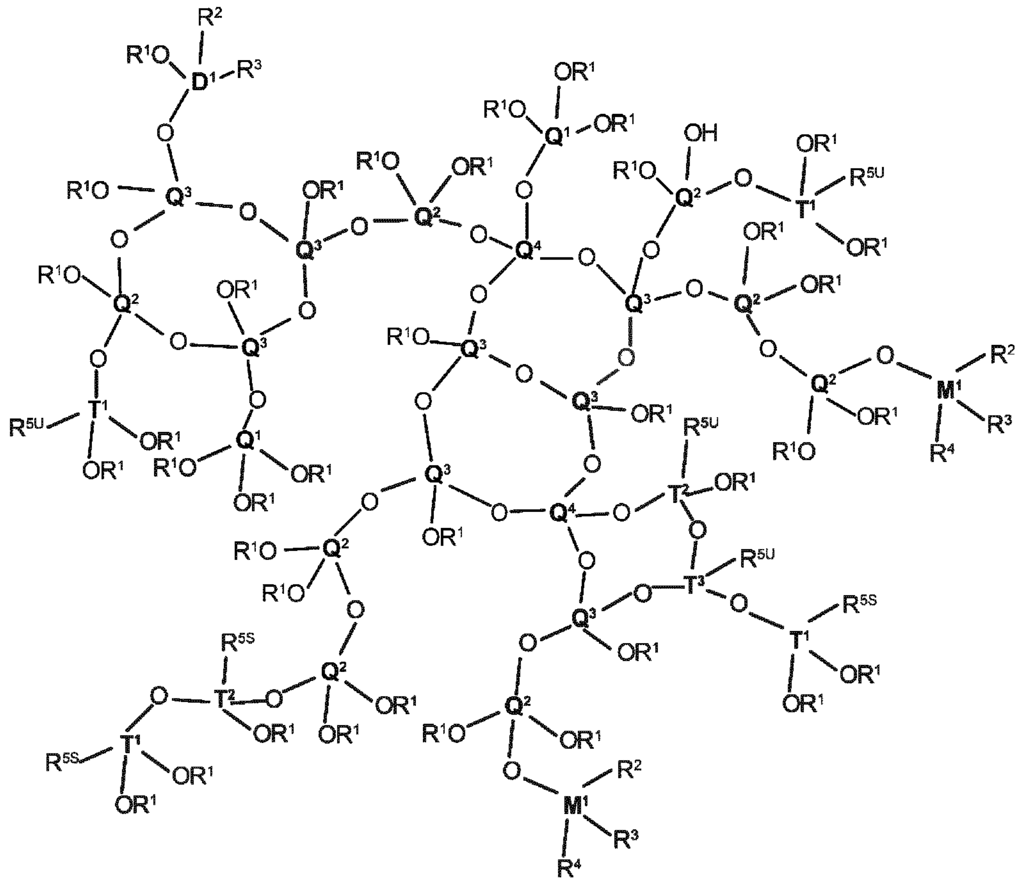
FIGS. 2*a*, 2*b*, and 2*c* show exemplary 2D molecular structure representations of typical materials described herein based on a pure Q-type precursor material only. In the general case (FIG. 2*a*), all combinations of M, D and T functionalizations are possible and indicated by the presence of selected $T^1$, $T^2$, $D^1$, $D^2$ , and $M^1$ moieties. Note that the $R^5$ ligands on the T-type moieties may comprise both unsubstituted $R^{5U}$ and substituted $R^{5S}$ functionalities. Furthermore, the two specialized cases are illustrated with idealized compounds featuring only unsubstituted vinyl: $—CH{=}CH_2$ (FIG. 2*b*) and in the case of two T-type grafts containing a first $R^{5U}$=Me and a second partially substituted Mercaptopropyl T-type population with $R^{5U}$=Mp and $R^{5S}$=$—CH_2CH_2CH_2—S—R^{1o}$ functionalities. The representations are for illustration purposes only and do not represent any limitation in further D, M-Type or T-type ($R^{5U}$, $R^{5S}$) substitution and grafting combination options.
Figure 2:
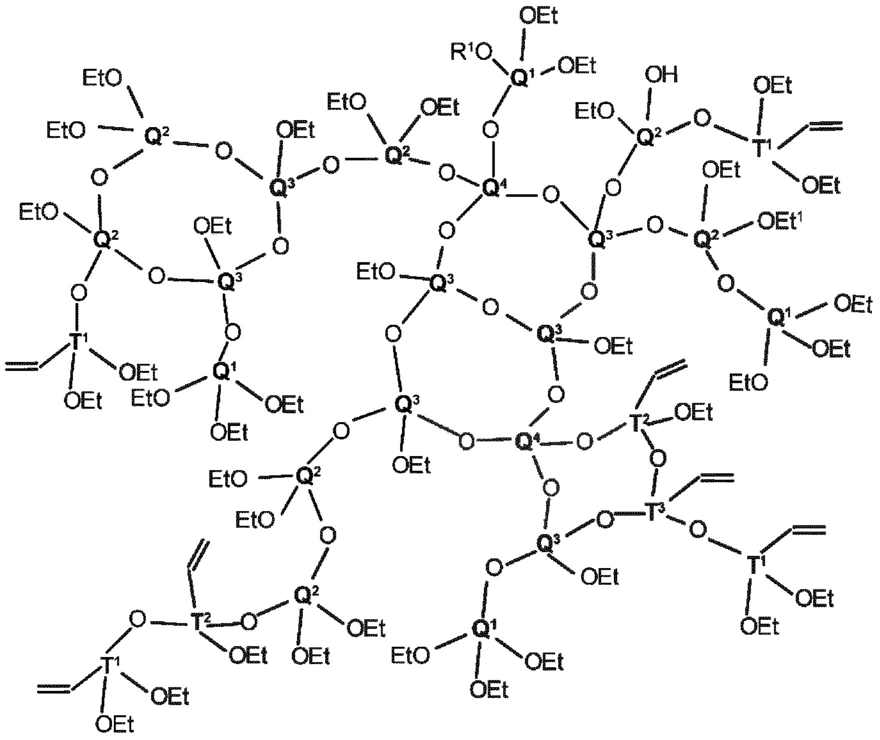
Figure 2:
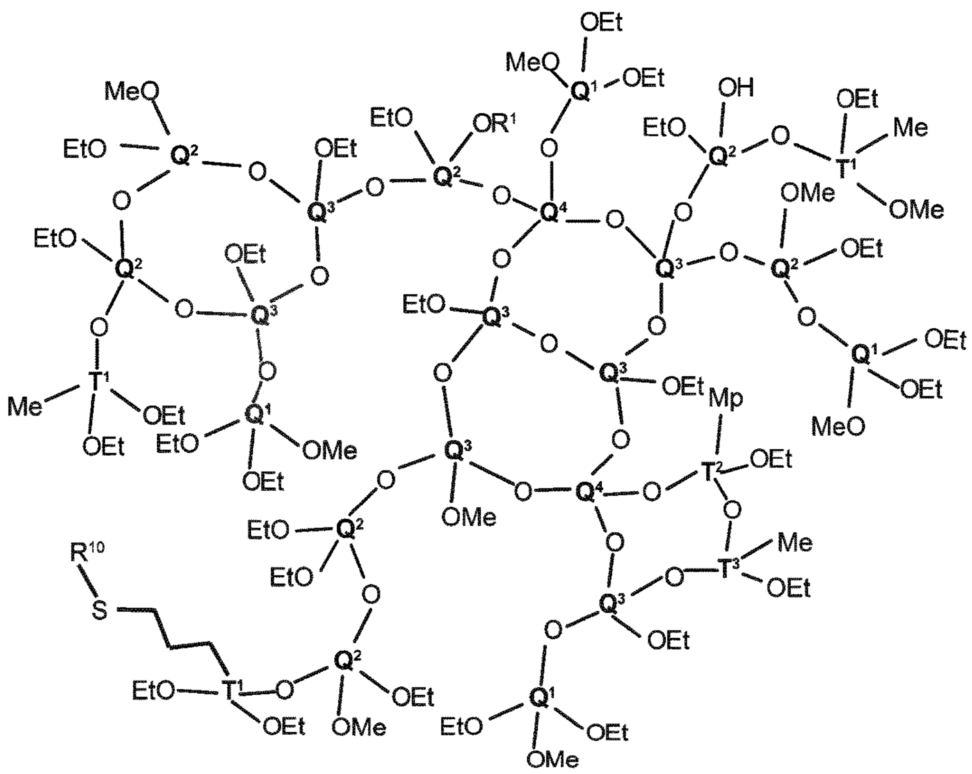
Figure 3:
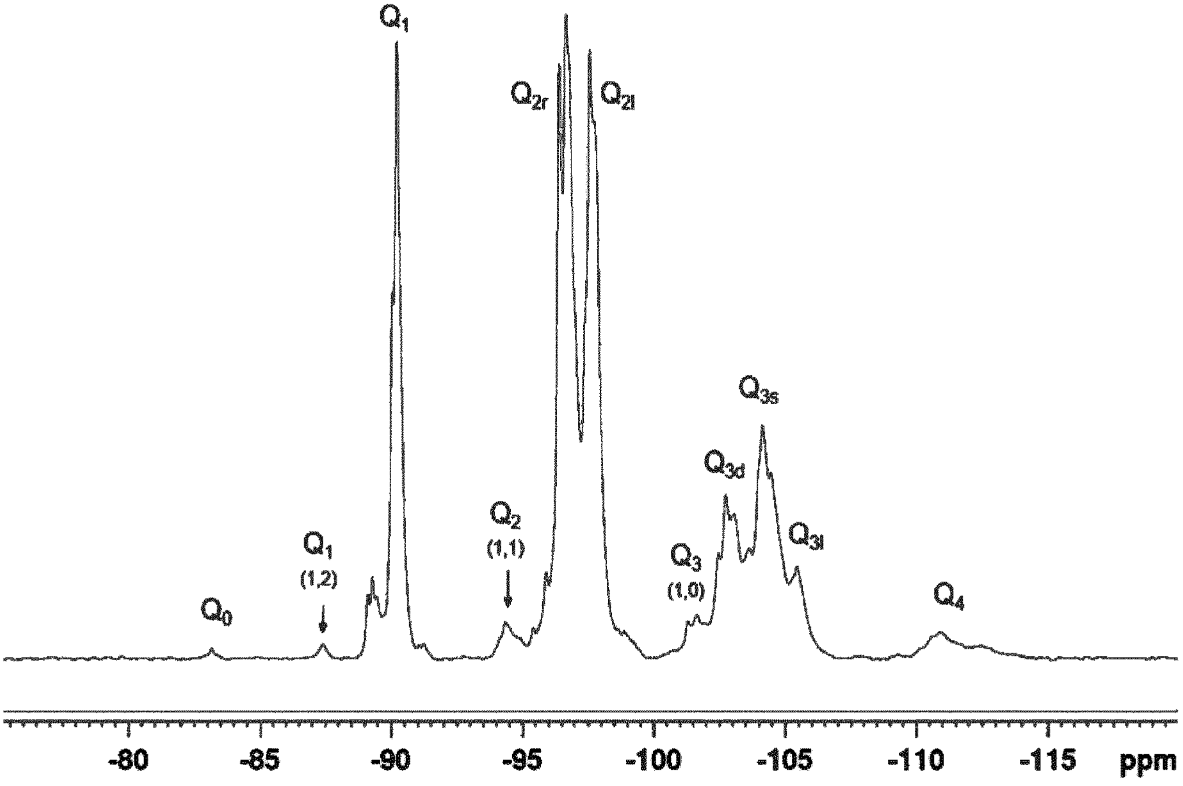
FIG. 3 shows a $^{29}$Si NMR spectrum of a material prepared from an ethoxy-based Q-type and an ethoxy-based T-type precursor featuring still significant amounts of silanol groups e.g. ($Q^1_{(1,2)}$, $Q^2_{(1,1)}$, $Q^3_{(1,0)}$ peaks) in the amount >5% and >51% Q-type tetrasiloxane ring species.
Figure 4:
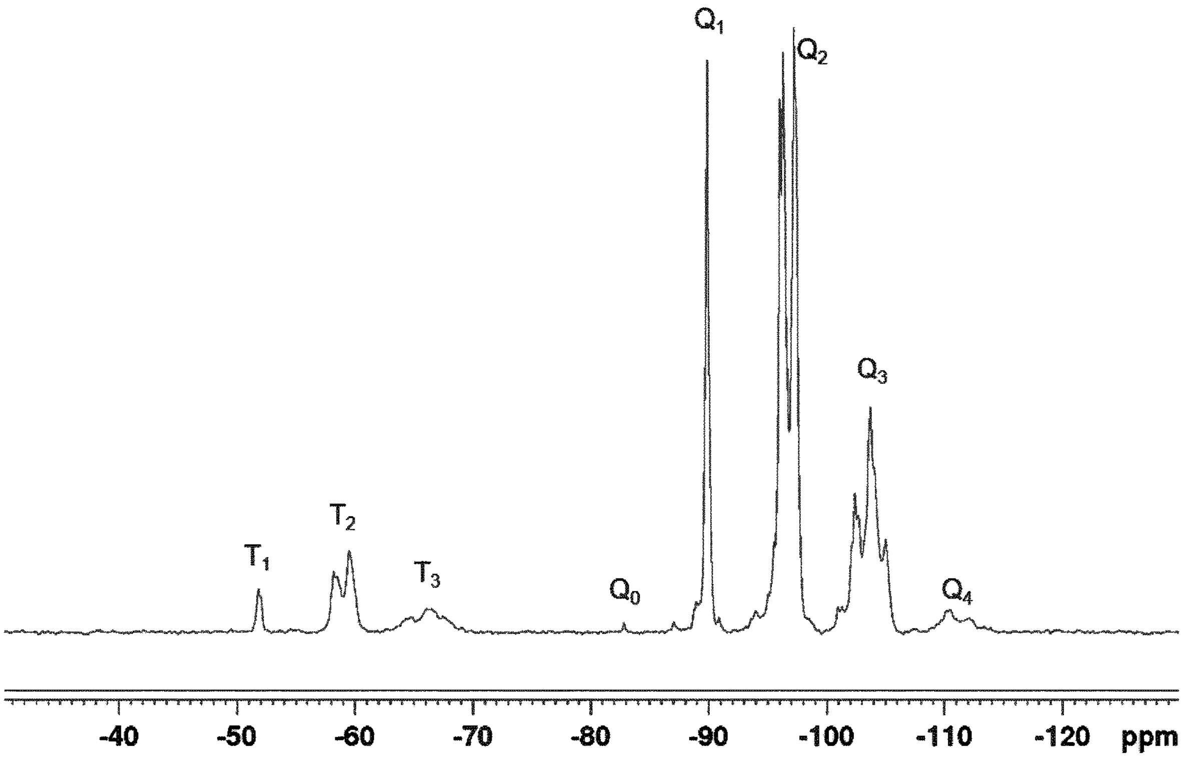
FIG. 4 shows an a $^{29}$Si NMR spectrum of a material obtained by grafting a precursor material with a spectrum given in FIG. 3 above and >5% silanol groups with 15% mol of methyltriethoxy-silane (MTES) measured by the total amount of Q-type moieties in said precursor with 1000 ppm nitric acid. The corresponding material has a silanol content of >3% and >52% Q-type tetrasiloxane ring species, illustrating that the condensation grafting effectively lowers the silanol content.
Figure 5:
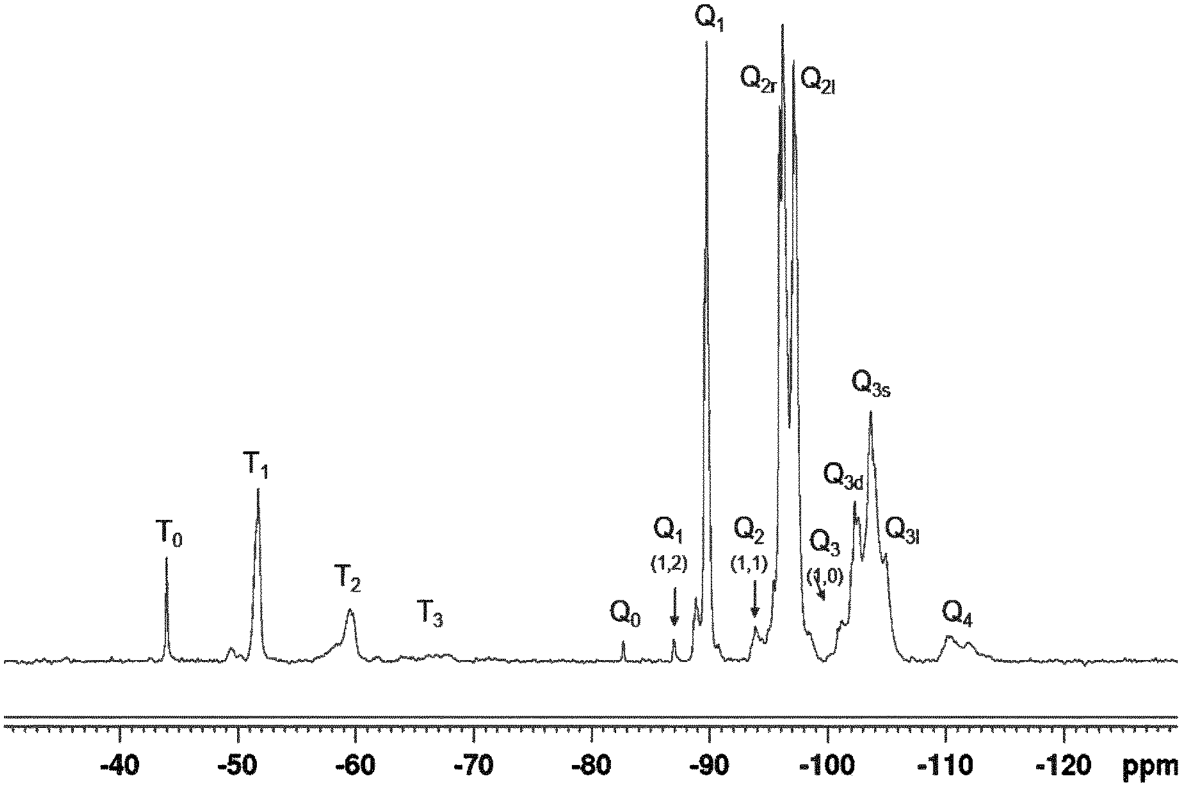
FIG. 5 shows a $^{29}$Si NMR spectrum of a material prepared from an ethoxy-based Q-type precursor a higher initial silanol content of >8% essentially and grafting 15% mol of methyltriethoxy-silane (MTES) measured by the total amount of Q-type moieties in said precursor with 1000 ppm nitric acid. The corresponding material has a silanol content of >4% and >51% Q-type tetrasiloxane ring species. The corresponding silanol species $Q^1$(1,2) $Q^2$(1 1) $Q^2$(1,0) are marked in the spectra for clarity.
Figure 6:
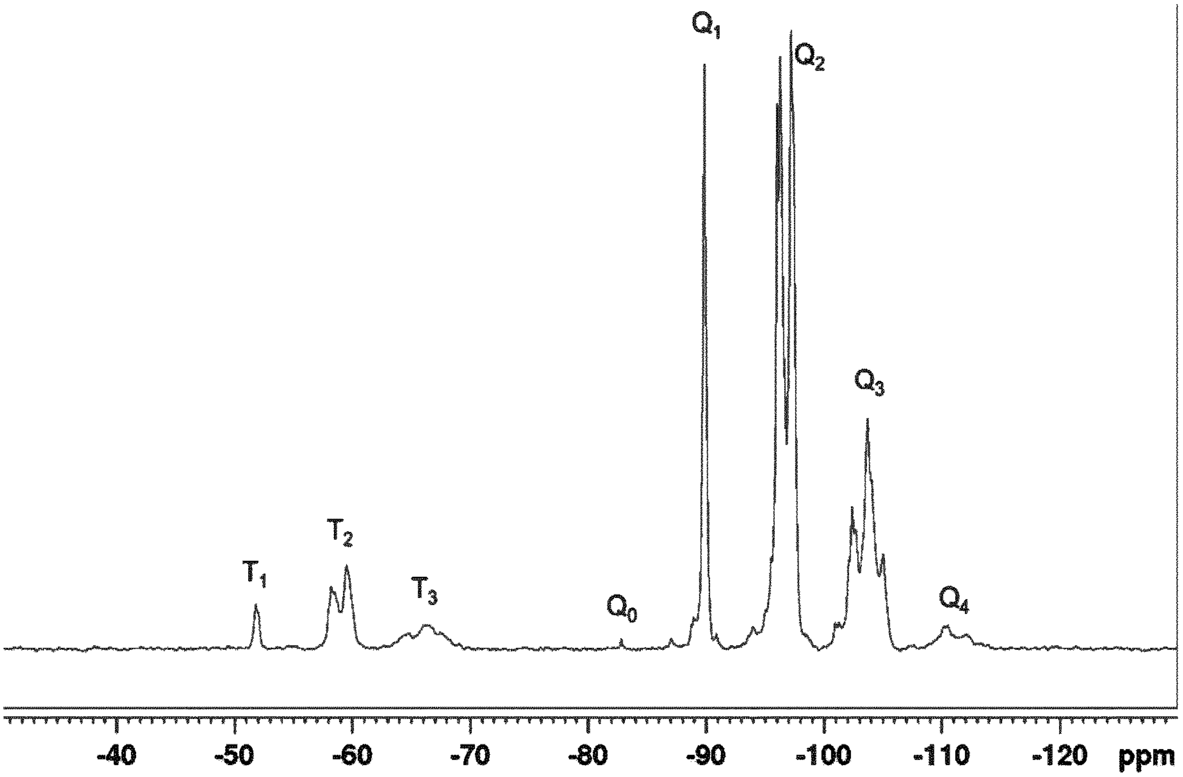
FIG. 6 shows a $^{29}$Si NMR spectrum of a material prepared from an ethoxy-based Q-type precursor which was essentially free of silanol groups and 15% mol of methyltriethoxy-silane (MTES) measured by the total amount of Q-type moieties in said precursor with 1000 ppm nitric acid was grafted with additional water addition. The corresponding material has a silanol content of >2% and >51% Q-type tetrasiloxane ring species
Figure 7:
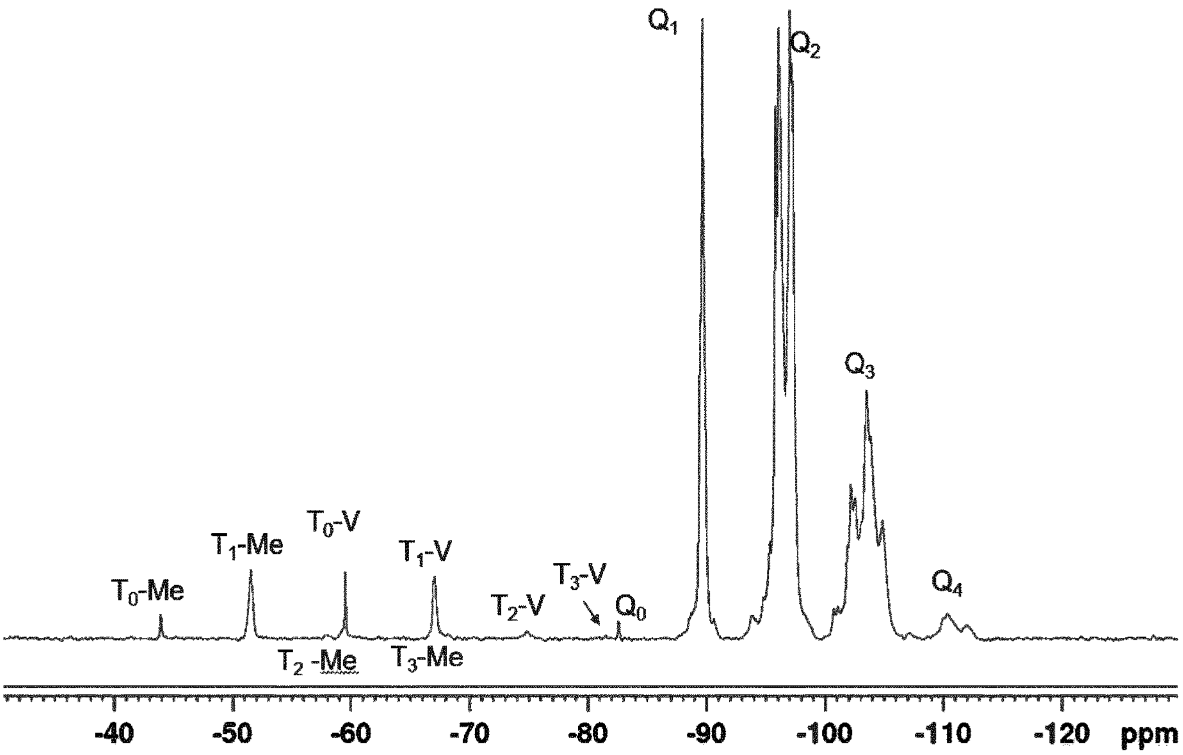
FIG. 7 shows a $^{29}$Si NMR spectrum of a material made from a TEOS oligomer Q-type precursor and two different triethoxysilane monomer T-type precursors, namely methyltriethoxysilane (MTES) and vinyltriethoxysilane (VTES). Individual moieties belonging to the methyl (Me) and isobutyl (iB) $R^5$-functional T-type subpopulations can be clearly spectrally resolved and are labelled for clarity.
Figure 8:
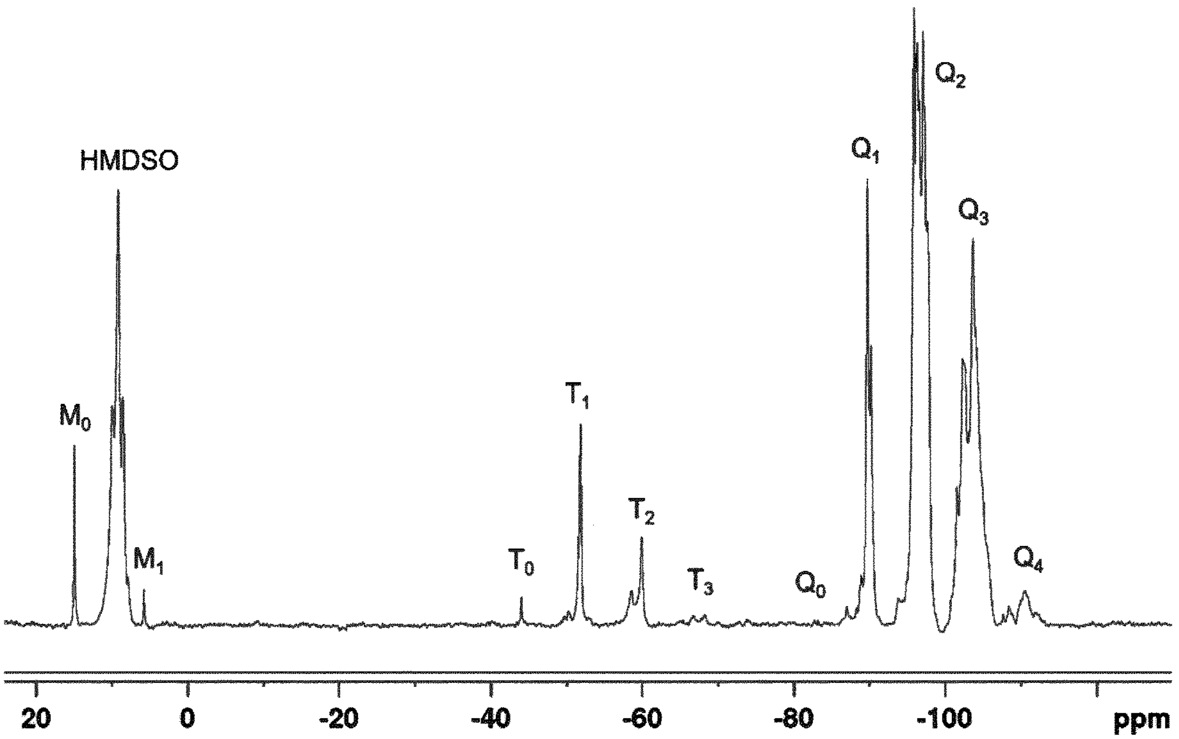
FIG. 8 shows a $^{29}$Si NMR spectrum of a material made from a TEOS Q-type and featuring T-type and D-type moieties with their respective signatures labelled for clarity.
Figure 9:
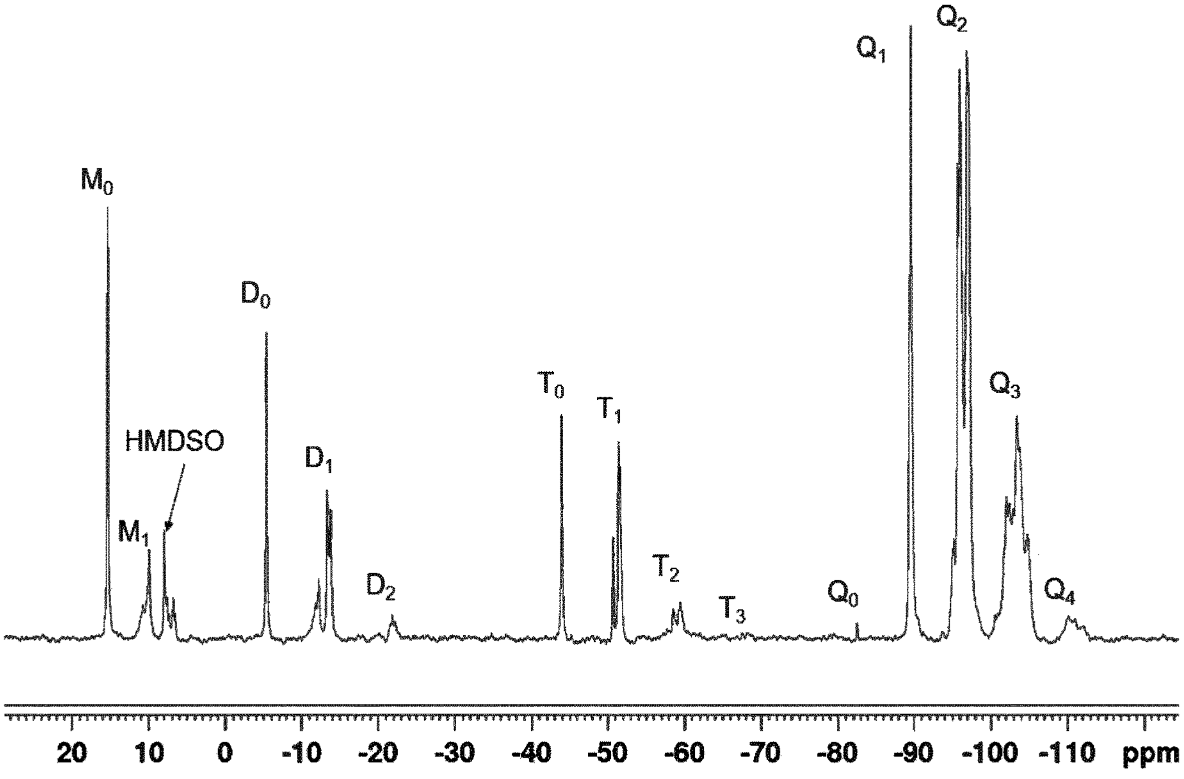
FIG. 9 shows a $^{29}$Si NMR spectrum of a material made from a TEOS Q-type and featuring T-type D-type and M-type moieties with their respective signatures labelled for clarity.
Figure 10:
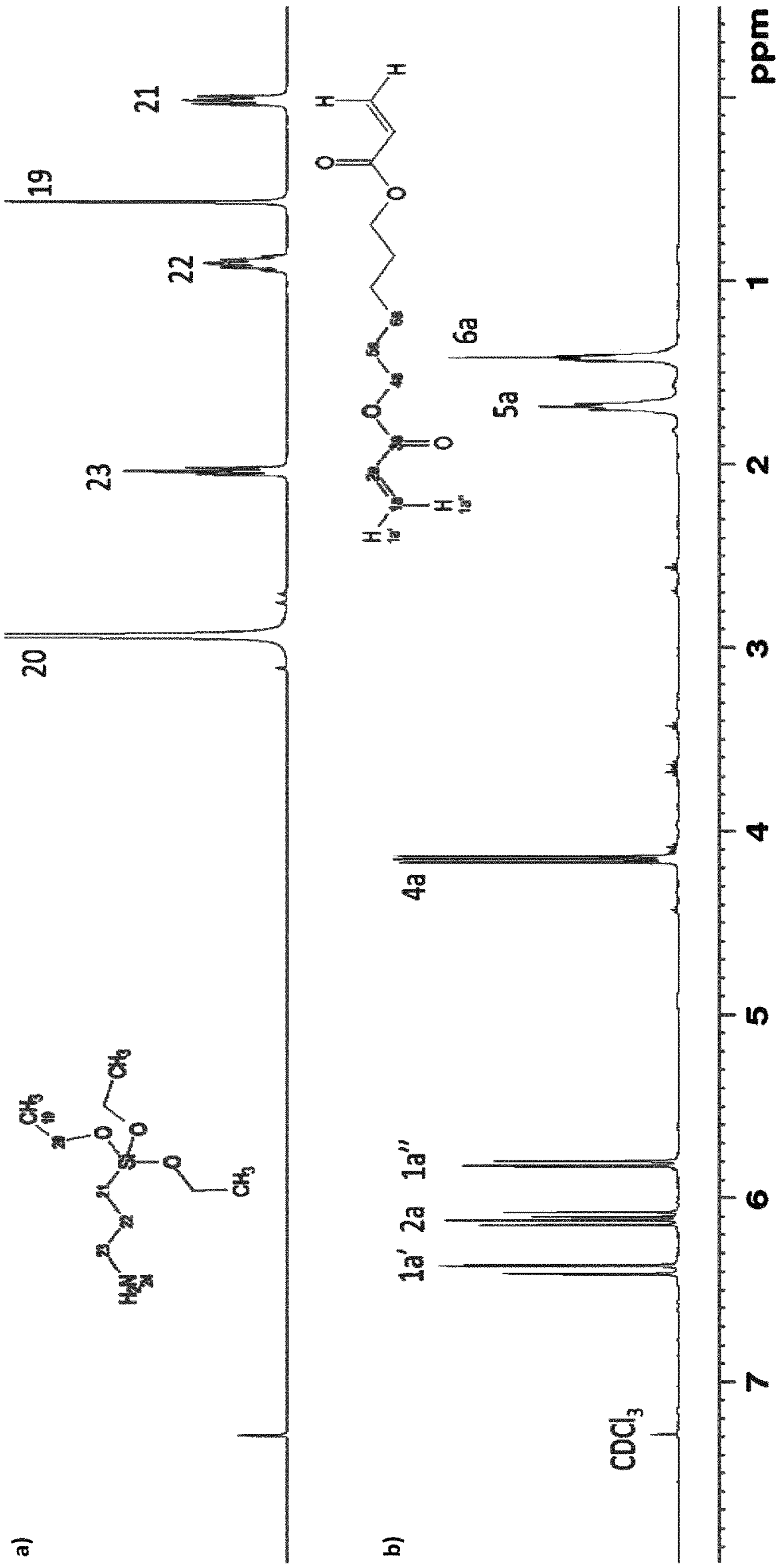
FIGS. 10*a*, 10*b*, 10*c*, and 10*d* show the substitution reaction monitoring by means of $^1$H NMR spectra of the various intermediates used in the preparation of a substituted Q-T polysiloxane material. The various spectra show the unsubstituted ($R^{5U}$=—$CH_2CH_2CH_2$—$NH_2$) $T^0$T-type silane APTES (top), a reference spectrum of the organic substrate used for $R^{5S}$-functionalization hexanediol-diacrylate (HDDA, FIGS. 10*a* and 10*b*), the HDDA-substitution product with APTES constituting a functionalized $R^{5S}$ bearing $T^0$ monomer used later for condensation grafting (FIG. 10*c*) and finally the polysiloxane material featuring said grafted $R^{5S}$-bearing T-type moieties (FIG. 10*d*).
Figure 10:
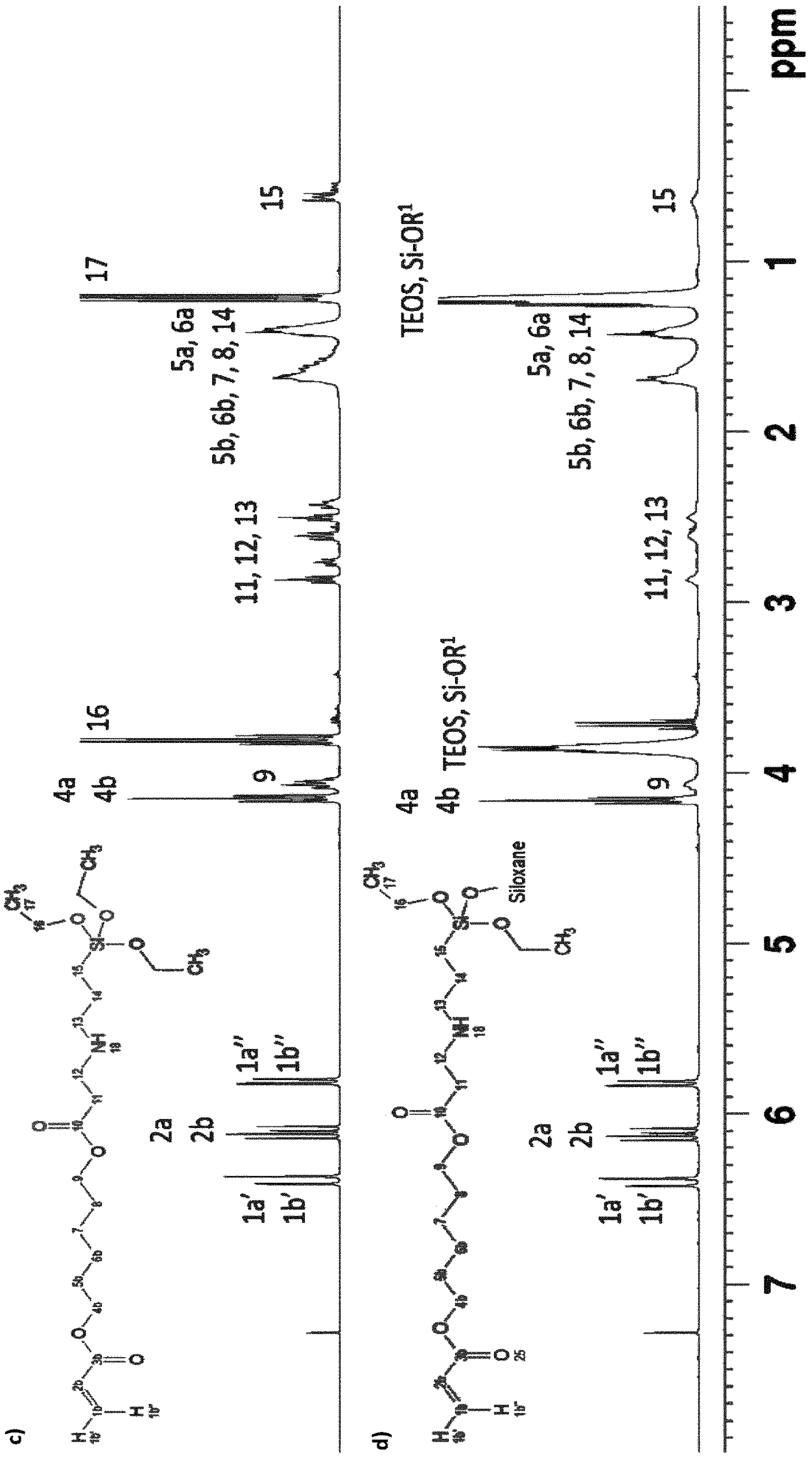
Figure 11:
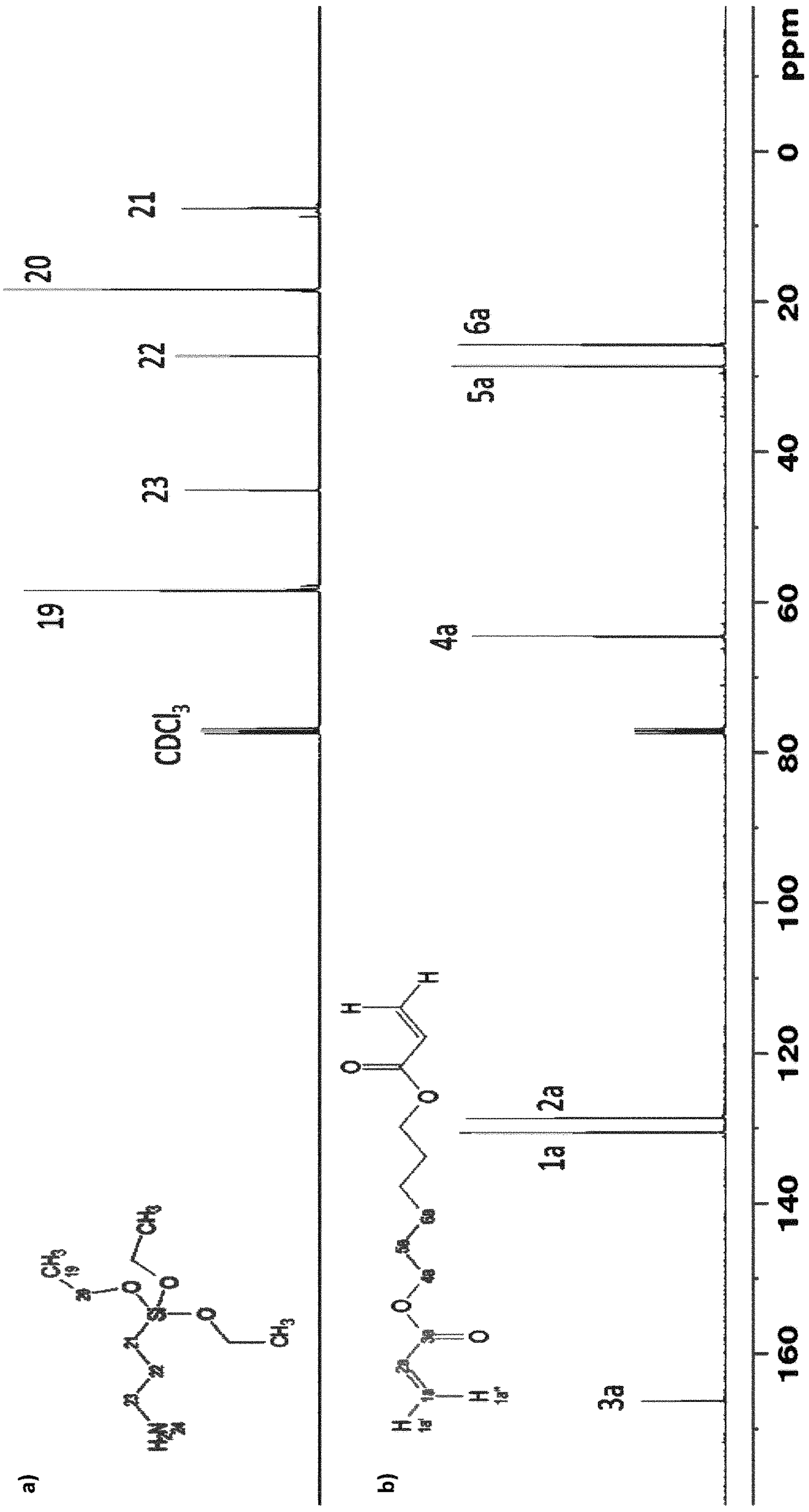
FIGS. 11*a*, 11*b*, 11*c*, and 11*d* show the substitution reaction monitoring by means of $^{13}C$ NMR spectra of the various intermediates used in the preparation of a substituted Q-T polysiloxane material. The various spectra show the unsubstituted ($R^{5U}$=—$CH_2CH_2CH_2$—$NH_2$) $T^0$T-type silane APTES (FIG. 11*a*), a reference spectrum of the organic substrate used for $R^{5S}$-functionalization hexanediol-diacrylate (HDDA, FIG. 11*b*), the HDDA-substitution product with APTES constituting a functionalized $R^{5S}$ bearing $T^0$ monomer used later for condensation grafting (FIG. 11*c*) and finally the polysiloxane material featuring said grafted $R^{5S}$-bearing T-type moieties (FIG. 11*d*).
Figure 11:
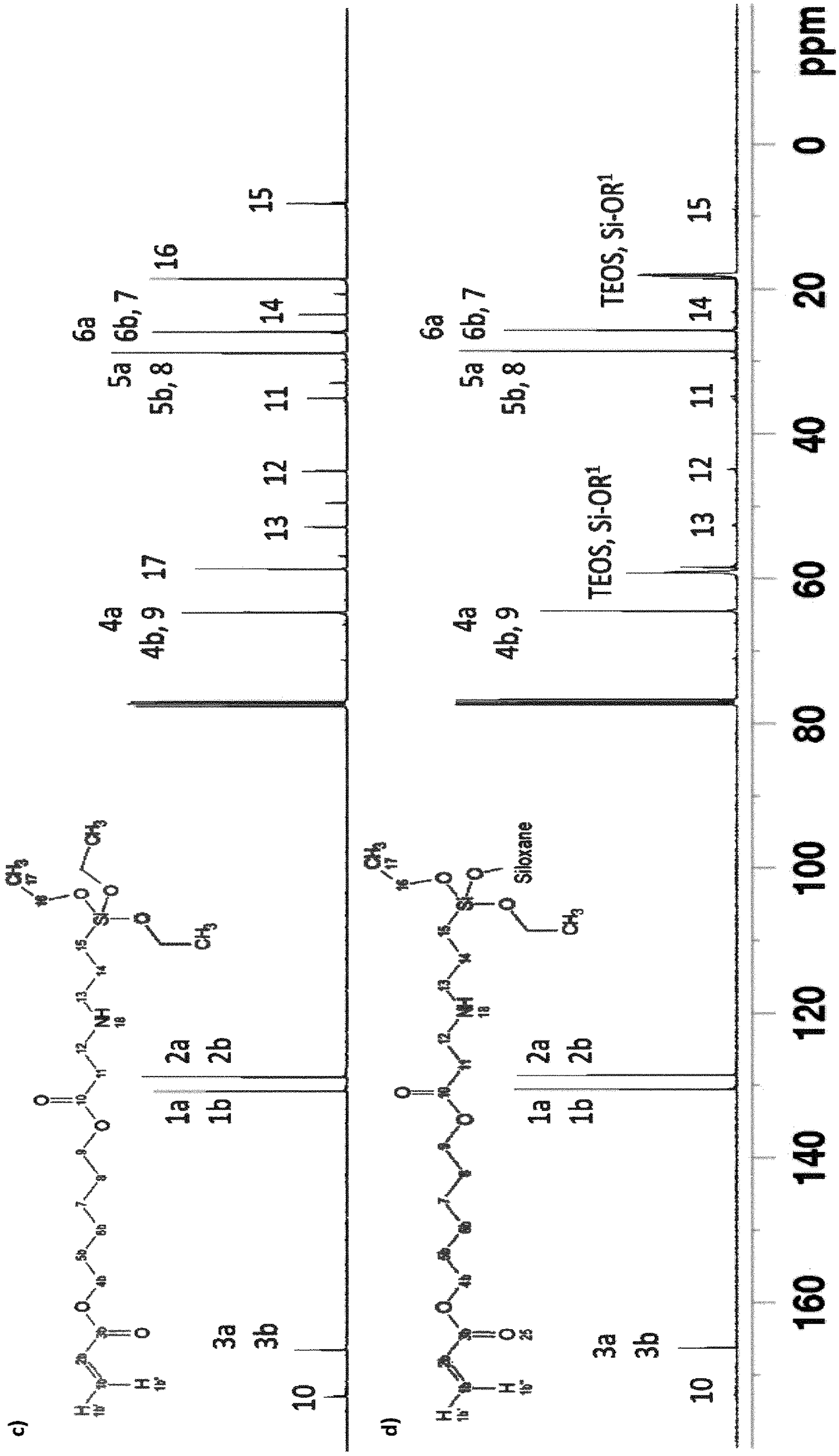

In all examples, the mol-percentage of (tetrasiloxane) ring species refers to the sum of all $Q^2$ and $Q^3$ ring species relative to the total number of Q species also referred herein as %($Q^{2r}$&$Q^{3s,d}$) ring species unless specifically mentioned otherwise.

Example 1

666.5 g/5.22 mol Si equivalent of a commercial ethylsilicate Q-type precursor "Dynasylan Silbond 50" (Evonik Industries) was placed inside a 1000 ml round bottom and heated via electric heating mantle to a temperature of 85° C. Next, 63.2 g/0.385 mol of a monomeric T-type precursor Propylrimethoxysilane (PTMS) was added followed by 0.88 ml of a 1M nitric acid condensation catalyst solution. The mixture was then kept stirring for 24 hours, at which point the heating source was turned off and the mixture allowed to cool to room temperature. $^{29}Si$ NMR analysis confirmed that the product contained less than 14% $T^0$-monomer measured by the total amount of T-type moieties and more than 45% of Q-type tetrasiloxane ring species and >1.1% of Q-type silanol species right after the synthesis.

Example 1b

A material identical to the one described in Example 1 was prepared with the difference that the catalyst used was sulfuric acid and 0.15 ml of a 1M solution was added and that the reaction time was 65 hours. The product contained less than 8% $T^0$-monomer measured by the total amount of T-type moieties and more than 47% of Q-type tetrasiloxane ring species and more than 77% of combined $Q^{30}$d-type siloxane ring species relative to all $Q^3$-type siloxane species in the material. The total Q-type silanol species concentration right after the synthesis was >0.8%.

Example 1c

A material identical to the one described in Example 1 was prepared with the sole difference that in addition to the Propyltrimethoxysilane, also a D-type silane Divinyldimethoxysilane (DVDMS 27.4 g/0.19 mol) was added to the Q-type precursor. The product contained less than 11% $T^0$-monomer measured by the total amount of T-type moieties and more than 48% of Q-type tetrasiloxane ring species. The total Q-type silanol species concentration right after the synthesis was >1.2%.

Example 1d

A material identical to the one described in Example 1c was prepared with the sole difference that the D-type silane used was Divinylchlorosilane (DVDMS 27.4 g/0.19 mol) which is a hydrochloric acid releasing silane. Consequently, no additional condensation catalyst (Nitric acid 1M) was added was added together with the T- and D-type silanes. The product contained less than 6% $T^0$-monomer measured by the total amount of T-type moieties and more than 48% of Q-type tetrasiloxane ring species. The total Q-type silanol species concentration right after the synthesis was >0.6%.

Example 2

1150 g/7.86 mol Si equivalent of a commercial ethylsilicate Q-type precursor "Wacker Silicate TES 40 WN" (Wacker) was placed inside a 21 round bottom flask. Next, 210.2 g/1.18 mol of a monomeric T-type precursor Methyltriethoxysilane (MTES) was added followed by a sulfuric acid condensation catalyst in an amount to make up a concentration of 1000 ppm in the total mixture. During heating of the mixture to 75° C., 36.0 g/2.0 mol of water diluted into 150 ml ethanol were added to the reaction mixture slowly. The mixture was then kept stirring for 48 hours, at which point residual alcohol was removed by vacuum distillation and the mixture allowed to cool to room temperature. $^{29}Si$ NMR analysis confirmed that the product contained less than 2% $T^0$-monomer measured by the total amount of T-type moieties and more than 51% of Q-type tetrasiloxane ring species. The total Q-type silanol species concentration right after the synthesis was >3.7%.

Example 2b

A material identical to the one described in Example 2 was prepared, however after the reaction was complete and before vacuum distillation, a second T-type silane precursor bis-[3-(triethoxysilyl)propyl]tetrasulfide (64.7 g/0.12 mol) were added to the mixture and kept stirring at temperature for an additional 20 hours. The product contained less than 9% $T^0$-monomer measured by the total amount of T-type moieties and more than 49% of Q-type tetrasiloxane ring species. The total Q-type silanol species concentration right after the synthesis was >2.0%.

Example 2c

A material identical to the one described in Example 2b was prepared, however instead of a second T-type silane (TESPT), an M-type silane precursor hexamethyldisiloxane (HMDSO, 152.7 g/0.94 mol) was added during the second condensation step. The product contained less than 19% $T^0$-monomer measured by the total amount of T-type moieties and more than 44% of Q-type tetrasiloxane ring species. The total Q-type silanol species concentration right after the synthesis was >1.4%.

Example 2d

A material identical to the one described in Example 2b was prepared, however 33.7 g/0.15 mol of isobutyltriethoxysilane was added as the second silane (instead of TESPT) together with 16.1 g/0.13 mol of a D-type silane precursor dimethyldimethoxysilane (DMDMS). The product contained less than 16% $T^0$-monomer measured by the total amount of T-type moieties and more than 46% of Q-type tetrasiloxane ring species. The total Q-type silanol species concentration right after the synthesis was >1.4%.

Example 2e

A material identical to the one described in Example 2d was prepared, with the sole difference that during the second condensation step in addition to T-type and D-type silane precursor, also 15.8 g/0.13 mol of an M-type silane precursor trimethylethoxysilane (TMES) were added. The reaction time for the second condensation step was increased from 20 h (example 2b) to 32 hours. The product contained less than 18% $T^0$-monomer measured by the total amount of T-type moieties and more than 48% of Q-type tetrasiloxane ring species. The total Q-type silanol species concentration right after the synthesis was >1.5%.

Example 3

225 g/2.33 mol Si equivalent of an ethylsilicate Q-type precursor prepared by hydrolysis and condensation of TEOS with a degree of polymerization DP Q-type of 2.27 and 10.5% of Q-type silanol content was placed inside a 500 ml Pyrex glass bottle with tight sealing cap. Next, 63.2 g/0.44 mol of a monomeric T-type precursor Phenyltriethoxysilane (PhTES) was added followed by 3 ml of a 0.2M ethanolic trifluoroacetic acid condensation catalyst solution. The mixture was homogenized and the flask with tightly sealed cap was placed inside a heating cabinet at 100° C. for 28 hours. Residual volatiles were then removed on a standard laboratory rotary evaporator. $^{29}$Si NMR analysis confirmed that the product contained less than 7% $T^0$-monomer measured by the total amount of T-type moieties and more than 51% of Q-type tetrasiloxane ring species and >2.6% of Q-type silanol species right after the synthesis.

Example 3b

A material identical to the one described in Example 3 was prepared, yet, additionally an M-type silane precursor trimethylethoxysilane (TMES, 22.1 g/0.19 mol) was added together with the T-type silane and the homogenized mixture was split up into 8 teflon microwave tubes. The reaction was then carried out in a microwave reactor at a set temperature of 125° C. in a series of 12 repeating microwave heating cycles of 30 minutes each followed by a cooldown period. After removal of volatiles on a rotary evaporator, the final product contained less than 12% $T^0$-monomer measured by the total amount of T-type moieties and more than 41% of Q-type tetrasiloxane ring species. The total Q-type silanol species concentration right after the synthesis was >1.8%.

Example 3c

A material identical to the one described in Example 3 was prepared with the differences that the Q-type precursor material was derived from Tetramethoxysilane (TMOS) and had a DP-value of 2.03 and that it also contained an amount of 0.13 mol of co-condensated T-type precursor 3-azidopropyl-trimethoxysilane. $^{29}$Si NMR analysis confirmed that the product contained less than 8% $T^0$-monomer measured by the total amount of T-type moieties and more than 43% of Q-type tetrasiloxane ring species and >2.0% of Q-type silanol species right after the synthesis.

Example 3d

A material identical to the one described in Example 3 was prepared with the differences that the Q-type precursor material was derived from a mixture of Ethylsilicate 40 and tetrapropoxysilane (TPOS) with a molar ratio of Si from ethoxy-terminated to propoxy-terminated of 6.3:1 and had a DP-value of 1.97 and that it also contained an amount of 0.41 mol of co-condensated T-type precursor 3-glycidoxypropyl-trimethoxysilane. $^{29}$Si NMR analysis confirmed that the product contained less than 11% $T^0$-monomer measured by the total amount of T-type moieties and more than 45% of Q-type tetrasiloxane ring species and >2.0% of Q-type silanol species right after the synthesis.

Example 3e

A material identical to the one described in Example 3 was prepared with the difference that after the first T-type silane (PhTES) condensation, an M-type silane Hexamethyldisiloxane (HMDSO, 58.2 g/0.36 mol) was also grafted in a second step, over the course of 22 hours at 100° C. in the same heating cabinet. $^{29}$Si NMR analysis confirmed that the product contained less than 8% $T^0$-monomer measured by the total amount of T-type moieties and more than 43% of Q-type tetrasiloxane ring species and >1.9% of Q-type silanol species right after the synthesis.

Example 3f

A material identical to the one described in Example 3e was prepared with the differences that during the second HMDSO condensation grafting step, a D-type precursor (diphenyldimethoxy-silane, DPhDMS, 57.6 g/0.24 mol) was also cocondensated together with the HMDSO. The process conditions for the second condensation were otherwise left unchanged. $^{29}$Si NMR analysis confirmed that the product contained less than 10% $T^0$-monomer measured by the total amount of T-type moieties and more than 44% of Q-type tetrasiloxane ring species and >1.7% of Q-type silanol species right after the synthesis.

Example 3g

A material identical to the one described in Example 3f was prepared with the differences that during the second HMDSO/DPhDMS condensation grafting step, a mixture of 3.8 g of water in 45 ml of absolute methanol was added and the resulting mixture briefly homogenized. The process conditions for the second condensation were otherwise left unchanged. $^{29}$Si NMR analysis confirmed that the product contained less than 5% $T^0$-monomer measured by the total amount of T-type moieties and more than 46% of Q-type tetrasiloxane ring species and >3.2% of Q-type silanol species right after the synthesis.

Example 3h

A material identical to the one described in Example 3 was prepared with the difference in a condensation grafting step, a prehydrolysate of dimethyldiethoxysilane (DMDES, 0.11 mol total Si), which had been previously been prepared by controlled hydrolysis of the monomer in ethanolic solution with a DP D-type=0.94 was used. The process conditions for the second condensation were otherwise left unchanged. $^{29}$Si NMR analysis confirmed that the product contained less than 8% $T^0$-monomer measured by the total amount of T-type moieties and more than 50% of Q-type tetrasiloxane ring species and >1.5% of Q-type silanol species right after the synthesis.

Example 3i

A material identical to the one described in Example 3 was prepared with the difference that the T-type precursor used was 3-mercaptopropyl-trimethoxysilane (MPTMS) in oligomercic form with a DP-$T_{type}$ of 1.06 (before the condensation reaction) which had previously been prepared by controlled hydrolysis of the T-type monomer MPTMS in ethanolic solution. $^{29}$Si NMR analysis confirmed that the product contained less than 4% $T^0$-monomer measured by the total amount of T-type moieties and more than 48% of Q-type tetrasiloxane ring species and >1.5% of Q-type silanol species right after the synthesis.

Example 3j

A material identical to the one described in Example 3 was prepared with the sole difference that a different Q-type precursor was used which had previously been prepared by controlled hydrolysis of tetrapropoxysilane (TPOS) which had a DP-$Q_{type}$ value of 1.79 (before the condensation grafting reaction). with a NMR analysis confirmed that the product contained less than 18% $T^0$-monomer measured by the total amount of T-type moieties and more than 39% of Q-type tetrasiloxane ring species and >1.5% of Q-type silanol species right after the synthesis.

Example 3k

A material identical to the one described in Example 3 was prepared with the difference that the Q-type precursor had been prepared by condensation of tetraethoxysilane using the silanol route (preparation of trimethoxysilanol using first a strong base to prepare sodium treithoxysilanloate and second the subsequent protonation with acetic acid to create tiethoxysilanol and third condensation of the triethoxysilanol obtained in this way) and that 0.13 mol of water in 5 ml Ethanol were added during the condensation grafting step of the T-type silane. NMR analysis confirmed that the product contained less than 9% $T^0$-monomer measured by the total amount of T-type moieties and more than 47% of Q-type tetrasiloxane ring species and >2.2% of Q-type silanol species right after the synthesis.

Example 4

A material identical to the one described in Example 3 was prepared with the difference that two T-type precursors were used, namely Methlytriethoxysilane and Mercaptopropyl-trimethoxysilane (MPTMS). Following the successful preparation of the $R^{5U}$ (mercaptopropyl) functional polysiloxane material, a partial substitution of the $R^{5U}$ reactive thiopropyl groups using a thiol-ene reaction was carried out. To do so, the material was mixed with hexyl-acrylate in the presence of DMF as a solvent. 1% by weight of a phosphine catalyst (e.g. Dimethylphenylphosphine) was added and the reaction was left stirring for 12 hours. The reaction product was isolated and an $R^{5S}$ degree of substitution of groups of 50% confirmed by 1H NMR.

Example 4b

A substituted material was prepared based on an existing phenyl-functional material. Following the successful preparation of said $R^{5U}$ material according to example 3b, bromination on the aromatic phenyl rings was then carried out with elemental bromine in a 1:1 molar ration of—phenyl groups to $Br_2$ in in a neat system with $FeBr_3$ as a catalyst. The reaction product was isolated and a mixture of different Bromine ring substitutions was visible in the $^1$H and $^{13}$C NMR $R^{5S}$, with a quantification yielding an average degree of substitution of 1.3 Br per phenyl (65% of the theoretical substitution yield).

Example 4c

A substituted material according to the preparation protocol used in Example 1 was prepared, however an $R^{5S}$ T-Type substituted monomer was used for grafting instead of PTES and a reaction time of 30 h was chosen. The substituted monomer had previously been prepared by reacting a 3:1 molar excess of hexanediol-diacrylate (HDDDA) with aminopropyltriethoxysilane (APTES) at room temperature. $^{29}$Si NMR analysis confirmed that the product contained less than 11% $T^0$-monomer measured by the total amount of T-type moieties and more than 42% of Q-type tetrasiloxane ring species and >0.8% of Q-type silanol species right after the synthesis

Example 5

Efficiency Testing for Potential Condensation Grafting Catalysts

A protocol was devised to test various model catalysts for their efficiency to catalyze grafting of a T-type monomeric model silane methyltriethoxysilane (MTES). Briefly, a Q-type precursor made by hydrolysis of ethylsilicate-40 with a $DP_{Q\text{-}type}$ value of 2.08 and with 9% silanol content was used. A molar ratio $_{nQ\text{-}type}$:$n_{T\text{-}type}$ of 1:0.15 was chosen and 30 ml aliquots of a premixed solution containing said Q-type and T-type silane precursor were filled into 50 ml glass bottles with lid. To each bottle, 1000 ppm of a model condensation catalyst was added and a blank sample was further included in the study. All glass bottles were simultaneously placed inside a heating cabinet which was kept at 100° C. and the samples were left there for a 24 h incubation period. After that, they were removed from the cabinet and allowed to cool to room temperature and analyzed by means of $^{29}$Si NMR spectroscopy.

| Catalyst: | $DP_{Q\text{-}Type}$ | $DP_{T\text{-}Type}$ | % $T^0$ | % $(Q^{2r}\&Q^{3s,d})/Q_{tot}$ | % $(Q^{3d})/Q^3$ | Condensation catalyst performance |
|---|---|---|---|---|---|---|
| Nitric acid | 2.20 | 1.39 | 9.9 | 51.4 | 83.2 | High |
| Sulfuric acid | 2.18 | 1.12 | 5.8 | 48.6 | 82.9 | High |
| Acetic acid | 2.16 | 0.73 | 38.7 | 49.9 | 83.3 | Medium |

Following the spectral NMR analysis, one can evaluate the performance and suitability of a catalyst in terms of its ability to graft $T^0$ monomers ($DP_{T\text{-}Type}$ and % $T^0$ indicators) as well as the percentage of residual tetrasiloxane ring species after the grafting step (%($Q^{2r}$&$Q^{3s,d}$)/$Q_{tot}$ and %($Q^{3s,d}$)/$Q^3$ indicators). Generally, the protocol gives a comparative indication, as poorly performing catalysts could also be used but would require higher reaction temperatures, longer reaction times or higher concentrations to achieve the same or a comparable grafting effect.

Example 6

Hydrolysis of a Polymeric Liquid Material 69 g of Ethanol and 55.3 g of a crude reaction product from Example 2b were mixed and heated to 40° C. in an Erlenmeyer flask with stirring. Once the temperature had equilibrated, 6 ml of a 0.3 M nitric acid solution was added followed by 4.5 ml of distilled water. After a brief mixing step (magnetic stirrer), the solution was transferred into a glass bottles with hermetically sealing cap and kept in an oven at 50° C. for 12 hours. The final hydrolysis product was then filtered and stored in the refrigerator.

Example 7

Preparation of a Water in Oil Emulsion 149 g of a sample of a material sample of Example 3i was mixed with 400 ml of distilled water and 19 g of a surfactant (Sodium laurate) were added. The two-phase system was then vigorously stirred using a mechanical impeller stirrer at 35° C. for 1 h. The resulting emulsion was a low-viscous stable emulsion with good shelf life.

Example 8

Preparation of an Oil in Water Emulsion 90 g of a sample of a material sample of Example 2c was mixed with 34.5 ml distilled water and 0.4 g of a surfactant (Pluronic P123). The two-phase system was then homogenized using a high-rpm mechanical homogenizer. The resulting emulsion was a creamy paste, which had a shelf life of several weeks when kept in a tightly sealed container.

The invention claimed is:

1. A polymeric liquid polysiloxane material comprising:

(i) non-organofunctional Q-type siloxane moieties selected from the group consisting of:

$Q^1$

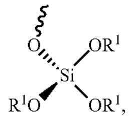

$Q^2$

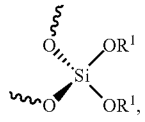

$Q^3$

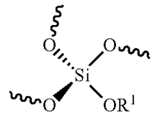

and

-continued $Q^4$

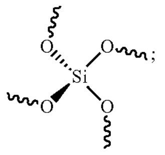

and (iv) mono-organofunctional T-type siloxane moieties selected from the group consisting of:

$T^1$

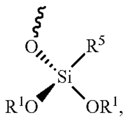

$T^2$

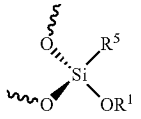

and $T^3$

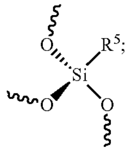

wherein

⌇ indicates a covalent siloxane bond to a silicon atom of another Q and/or T-type moiety as defined in (i) and/or (iv);

$R^1$ is selected from the group consisting of methyl, ethyl, propyl, —P(═O)(OR$^{1'}$) (OH), —P(OR$^{1'}$)$_2$, and —P(═O)(OH)$_2$;

$R^{1'}$ is selected from the group consisting of methyl, ethyl, propyl and butyl;

$R^2$, $R^3$ and $R^4$ are each independently selected from the group consisting of methyl, ethyl, phenyl, cyclohexyl, vinyl, —$CH_2$—$CH_2$—Cl and cyclopentadienyl;

$R^6$ is selected from the group consisting of methyl, ethyl, n-butyl, linear $C_{5-14}$ alkyl residues and branched $C_{5-14}$ alkyl residues;

n is an integer selected from the group consisting of 1, 2, 3, 4 and 5;

$R^8$ is selected from the group consisting of —Cl, —Br, —I, —F, —CN, —SCN, —$N_3$, —$NO_2$, —OH, —$SO_2OR^{1'}$, and —O—C(═O)$R^{12}$, $R^9$ is selected from the group consisting of —Cl, —Br, —I, —F, —CN, —COOH, —COOR$^{1'}$, phenyl, o-, m-, and p-vinylphenyl;

$R^{9'}$ is selected from the group consisting of —COOH and —COOR$^{1'}$;

$R^5$ is selected from the group consisting of $R^{5U}$ and $R^{5S}$, wherein $R^{5U}$ is selected from the group consisting of methyl, ethyl, n-propyl, isopropyl, n-butyl, t-butyl, linear, branched or cyclic $C_{5-16}$ alkyl residues, (3,3,3-trifluoro) propyl, (1H,1H, 2H, 2H-perfluoro) octyl, (1H,1H, 2H, 2H-perfluoro) dodecyl, (1H,1H, 2H, 2H-perfluoro) hexadecyl, vinyl, phenyl, cyclopentadienyl,

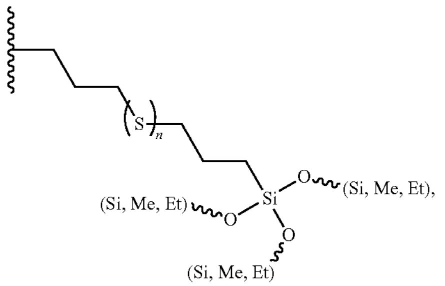
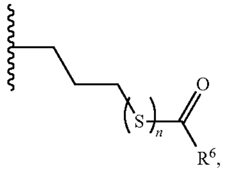
and -L-Z, wherein
L is an aliphatic linker selected from the group consisting of $-CH_2-$, $-CH_2CH_2-$, $-CH_2CH_2CH_2-$, $-C_6H_4-$, $-C_6H_4-CH_2-$, and $-CH_2-CH_2-C_6H_4-CH_2$; and
Z is a moiety selected from the group consisting of CI, Br, I, —OH, —SH,
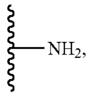
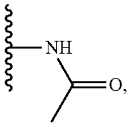
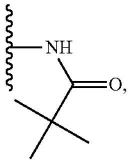
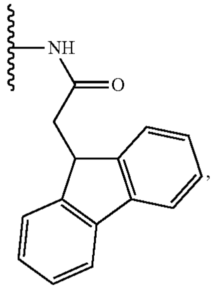
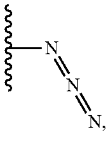
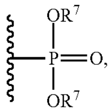
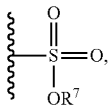
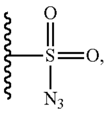
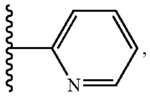
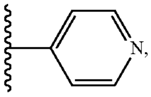
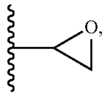
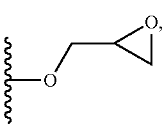
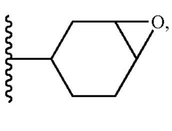
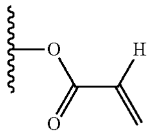
and
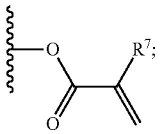
wherein $R^7$ is selected from the group consisting of methyl, ethyl, and n-butyl;
$R^{5.S'}$ is selected from the group consisting of
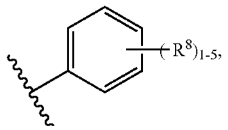
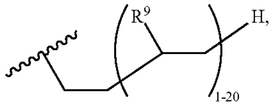
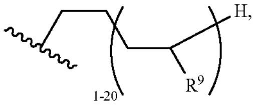
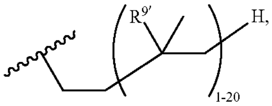
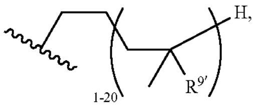
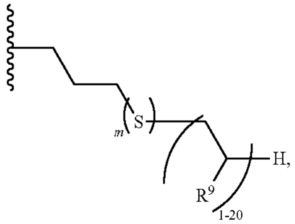
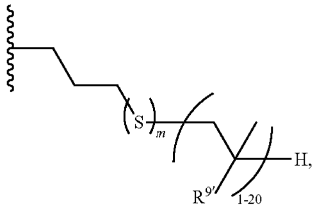
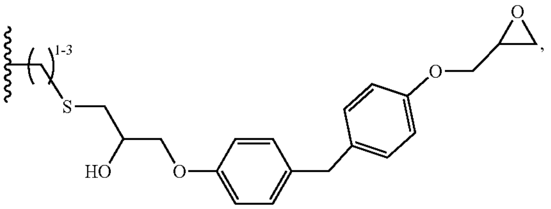
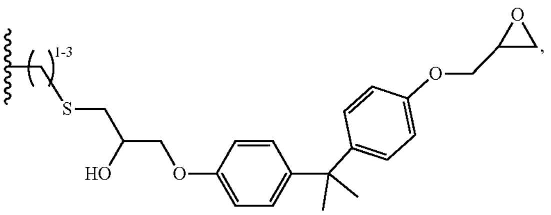
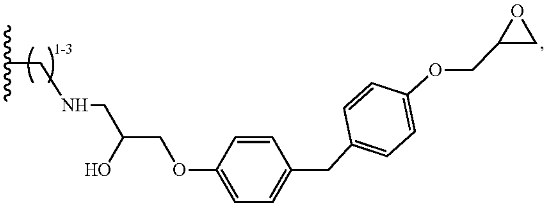

-continued
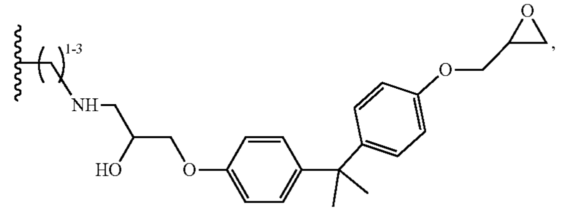
and -L'-Y, wherein
m is an integer selected from the group consisting of 1, 2, 3 and 4;
L' is an aliphatic linker selected from the group consisting of $-CH_2-$, $-CH_2CH_2-$, and $-CH_2CH_2CH_2-$; and
Y is a moiety selected from the group consisting of
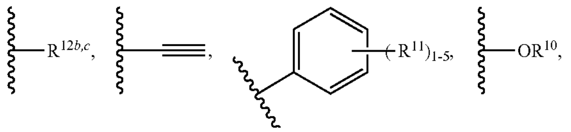
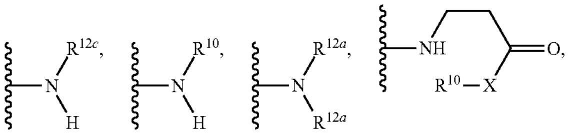
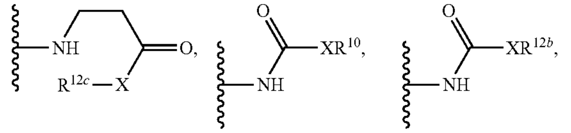
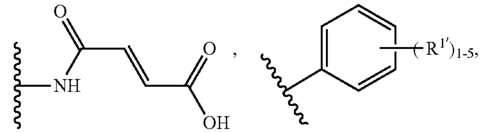
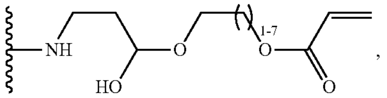
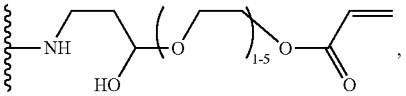
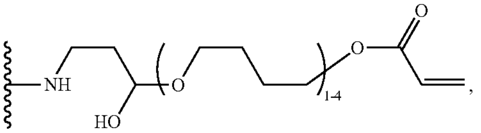
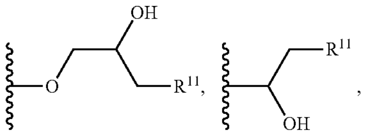
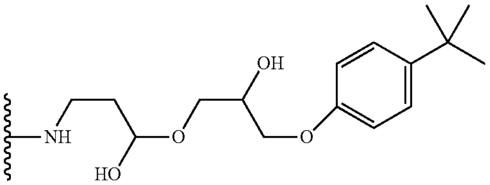
-continued
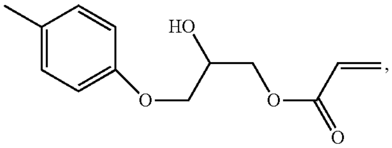
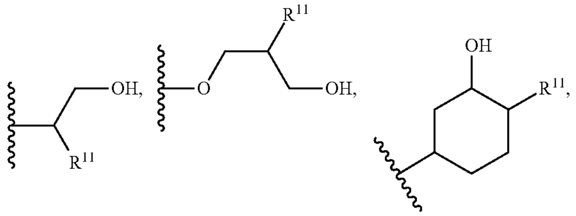
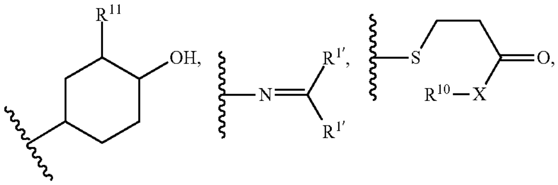
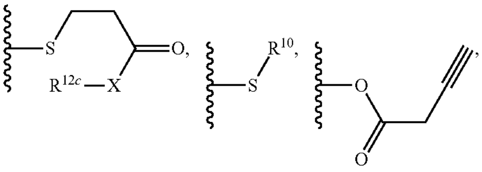
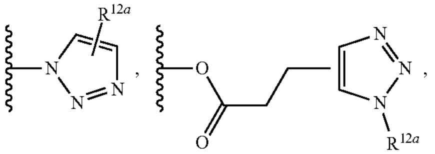
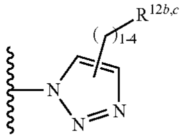
and
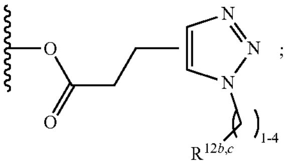
wherein
X is absent, —(NH)—, or —O—;
$R^{10}$ is selected from the group consisting of
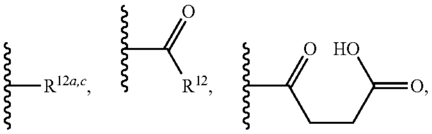
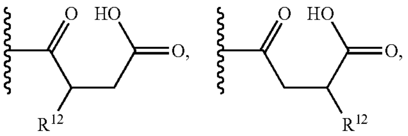

-continued

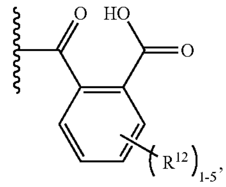

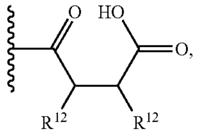

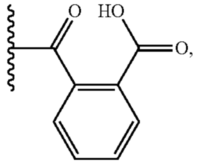

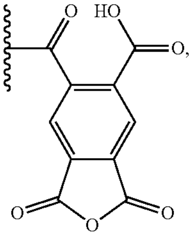

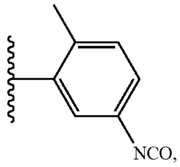

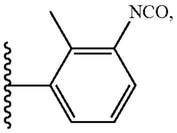

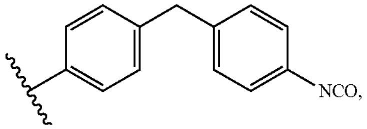

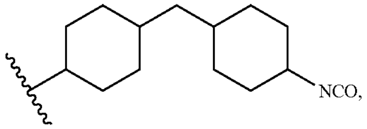

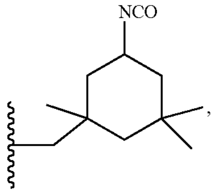

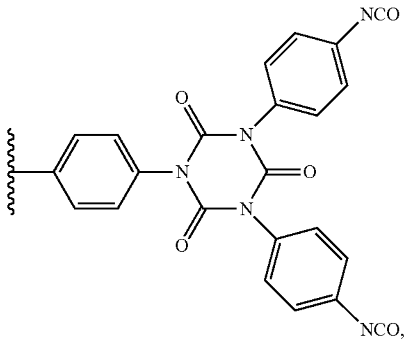

-continued

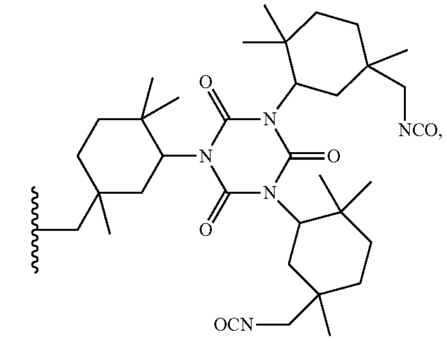

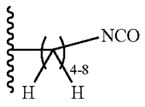

and

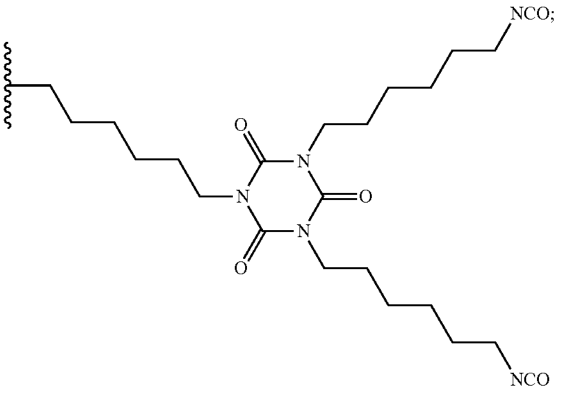

$R^{11}$ is selected from the group consisting of $R^8$, -X-$R^{1\prime}$ and $R^{12c}$, $R^{12}$ is selected from the group consisting of $R^{12a}$, $R^{12b}$ and $R^{12c}$, wherein $R^{12a}$ is selected from the group consisting of linear or branched, substituted or non-substituted $C_{1-18}$ alkyl, linear or branched, substituted or non-substituted $C_{2-18}$ alkenyl and linear or branched, substituted or non-substituted $C_{2-18}$ alkynyl;

$R^{12b}$ is selected from the group consisting of linear or branched, substituted or non-substituted alkyl ether up to a molecular weight of 5000 g/mol, linear or branched, substituted or non-substituted alkenyl ether up to a molecular weight of 5000 g/mol, and linear or branched, substituted or non-substituted alkynyl ether up to a molecular weight of 5000 g/mol;

unsubstituted polydimethylsiloxane and unsubstituted polydivinylsiloxane; and polysaccharides up to a molecular weight of 5000 g/mol and oligosaccharides up to a molecular weight of 5000 g/mol; and $R^{12c}$ is selected from the group consisting of amino acids, oligo-peptides up to a molecular weight of 5000 g/mol and poly-peptides up to a molecular weight of 5000 g/mol; and $C_{12-24}$ fatty acids;

with the proviso that $R^{5S}$ is not

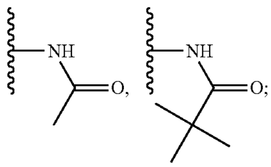

wherein the degree of polymerization of the Q-type siloxane moieties according to $DP_{Q\text{-}type}=\Sigma(n\ A_{Qn})/\Sigma(A_{Qn})=(A_{Q1}+2\ A_{Q2}+3\ A_{Q3}+4\ A_{Q4})/(A_{Q0}+A_{Q1}+A_{Q2}+A_{Q3}+A_{Q4})$ is in the range of 1.3 to 2.7, wherein Qn is a Si atom coordinated by n siloxane bonds through bridging oxygen atoms;

the degree of polymerization of the T-type siloxane moieties according to $DP_{T\text{-}type}=\Sigma(n\ A_{Tn})/\Sigma(A_{Tn})=(A_{T1}+2\ A_{T2}+3\ A_{T3})/(A_{T0}+A_{T1}+A_{T2}+A_{T3})$ is in the range of 0.9 to 2.7, wherein Tn is a Si atom coordinated by n siloxane bonds through bridging oxygen atoms;

the material has a viscosity in the range of 10 to 100'000 cP;

the material comprises more than 0.25 mol-% silanol groups (Si—OH);

the atomic ratio of T- to Q-species in the material is in the range of 0.01:1 to 1:1;

0 mol-% or at least 1 mol-% of all $R^5$ moieties in the material are $R^{5S}$ moieties;

wherein the polysiloxane material comprises more than 25 mol-% four-membered combined $Q^{2r}$-type and $Q^{3,sd}$-type siloxane ring species relative to the total Q-type siloxane species; and/or the polysiloxane material comprises more than 50 mol-% four-membered combined $Q^{3s,3d}$-type siloxane ring species relative to all $Q^3$-type siloxane species; and/or the polysiloxane material comprises more than 3.0 mol-% double four-membered $Q^{3d}$-type siloxane ring species relative to the total Q-type siloxane species; and/or the polysiloxane material comprises more than 14 mol-% double four-membered $Q^{3d}$-type siloxane ring species relative to all $Q^3$-type siloxane species.

2. The polymeric liquid polysiloxane material according to claim 1, wherein at least 1 mol-% of all $R^5$ moieties in the material are $R^{5S}$ moieties;

$R^8$ is selected from the group consisting of —Cl, —Br, —I, —CN, —SCN, —$N_3$, —$NO_2$, —$SO_2OR^{1'}$, and —O—C(=O)$R^{1'}$;

Y is selected from the group consisting of

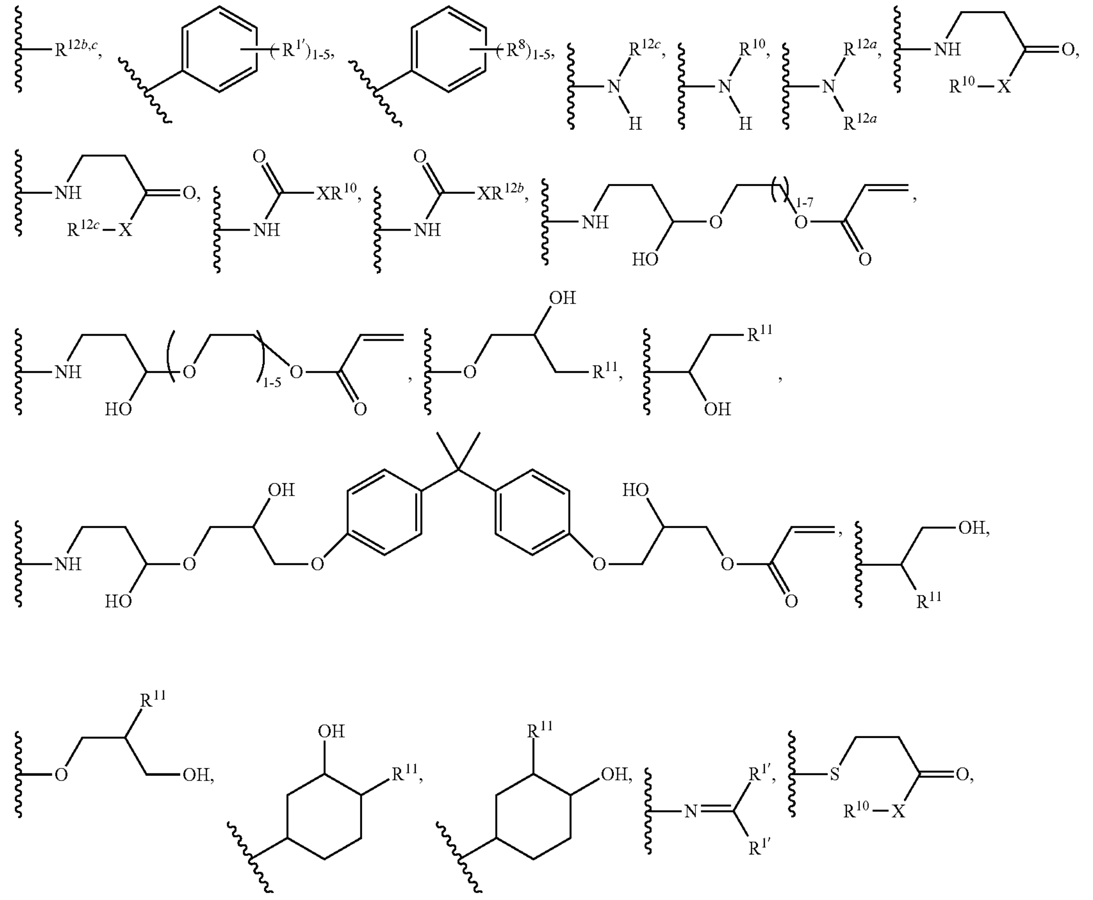

-continued

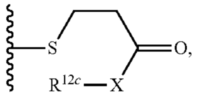

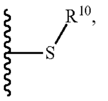

and

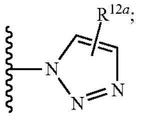

$R^{10}$ is selected from the group consisting of

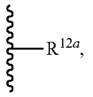

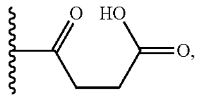

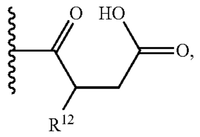

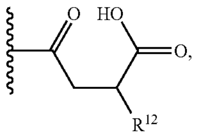

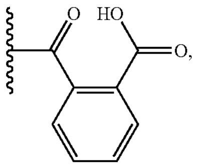

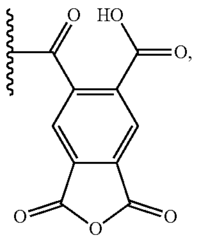

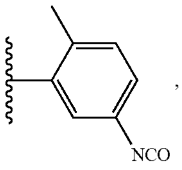

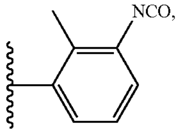

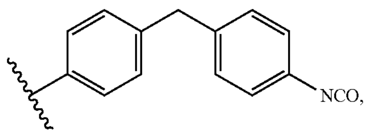

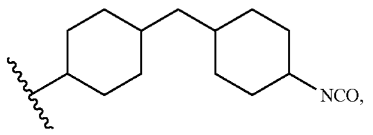

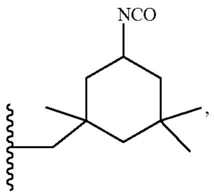

-continued

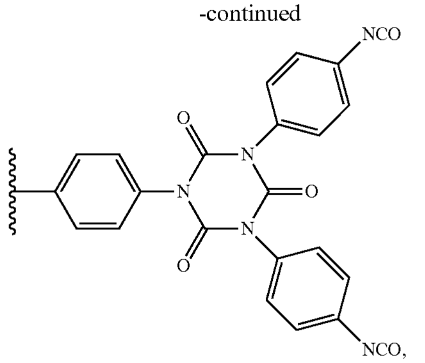

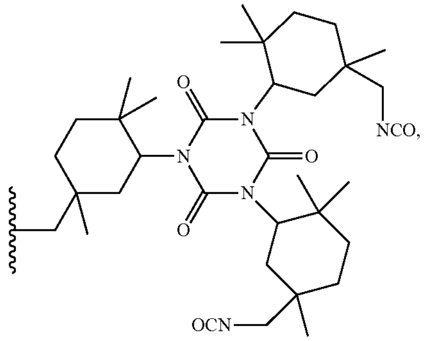

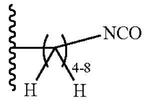

and

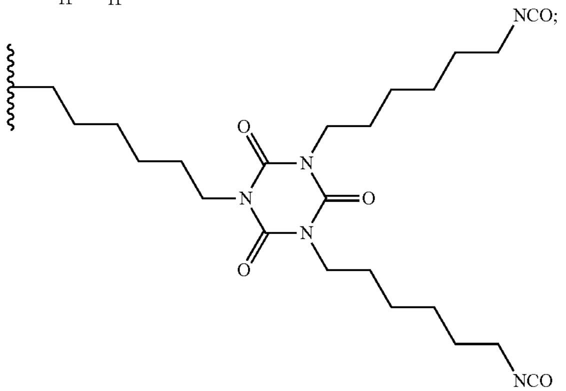

$R^{11}$ is selected from the group consisting of $R^8$ and $R^{12c}$; and $R^{12}$ is selected from the group consisting of $R^{12a}$, $R^{12b}$, and $R^{12c}$, wherein $R^{12a}$ is selected from the group consisting of linear or branched, substituted or non-substituted $C_{1-18}$ alkyl, and linear or branched, substituted or non-substituted $C_{2-18}$ alkenyl;

$R^{12b}$ is selected from the group consisting of linear or branched, non-substituted or terminally amino-or thiol-substituted alkyl ethers up to a molecular weight of 3000 g/mol and linear or branched, non-substituted or terminally amino-or thiol-substituted-or-alkenyl ethers up to a molecular weight of 3000 g/mol;

polysaccharides up to a molecular weight of 3000 g/mol and oligosaccharides up to a molecular weight of 3000 g/mol; and unsubstituted polydimethylsiloxane and unsubstituted polydivinylsiloxane; and $R^{12c}$ is selected from the group consisting of amino acids, oligo-peptides up to a molecular weight of 3000 g/mol and poly-peptides up to a molecular weight of 3000 g/mol; and $C_{12-24}$ fatty acids.

3. The polymeric liquid polysiloxane material according to claim 2, wherein $R^8$ is selected from the group consisting of —Cl, —Br, —I, —CN, —SCN, —$N_3$, —$NO_2$, —$SO_2OR^{1'}$, and —O—C(=O)$R^{1'}$;

Y is selected from the group consisting of

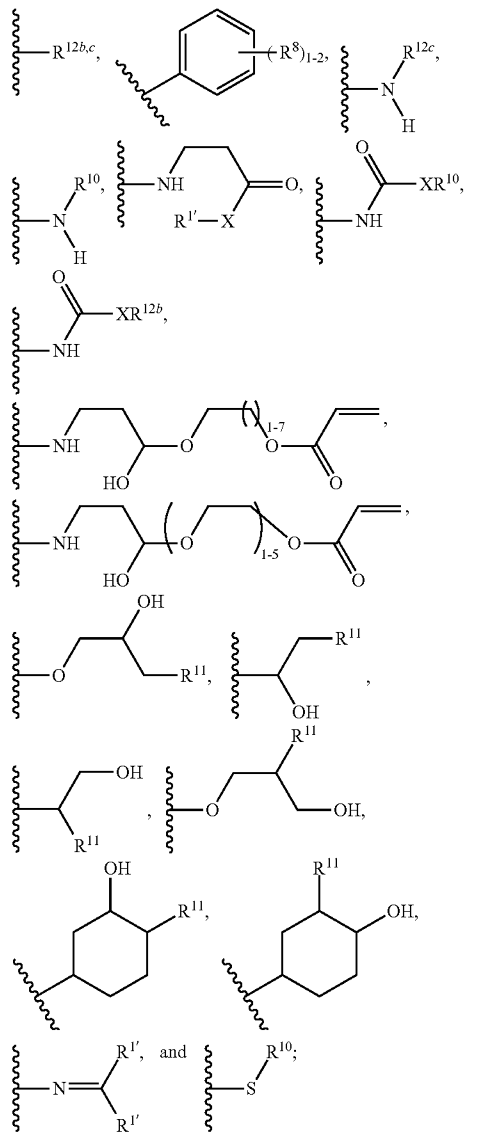

$R^{10}$ is selected from the group consisting of

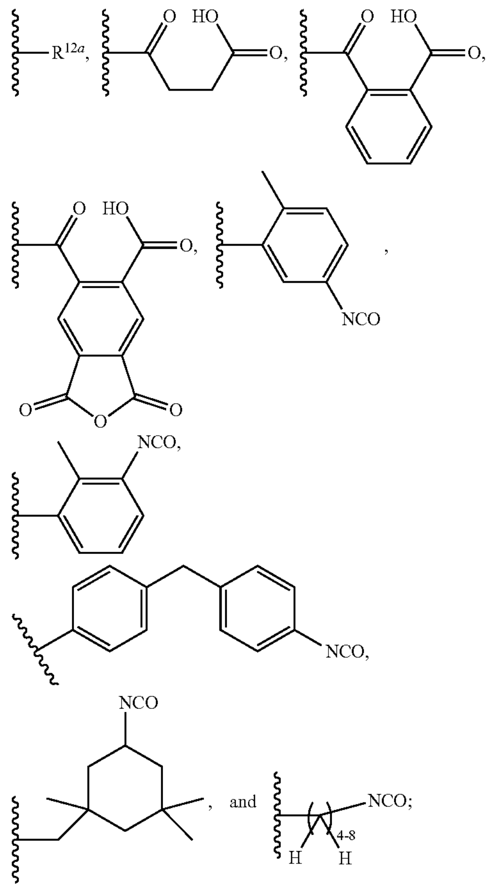

$R^{11}$ is selected from the group consisting of $R^8$ and $R^{12c}$, and $R^{12}$ is selected from the group consisting of $R^{12a}$, $R^{12b}$, and $R^{12c}$, wherein $R^{12a}$ is selected from the group consisting of linear or branched, substituted or non-substituted $C_{1-12}$ alkyl and linear or branched, substituted or non-substituted $C_{2-12}$ alkenyl;

$R^{12b}$ is selected from the group consisting of linear, non-substituted or terminally amino-substituted alkyl ethers up to a molecular weight of 2000 g/mol; and polysaccharides up to a molecular weight of 2000 g/mol and oligosaccharides up to a molecular weight of 2000 g/mol; and $R^{12c}$ is selected from the group consisting of amino acids, oligo-peptides up to a molecular weight of 2000 g/mol made of naturally occurring amino acids and poly-peptides up to a molecular weight of 2000 g/mol made of naturally occurring amino acids;

castor oil triglycerides, soybean oil triglycerides, and sunflower oil triglycerides; and naturally occurring $C_{12-24}$ fatty acids.

4. The polymeric liquid polysiloxane material according to claim 1, wherein the material comprises (i) at least two non-identically $R^5$-substituted mono-organofunctional T-type siloxane populations, each population making up at least 3 mol-% of all mono-organofunctional T-type siloxane moieties in the material; and/or (ii) chiral mono-organofunctional T1-type siloxane moieties in an amount of at least 3 mol-% relative to all mono-organofunctional T-type siloxane moieties in the material.

5. The polymeric liquid polysiloxane material according to claim 1, wherein (i) the degree of polymerization of the Q-type siloxane moieties $DP_{Q\text{-}type}$ is in the range of 1.5 to 2.5;

and/or (iii) the degree of polymerization of the T-type siloxane moieties $DP_{T\text{-}type}$ is in the range of 1.2 to 2.2.

6. The polymeric liquid polysiloxane material according to claim 1, wherein the total content of di-organofunctional D-type siloxane moieties and/or the total content tri-organofunctional M-type siloxane moieties is zero.

7. The polymeric liquid polysiloxane material according to claim 1, wherein the mono-organofunctional T-type siloxane moieties comprise (i) a first population of mono-organofunctional T-type siloxane moieties, wherein $R^5$ is selected from the group consisting of methyl, ethyl, n-propyl, isopropyl, n-butyl, t-butyl, hexyl, octyl, dodecyl, hexadecyl, (3,3, 3-trifluoro), propyl, (1H,1H, 2H, 2H-perfluoro) octyl, (1H,1H, 2H, 2H-perfluoro) dodecyl and (1H,1H, 2H, 2H-perfluoro) hexadecyl, and either (a) a second population of mono-organofunctional T-type siloxane moieties, wherein $R^5$ is selected from the group consisting of methyl, ethyl, n-propyl, isopropyl, n-butyl, t-butyl, hexyl, octyl, dodecyl, hexadecyl, (3,3, 3-trifluoro) propyl, (1H,1H, 2H, 2H-perfluoro) octyl, (1H,1H, 2H, 2H-perfluoro) dodecyl and (1H,1H, 2H, 2H-perfluoro) hexadecyl, wherein the $R^5$ groups of the first and second populations are not identical, (b) mono-organofunctional T-type siloxane moieties, wherein $R^5$ is L-Z, vinyl,

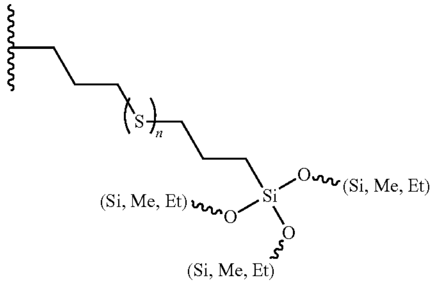

or

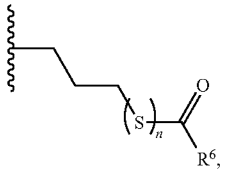

or (c) mono-organofunctional T-type siloxane moieties, wherein $R^5$ is $R^{5S}$.

8. The polymeric liquid polysiloxane material according to claim 1, wherein the relative atomic ratio of T-to Q-species is in the range of 0.02:1 to 0.75:1.

9. A hydrolysis product obtained by reacting at least one polymeric liquid polysiloxane material according to claim 1 with a predetermined amount of water or with a predetermined amount of a water-solvent mixture, optionally in the presence of at least one surfactant.

10. An emulsion obtained by emulsifying a polymeric liquid polysiloxane material according to claim 1 with a predetermined amount of water, optionally in the presence of at least one surfactant.

11. A method for preparing a polymeric liquid polysiloxane material according to claim 1, wherein at least 1 mol-% of all $R^5$ moieties in the material are $R^{5S}$ moieties, the method comprising the following steps:

providing the polymeric liquid polysiloxane material, wherein at least 1 mol-% of all $R^5$ moieties in the material are $R^{5U}$ moieties;

functionalizing the $R^{5U}$ residues of the polymeric liquid polysiloxane material to obtain at least 1 mol-% $R^{5S}$ residues relative to all $R^5$ residues;

retrieving, optionally isolating and optionally purifying the polymeric liquid polysiloxane material.

12. A method for preparing a polymeric liquid polysiloxane material according to claim 1, comprising the following steps:

(a) providing a Q-type polymethoxy, polyethoxy, polypropoxy or mixed poly (methoxy/ethoxy/propoxy) polysiloxane precursor, optionally comprising (a1) di-organofunctional D-type siloxane moieties; and/or (a2) mono-organofunctional T-type siloxane moieties, wherein $R^5$ is selected from the group consisting of $R^{5U}$ and $R^{5S}$;

optionally comprising less than 12 mol-% of (a1) and (a2) combined relative to the total amount of all Q-type species;

optionally further comprising a condensation catalyst;

wherein degree of polymerization of the Q-type polysiloxane according to $DP_{Q\text{-}type}=\Sigma(n\ A_{Qn})/\Sigma(A_{Qn})$ $=(A_{Q1}+2\ A_{Q2}+3\ A_{Q3}+4\ A_{Q4})/(A_{Q0}+A_{Q1}+A_{Q2}+A_{Q3}+A_{Q4})$ is in the range of 1.5 to 2.7, wherein Dn is a Si atom coordinated by n siloxane bonds through bridging oxygen atoms; and wherein the Q-type polysiloxane comprises more than 3, 5, 10, 15 or 20 mol-% silanol groups (Si—OH);

(b) adding at least one of a (b1) tri-organofunctional M-type silane $Si(OR^1)(R^2)(R^3)(R^4)$ in monomeric or oligomeric form; and/or (b2) di-organofunctional D-type silane $Si(OR^1)_2(R^2)(R^3)$ in monomeric or oligomeric form; and/or (b3) mono-organofunctional T-type silane $Si(OR^1)_3(R^5)$, wherein $R^5$ is selected from the group consisting of $R^{5U}$ and $R^{5S}$;

to the polysiloxane of (a);

(c) optionally adding a condensation catalyst to the mixture of step (b);

(d) heating the mixture of (c) in the absence of water:

(e) optionally repeating steps (b) to (d) at least once;

(f) optionally functionalizing the $R^{5U}$ residues of the polymeric liquid polysiloxane material to obtain at least 1 mol-% $R^{5S}$ residues relative to all $R^5$ residues;

(g) retrieving, optionally isolating and optionally purifying the polymeric liquid polysiloxane material;

with the proviso that at least one of:

the precursor of step (a) comprises mono-organofunctional T-type siloxane moieties, wherein $R^5$ is selected from the group consisting of $R^{5U}$ and $R^{5S}$, a mono-organofunctional T-type silane $Si(OR^1)_3(R^5)$, wherein $R^5$ is selected from the group consisting of $R^{5U}$ and $R^{5S}$; is added in monomeric or oligomeric form during step (b), or a combination thereof, and with the proviso that a condensation catalyst is present in at least one of steps (a) or (c).

13. A method for preparing a polymeric liquid polysiloxane material according to claim 1, comprising the following steps:

(a) providing a Q-type polymethoxy, polyethoxy, polypropoxy or mixed poly (methoxy/ethoxy/propoxy) polysiloxane precursor, optionally comprising (a1) di-organofunctional D-type siloxane moieties; and/or (a2) mono-organofunctional T-type siloxane moieties, wherein $R^5$ is selected from the group consisting of $R^{5U}$ and $R^{5S}$;

optionally comprising less than 12 mol-% of (a1) and (a2) combined relative to the total amount of all Q-type species; optionally further comprising a condensation catalyst;

wherein degree of polymerization of the Q-type polysiloxane according to $DP_{Q\text{-}type}=\Sigma(n\ A_{Qn})/\Sigma(A_{Qn})=(A_{Q1}+2\ A_{Q2}+3\ A_{Q3}+4\ A_{Q4})/(A_{Q0}+A_{Q1}+A_{Q2}+A_{Q3}+A_{Q4})$ is in the range of 1.0 to 2.7, wherein Dn is a Si atom coordinated by n siloxane bonds through bridging oxygen atoms; and wherein the Q-type polysiloxane comprises more than 3, 5, 10, 15 or 20 mol-% silanol groups (Si—OH);

(b) adding at least one of a (b1) tri-organofunctional M-type silane $Si(OR^1)(R^2)(R^3)(R^4)$ in monomeric or oligomeric form; and/or (b2) di-organofunctional D-type silane $Si(OR^1)_2(R^2)(R^3)$ in monomeric or oligomeric form; and/or (b3) mono-organofunctional T-type silane $Si(OR^1)_3(R^5)$, wherein $R^5$ is selected from the group consisting of $R^{5U}$ and $R^{5S}$;

to the polysiloxane of (a);

(c) optionally adding a condensation catalyst to the mixture of step (b);

(d) heating the mixture of (c) in the absence of water:

(e) optionally repeating steps (b) to (d) at least once;

(f) optionally functionalizing the $R^{5U}$ residues of the polymeric liquid polysiloxane material to obtain at least 1 mol-% $R^{5S}$ residues relative to all $R^5$ residues;

(g) retrieving, optionally isolating and optionally purifying the polymeric liquid polysiloxane material;

with the proviso that at least one of:

the precursor of step (a) comprises mono-organofunctional T-type siloxane moieties, wherein $R^5$ is selected from the group consisting of $R^{5U}$ and $R^{5S}$, a mono-organofunctional T-type silane $Si(OR^1)_3(R^5)$, wherein $R^5$ is selected from the group consisting of $R^{5U}$ and $R^{5S}$; is added in monomeric or oligomeric form during step (b), or a combination thereof, and with the proviso that a condensation catalyst is present in at least one of steps (a) or (c).

14. The method according to claim 12, wherein in step (a), the $R^5$ of the T-type siloxane moiety is $R^{5U}$;

in step (b), the $R^5$ of the T-type silane is $R^{5U}$; and the method comprises the step (f) of functionalizing the $R^{5U}$ residues of the polymeric liquid polysiloxane material to obtain at least 1 mol-% $R^{5S}$ residues relative to all $R^5$ residues.

15. The method according to claim 12, wherein in step (a), the $R^5$ of the T-type siloxane moiety is $R^{5U}$;

in step (b), the $R^5$ of at least one T-type silane is $R^{5S}$; wherein in optional step (e) the $R^5$ of the T-type silane is selected from $R^{5U}$ and $R^{5S}$, and the method optionally does not comprise the step (f).

16. The method according to claim 12, wherein after step (d) or (e), the method further comprises the step of adding a tri-organofunctional M-type silane $Si(OR^1)(R^2)(R^3)(R^4)$ or M-type siloxane $(R^2)(R^3)(R^4)Si—O—Si(R^2)(R^3)(R^4)$ and optionally a di-organofunctional D-type silane in monomeric or oligomeric form as described in step (b2) in the presence of water and a suitable co-solvent and an acid catalyst, followed by heating the mixture, optionally to reflux.

17. The method according to claim 12, wherein the reaction temperature for steps (c) through (e) is in the range from 30 to 170° C., and the pressure during steps (c) through (e) is in the range of 0.1 bar to 2 bar.

18. The method according to claim 12, wherein the condensation catalyst is an acid selected from the group consisting of Bronsted acids and Lewis acids;

inorganic mineral acids;

organic acids;

acidic metal ion salts, optionally transition metal ions salts;

acids with a pKa value below 4 or with a negative pka value; and acid-releasing compounds, chlorosilanes, monochloro-, dichloro-or trichlorosilanes;

wherein the catalyst amount in each of steps (a) or (c) is optionally between 0.005 and 5 mol % with respect to the total molar silicon content present in said step.

19. A formulation comprising the polymeric liquid polysiloxane material according to claim 1, the formulation comprising at least one population of mono-organofuncational T-type siloxane moieties with R5 selected from the group consisting of vinyl, methacrylate, butacrylate, acrylate,

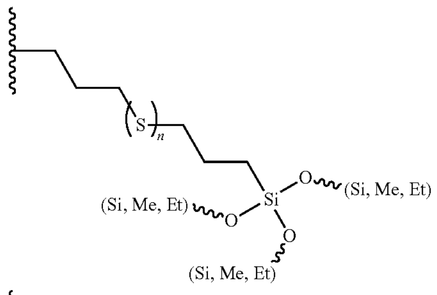

and

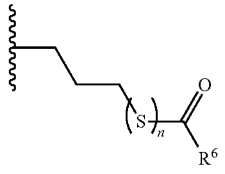

as a crosslinker within the formulation, with a content of the polymeric liquid polysiloxane material in the range of 0.2% to 25% by weight with respect to the formulation.

20. A hydrophobic formulation comprising the polymeric liquid polysiloxane material according to claim 1, the hydrophobic formulation comprising at least one population of mono-organofunctional T-type siloxane moieties with R5 selected from the group consisting of methyl, ethyl, vinyl, methacrylate, n-propyl, isopropyl, n-butyl, t-butyl, hexyl, octyl, dodecyl, hexadecyl, (3,3,3-trifluoro) propyl, (1H,1H, 2H,2H-perfluoro) octyl, (1H,1H, 2H, 2H-perfluoro) dodecyl, and (1H,1H, 2H, 2H-perfluoro) hexadecyl, wherein the loading of the polymeric liquid polysiloxane material in the formulation is 0.5% to 25% by weight.

21. The polymeric liquid polysiloxane material according to claim 1, further comprising at least one of:

(ii) optionally tri-organofunctional M1-type siloxane moieties selected from the group consisting of:

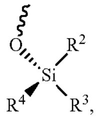

or (iii) optionally di-organofunctional D-type siloxane moieties selected from the group consisting of:

$D^1$

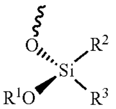

and

-continued $D^2$

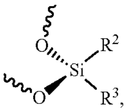

wherein

 indicates a covalent siloxane bond to a silicon atom of another Q-, M-, D-and/or T-type moiety as defined in (i), (ii), (iii) and/or (iv);

the degree of polymerization of the D-type siloxane moieties according to $DP_{D\text{-}type}=\Sigma(n\ A_{Dn})/\Sigma(A_{Dn})=(A_{D1}+2\ A_{D2})/(A_{D0}+A_{D1}+A_{D2})$ is in the range of 1.0 to 1.9, wherein Dn is a Si atom coordinated by n siloxane bonds through bridging oxygen atoms;

the total content of tri-organofunctional M-type siloxane moieties (iii) in the polymeric liquid polysiloxane material does not exceed 10 mol-%; and the total content of di-organofunctional D-type siloxane moieties (iii) in the polymeric liquid polysiloxane material does not exceed 50 mol-%.

* * * * *